US012537684B2

(12) United States Patent
Wang et al.

(10) Patent No.: US 12,537,684 B2
(45) Date of Patent: Jan. 27, 2026

(54) SYSTEMS, METHODS, AND APPARATUSES FOR SECURE HYBRID BASED COMMUNICATIONS

(71) Applicant: E-RADIO USA INC., Redwood City, CA (US)

(72) Inventors: Jackson Kit Wang, Toronto (CA); Daniel John Glen Nephin, Picton (CA); Maurice Nobert, Cleveland Heights, OH (US)

(73) Assignee: E-RADIO USA INC., Redwood City, CA (US)

( * ) Notice: Subject to any disclaimer, the term of this patent is extended or adjusted under 35 U.S.C. 154(b) by 89 days.

(21) Appl. No.: 18/571,107

(22) PCT Filed: Jun. 16, 2022

(86) PCT No.: PCT/US2022/033785
§ 371 (c)(1),
(2) Date: Dec. 15, 2023

(87) PCT Pub. No.: WO2022/266317
PCT Pub. Date: Dec. 22, 2022

(65) Prior Publication Data

US 2025/0015993 A1 Jan. 9, 2025

Related U.S. Application Data

(60) Provisional application No. 63/211,789, filed on Jun. 17, 2021.

(51) Int. Cl.
*G06F 21/00* (2013.01)
*H04L 9/32* (2006.01)
*H02J 13/00* (2006.01)

(52) U.S. Cl.
CPC .......... *H04L 9/32* (2013.01); *H02J 13/00001* (2020.01)

(58) Field of Classification Search
CPC ......... H04L 9/32; H04L 9/008; H04L 9/0618; H04L 9/12; H04L 9/3297; H04L 63/0876; H02J 13/00001; H04W 12/50; H04W 12/65; H04W 12/06; H04W 12/61; H04W 12/63; G06F 21/606
See application file for complete search history.

(56) References Cited

U.S. PATENT DOCUMENTS 7,298,328 B2 * 11/2007 Wang .................... G01S 5/0252 342/451
7,809,342 B2 * 10/2010 Wang ..................... H04H 40/27 455/12.1

(Continued)

*Primary Examiner* — Kendall Dolly

(57) ABSTRACT

Systems, methods, and apparatuses for securing a communication network are provided. Transmitting a first signal including encoding a first timestamp, a first identifier, and a message authentication component. Obtaining a message signal comprising one or more service variables associated and an encrypted unique identifier. Authenticating the encrypted unique identifier based on a comparison of the encrypted unique identifier against a plurality of stored unique identifiers in a lookup table. Generating a second signal comprising an encoding of a subset of the service variables, the encrypted unique identifier, and a second timestamp. Transmitting the second signal to each remote receiver in a subset of the plurality of remote receivers.

27 Claims, 13 Drawing Sheets

Service Provider System 200
Grid Security System 300
First Communication Network 106-1
Second Communication Network 106-2
400-1
Remote device 1
400-V
Remote device V

(56) References Cited

U.S. PATENT DOCUMENTS

| | | | | |
|---|---|---|---|---|
| 8,265,576 | B2 | 9/2012 | Wang | |
| 8,892,064 | B2 | 11/2014 | Wang et al. | |
| 9,419,664 | B2 | 8/2016 | Wang | |
| 9,830,629 | B2 * | 11/2017 | Wang | H02J 13/00004 |
| 12,058,260 | B2 * | 8/2024 | Philipp | H04L 9/0656 |
| 2005/0003772 | A1 * | 1/2005 | Nemoto | H04B 1/406 455/101 |
| 2007/0094507 | A1 * | 4/2007 | Rush | H04L 9/0897 713/176 |
| 2011/0076991 | A1 * | 3/2011 | Mueck | H04L 1/0031 455/414.1 |
| 2011/0314281 | A1 * | 12/2011 | Fielder | H04L 9/0838 713/168 |
| 2014/0133656 | A1 * | 5/2014 | Wurster | H04W 4/023 380/270 |
| 2017/0111797 | A1 * | 4/2017 | Mardikar | H04L 9/304 |
| 2019/0124509 | A1 * | 4/2019 | Nakarmi | H04L 63/123 |
| 2019/0303541 | A1 * | 10/2019 | Reddy | G06F 21/64 |
| 2020/0266991 | A1 * | 8/2020 | Waters | H04L 9/0891 |
| 2020/0273048 | A1 * | 8/2020 | Andon | G06Q 10/02 |
| 2020/0351089 | A1 * | 11/2020 | Wentz | H04L 9/3236 |

* cited by examiner

Figure 5:
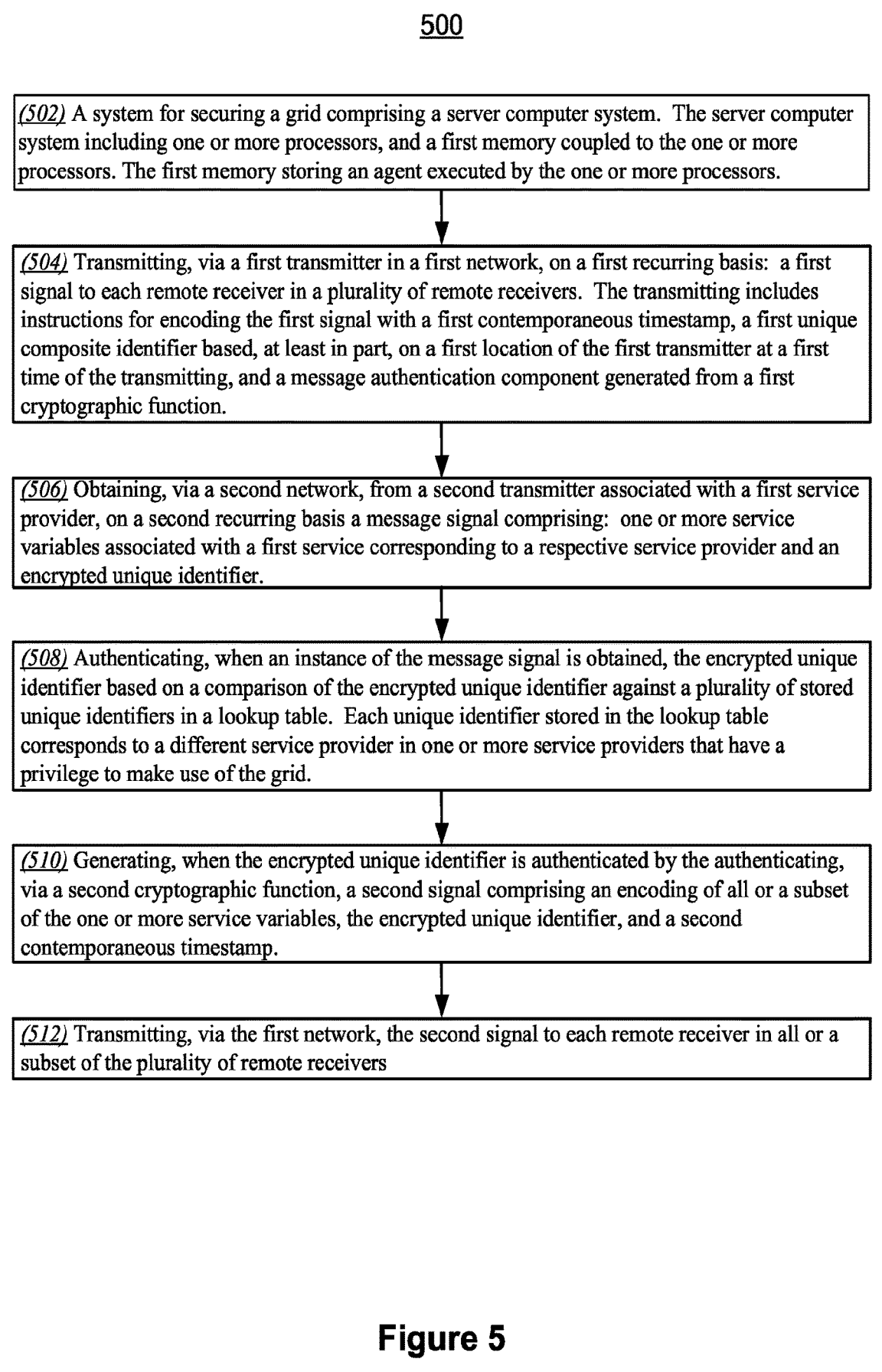

500

(502) A system for securing a grid comprising a server computer system. The server computer system including one or more processors, and a first memory coupled to the one or more processors. The first memory storing an agent executed by the one or more processors.

(504) Transmitting, via a first transmitter in a first network, on a first recurring basis: a first signal to each remote receiver in a plurality of remote receivers. The transmitting includes instructions for encoding the first signal with a first contemporaneous timestamp, a first unique composite identifier based, at least in part, on a first location of the first transmitter at a first time of the transmitting, and a message authentication component generated from a first cryptographic function.

(506) Obtaining, via a second network, from a second transmitter associated with a first service provider, on a second recurring basis a message signal comprising: one or more service variables associated with a first service corresponding to a respective service provider and an encrypted unique identifier.

(508) Authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to make use of the grid.

(510) Generating, when the encrypted unique identifier is authenticated by the authenticating, via a second cryptographic function, a second signal comprising an encoding of all or a subset of the one or more service variables, the encrypted unique identifier, and a second contemporaneous timestamp.

(512) Transmitting, via the first network, the second signal to each remote receiver in all or a subset of the plurality of remote receivers

Figure 6:
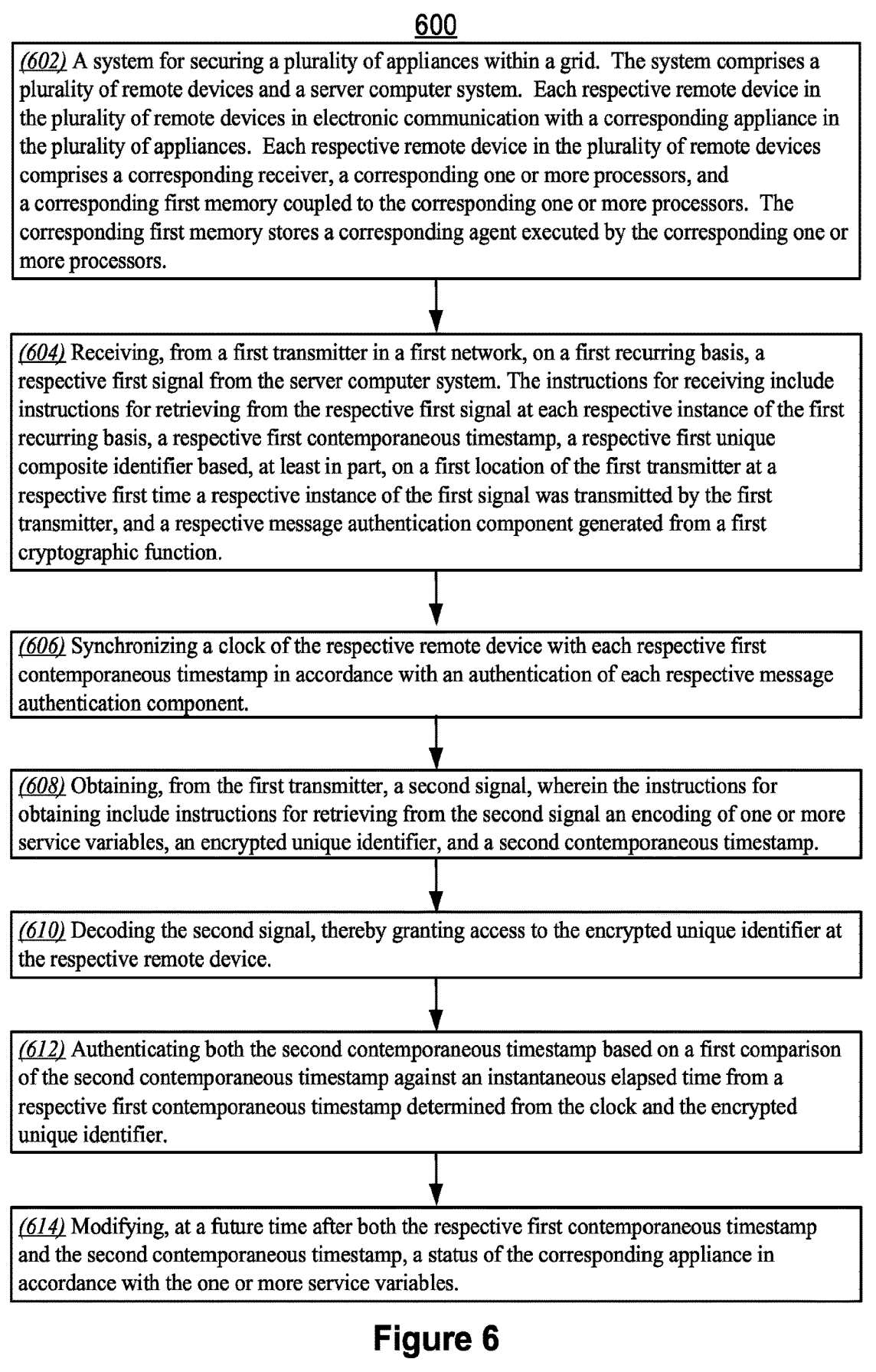

(602) A system for securing a plurality of appliances within a grid. The system comprises a plurality of remote devices and a server computer system. Each respective remote device in the plurality of remote devices in electronic communication with a corresponding appliance in the plurality of appliances. Each respective remote device in the plurality of remote devices comprises a corresponding receiver, a corresponding one or more processors, and a corresponding first memory coupled to the corresponding one or more processors. The corresponding first memory stores a corresponding agent executed by the corresponding one or more processors.

(604) Receiving, from a first transmitter in a first network, on a first recurring basis, a respective first signal from the server computer system. The instructions for receiving include instructions for retrieving from the respective first signal at each respective instance of the first recurring basis, a respective first contemporaneous timestamp, a respective first unique composite identifier based, at least in part, on a first location of the first transmitter at a respective first time a respective instance of the first signal was transmitted by the first transmitter, and a respective message authentication component generated from a first cryptographic function.

(606) Synchronizing a clock of the respective remote device with each respective first contemporaneous timestamp in accordance with an authentication of each respective message authentication component.

(608) Obtaining, from the first transmitter, a second signal, wherein the instructions for obtaining include instructions for retrieving from the second signal an encoding of one or more service variables, an encrypted unique identifier, and a second contemporaneous timestamp.

(610) Decoding the second signal, thereby granting access to the encrypted unique identifier at the respective remote device.

(612) Authenticating both the second contemporaneous timestamp based on a first comparison of the second contemporaneous timestamp against an instantaneous elapsed time from a respective first contemporaneous timestamp determined from the clock and the encrypted unique identifier.

(614) Modifying, at a future time after both the respective first contemporaneous timestamp and the second contemporaneous timestamp, a status of the corresponding appliance in accordance with the one or more service variables.

1300
A
| | Type | Logic function |
|---|---|---|
| 1 | 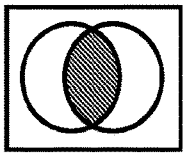 | $C=A \wedge B$ |
| 2 | 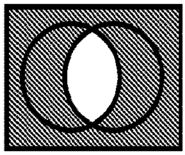 | $C={\sim}(A \wedge B)$ |
| 3 | 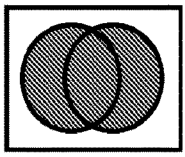 | $C=A \vee B$ |
| 4 | 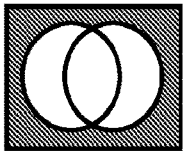 | $C={\sim}(A \vee B)$ |
| 5 | 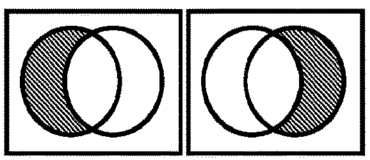 | $C=A \wedge {\sim}B$, $C={\sim}A \wedge B$, |
| 6 | 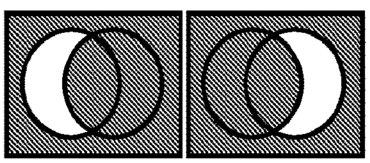 | $C={\sim}A \vee B$, $C=A \vee {\sim}B$, |
| 7 | 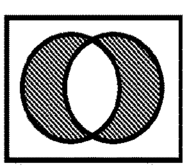 | $C={\sim}(A \leftrightarrow B)$ |
| 8 | 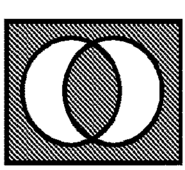 | $C=A \leftrightarrow B$ |
Figure 13

SYSTEMS, METHODS, AND APPARATUSES FOR SECURE HYBRID BASED COMMUNICATIONS

TECHNICAL FIELD

The present disclosure relates grid security. More particularly, the present disclosure relates to systems, methods, and apparatuses that provide secure hybrid-based communications over one or more communication networks.

BACKGROUND

Energy generation, distribution, and/or consumption systems ("energy-related systems") are complex. Such systems typically involve a multiplicity of energy producers and energy consumers tied together by way of a complex web of energy distribution channels or energy transporters. The complexity of such systems is further increased when one considers that many, if not all, energy producers themselves are complex systems that convert non-electrical energy resources such as fossil fuel, nuclear, wind power, or solar energy resources into, for example, electrical energy, and that require additional resources such as chilled water for their operation. That is, the complexity of energy-related systems is further increased if one considers the scope of such systems to include the relationships between energy producers and upstream energy production enablers that make it possible for those energy producers to operate.

Past solutions to resolve efficiency issues within these energy systems include Demand Response ("DR") applications, which seek to increase efficiency at the energy consumption level. See Albadi et al., 2008, "A Summary of Demand Response in Electricity Markets," Electric Power Systems Research, 78(11), pg. 1989. However, such prior solutions lack mechanisms to secure transmissions within the energy system and excessively burden an end user by requiring the end user to manually control the DR.

Moreover, past solutions fail to utilize existing infrastructure, which leads to increased costs for all parties associated with energy systems. For instance, various past solutions are internet centric focus, which introduces issues with signal latency when a receiver population is large. An example is the 2018 false alarm text messages for nuclear strike in Hawaii, where some cell phones received the warning after an alleged missile would have landed due to latency. Another problem with internet-based solutions is that there are infinite points of data entry and, therefore, a corresponding infinite points of attack.

Additionally, software and financial services play an important role in energy system consumption and security. For instance, within a software supply chain, a computer application is developed through multiple phases of its lifecycle including inception, design, construction, testing, release, and retirement. Each phase introduces complexities that challenges when establishing whether the computer application and those that access the computer application are trustworthy. Past solutions to secure financial services or the software supply chain within energy systems include two-factor authentication (2FA) mechanisms. However, such 2FA mechanisms lack a second security mechanism if a key of the 2FA mechanism lacks integrity. Thus, three is a need for reliable identification and/or authentication of information that is disseminated through various platforms that utilize energy systems.

The information disclosed in this Background of the Invention section is only for enhancement of understanding of the general background of the invention and should not be taken as an acknowledgement or any form of suggestion that this information forms the prior art already known to a person skilled in the art.

SUMMARY

Given the above background, what is needed in the art are systems, methods, and apparatuses for providing security of a grid.

Accordingly, various aspects of the present disclosure are directed to providing systems, methods, and apparatuses for hybrid secure based communications.

An aspect of the present disclosure is directed to providing systems, methods, and apparatuses for securing dissemination of information within a grid.

To ensure the safe and reliable operations of industrial control systems (ICS) services provided by respective service providers (e.g., energy providers within an electrical grid, oil supply providers within an oil supply line system, water providers within a water supply system, etc.) in critical infrastructure, it is imperative devices that interact with ICS services include security mechanisms that provide data integrity and protection against malicious modifications. Accordingly, the systems, methods, and apparatus of the present disclosure provide a zero-trust architecture that enables one-way communications for a more inherently secured service.

As a first security mechanism, in some embodiments, a respective remote device or system of the grid generates a unique composite identifier that is included with a transmission within the grid. The unique composite identifier is based, at least in part, on a plurality of measured signal qualities that collectively represent a frequency spectrum. Accordingly, the unique composite identifier is a location dependent identifier measured as a spectral vector. Due to an inherent variance caused by dynamically changing environmental conditions, no two unique composite identifiers will be identical to a degree of precision and accuracy. In turn, given a defined tolerance of such variance, this prevents an authorized user from copying a previously generated unique composite identifier in order to spoof such identity within the grid. In some embodiments, each respective remote device or system of the grid includes a lookup table of identifiers in order to authenticate a respective unique composite identifier based on a comparison against a plurality of stored unique identifiers in accordance with a consideration of such tolerance in the variance.

In some embodiments, the systems, methods, and apparatuses of the present disclosure include a second security mechanism that operates orthogonal to the first security mechanism. By operating orthogonally, the second security mechanism is said to secure the information independent from the first security mechanism. This orthogonal operation allows the systems, methods, and apparatuses of the present disclosure to transmit signals within a communication network independent of performance, scalability, and cost considerations.

As a second security mechanism, orthogonal to the first security, in some embodiments, the systems, methods, and apparatuses of the present disclosure transmit a first signal including a first contemporaneous timestamp that is encrypted by a first cryptographic function. This first signal is received by a respective receiver, and, upon authentication, a clock associated with the receiver is synchronized to the first contemporaneous timestamp. Subsequently, the systems, methods, and apparatuses of the present disclosure transmits a second signal including a second contemporaneous timestamp and an encoding of some service variables associated with modifying a corresponding appliance of the receiver. By comparing the second contemporaneous timestamp against the first contemporaneous timestamp, such as determining an instantaneous elapsed time from the first contemporaneous timestamp determined from a clock of the receiver, in order to determine a future time for modifying a status of the corresponding appliance. In some embodiments, the respective receiver is a transceiver.

Accordingly, the systems, methods, and apparatus of the present disclosure provide for secure dissemination of information using one or more security mechanisms. From this, the systems, methods, and apparatuses of the present disclosure allow for this dissemination of information to be transmitted, such as via a broadcast system including a frequency modulation (FM) radio data system (RDS), to a population of end-users (e.g., over one million customers of a respective service corresponding to a respective service provider). As a non-limiting example, this information includes a real-time price or a real-time tariff price of the respective service. Accordingly, recipients of this transmission utilize this information with one or more devices to shift energy loads, such as to a cheapest and/or cleanest period of time, thereby minimizing a cost of resources (e.g., financial resources, environmental resources, etc.) for consumption of the respective service. In some such embodiments, in which the broadcast system is a national broadcast system, the dissemination of information provided by the systems, methods, and apparatus of the present disclosure reach some 300 million Americans and their devices in about 2 seconds with no potential for congestion. Moreover, as a broadcast system there exists limited points of data entry that affords an ability to audit and defend finite entry points of the broadcast system.

In more detail, one aspect of the present disclosure is directed to providing a system for securing a grid including a server computer system. The server computer system includes one or more processors, and a first memory coupled to the one or more processors. The first memory stores an agent executed by the one or more processors. The agent includes one or more instructions for transmitting, via a first transmitter in a first network, on a first recurring basis: a first signal to each remote receiver in a plurality of remote receivers. The transmitting includes instructions for encoding the first signal with a first contemporaneous timestamp, a first unique composite identifier based, at least in part, on a first location of the first transmitter at a first time of the transmitting, and a message authentication component generated from a first cryptographic function. The agent further includes one or more instructions for obtaining, via a second network, from a second transmitter associated with a first service provider, on a second recurring basis a message signal. The message signal includes one or more service variables associated with a first service corresponding to a respective service provider and an encrypted unique identifier. Additionally, the agent includes one or more instructions for authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to make use of the grid. Moreover, the agent includes one or more instructions for generating, when the encrypted unique identifier is authenticated by the authenticating, via a second cryptographic function, a second signal. The second signal includes an encoding of all or a subset of the one or more service variables, the encrypted unique identifier, and a second contemporaneous timestamp. Furthermore, the agent includes one or more instructions for transmitting, via the first network, the second signal to each remote receiver in all or a subset of the plurality of remote receivers.

In some embodiments, the first network is a terrestrial broadcast network.

In some embodiments, the first signal includes a main signal component and a side data component. The instructions for encoding encode the side data component with the first contemporaneous timestamp, the first unique composite identifier, and the message authentication component.

In some embodiments, the main signal component is a main analog signal component and the side data component is a digital side data component.

In some embodiments, the instructions for encoding encode the first signal as an analog cellular signal, a digital cellular signal, a general packet radio service signal, an enhanced data rate for GSM evolution (EDGE) service signal, a Mobitex signal, a two-way paging signal, a signal in an Ardis network, a satellite signal, a WiMAX signal, a WiFi signal, a signal embedded in an AM carrier wave, a signal embedded in an FM carrier wave, a signal embedded in a high definition radio carrier wave, a TV signal, or a satellite radio signal.

In some embodiments, the first network is a local area network.

In some embodiments, the encrypted unique identifier is based, at least in part, on a second location of the second transmitter when the one or more service variables were generated.

In some embodiments, the first recurring basis is about 30 seconds, about 40 seconds, about 50 seconds, about 60 seconds, about 70 second, about 80 seconds, about 90 seconds, between 5 seconds and 5 minutes, or a combination thereof.

In some embodiments, the second signal includes the encoding of all or the subset of the one or more service variables, the encrypted unique identifier, and the second contemporaneous timestamp.

In some embodiments, the second network is a terrestrial broadcast network.

In some embodiments, the second network is a wide area network.

In some embodiments, the one or more service variables includes real-time price of the first service.

In some embodiments, the one or more service variables includes a real-time tariff rate.

In some embodiments, the one or more service variables includes a real-time marginal greenhouse gas emissions rate.

In some embodiments, the one or more service variables includes a time of use of the first service.

In some embodiments, the one or more service variables includes a critical peak pricing of the first service.

In some embodiments, the one or more service variables includes a service reliability status.

In some embodiments, the one or more service variables includes a critical weather status.

In some embodiments, the encoding of all or the subset of the one or more service variables further includes forming a linear vector space, which is included in the second signal, from at least two variables in the one or more service variables.

In some embodiments, the respective service provider is the first service provider.

In some embodiments, the respective service provider is a second service provider different than the first service provider.

In some embodiments, the first service is an industrial production service, a water treatment service, a transportation service, or an energy management service.

In some embodiments, each respective unique identifier in the lookup table includes a plurality of measured signal qualities that collectively represent a frequency spectrum.

In some embodiments, each respective unique identifier in the lookup table includes a plurality of measured signal qualities that collectively represent a portion of a frequency spectrum.

In some embodiments, the portion of the frequency spectrum is determined, at least in part, by the agent.

In some embodiments, the agent utilizes a dynamic hysteresis model to determine the portion of the frequency spectrum.

In some embodiments, the portion of the frequency spectrum is modulated by a server computer system.

In some embodiments, each respective unique identifier in the lookup table is embedded within an application-specific integrated circuit that is queried during the authenticating step.

In some embodiments, each respective unique identifier in the lookup table is a binary data element.

In some embodiments, each respective unique identifier in the lookup table is an analog data element.

In some embodiments, when the encrypted unique identifier does not satisfy a threshold comparison score, the second signal is not generated.

In some embodiments, the first cryptographic function or the second cryptographic function is a block cipher function.

In some embodiments, the first cryptographic function or the second cryptographic function is a hash function.

In some embodiments, the first cryptographic function is different than the second cryptographic function.

In some embodiments, a periodicity or average periodicity of the second recurring basis is different than a periodicity or average periodicity of the first recurring basis.

In some embodiments, the respective service provider is a water utility service provider, an electrical utility service provider, a gas utility service provider, a garbage pickup service provider, or a hazardous waste pickup service provider.

In some embodiments, the subset of the plurality of remote receivers is selected from among the plurality of remote receivers based upon an identity of the respective service provider associated with the encrypted unique identifier, an identity of one or more service variables in the one or more service variables, and/or a value of one or more service variables in the one or more service variables.

Another aspect of the present disclosure is directed to providing a system for securing a plurality of appliances within a grid. The system includes a plurality of remote devices and a server computer system. Each respective remote device in the plurality of remote devices in electronic communication with a corresponding appliance in the plurality of appliances. Each respective remote device in the plurality of remote devices includes a corresponding receiver, a corresponding one or more processors, and a corresponding first memory coupled to the corresponding one or more processors. The corresponding first memory stores a corresponding agent executed by the corresponding one or more processors. The corresponding agent includes one or more instructions for receiving, from a first transmitter in a first network, on a first recurring basis, a respective first signal from the server computer system. The instructions for receiving include instructions for retrieving from the respective first signal at each respective instance of the first recurring basis, a respective first contemporaneous timestamp, a respective first unique composite identifier based, at least in part, on a first location of the first transmitter at a respective first time a respective instance of the first signal was transmitted by the first transmitter, and a respective message authentication component generated from a first cryptographic function. The agent further includes one or more instructions for synchronizing a clock of the respective remote device with each respective first contemporaneous timestamp in accordance with an authentication of each respective message authentication component. Moreover, the agent includes one or more instructions for obtaining, from the first transmitter, a second signal. The one or more instructions for the obtaining the second signal include instructions for retrieving from the second signal an encoding of one or more service variables, an encrypted unique identifier, and a second contemporaneous timestamp. Additionally, the agent includes one or more instructions for decoding the second signal. This decoding the second signal grants access to the encrypted unique identifier at the respective remote device. Furthermore, the agent includes one or more instructions for authenticating both the second contemporaneous timestamp based on a first comparison of the second contemporaneous timestamp against an instantaneous elapsed time from a respective first contemporaneous timestamp determined from the clock and the encrypted unique identifier. The agent further includes one or more instructions for modifying, at a future time after both the respective first contemporaneous timestamp and the second contemporaneous timestamp, a status of the corresponding appliance in accordance with the one or more service variables.

In some embodiments, the corresponding receiver, the corresponding one or more processors, and the corresponding first memory are embedded within the corresponding appliance.

In some embodiments, the corresponding appliance is selected from the group consisting of a heating and air conditioning (HVAC) unit, a refrigerator and/or freezer, a washing machine, a dryer, a dish washer, a water heater, an electric vehicle system, an electric vehicle supply equipment system, a water pump, an energy management hub, a microgrid controller, and a watering system.

In some embodiments, the clock is a real-time clock embedded within the corresponding appliance.

In some embodiments, the clock is a system clock executed by the corresponding one or more processors.

In some embodiments, the respective remote device further includes a display. Additionally, the authenticating the encrypted unique identifier further includes presenting a visualization of the encrypted unique identifier on the display.

In some embodiments, the corresponding application further includes a display. Furthermore, the authenticating the encrypted unique identifier further includes presenting a visualization of the encrypted unique identifier on the display.

In some embodiments, each respective unique identifier includes a plurality of measured signal qualities that collectively represent a frequency spectrum.

In some embodiments, each respective unique identifier table includes a plurality of measured signal qualities that collectively represent a portion of a frequency spectrum.

In some embodiments, the receiving the respective first signal includes determining if the respective first signal satisfies a threshold condition. When the respective first signal satisfies the threshold condition the agent proceeds to synchronize the clock of the respective remote device. Moreover, when the respective first signal does not satisfy the threshold condition the agent does not proceed to synchronize the clock of the respective remote device.

Yet another aspect of the present disclosure is directed to providing an apparatus. The apparatus includes a display. Furthermore, the apparatus includes an FM radio receiver configured to obtain one or more service variables associated with a first utility service corresponding to a respective utility service provider. Moreover, the one or more service variables are obtained by a frequency modulation (FM) sub carrier channel. Additionally, the apparatus includes a processor in electrical communication with the FM radio receiver and the display. The processor is configured to extract real-time pricing information from the one or more service variables. Additionally, the processor is configured to present the real-time pricing information on the display for a user. The apparatus includes an input interface configured for receiving one or more instructions from the user on whether to alter usage of the apparatus after the real-time pricing information has been presented.

Yet another aspect of the present disclosure is directed to providing a method of providing customer relationship management at a device. The method includes tuning the device to a frequency band containing a signal of a locally transmitted terrestrial broadcast network. Moreover, the method includes receiving the signal of the locally transmitted terrestrial broadcast network. The locally transmitted terrestrial broadcast network includes a main signal component and a side data component. The side data component includes an encoding of a message. The method further includes decoding the message to obtain a first unique identifier. In some embodiments, the decoding the message further obtains one or more service variables. Moreover, the method includes comparing the first unique identifier to a present location of the device. When the first unique identifier matches the present location, at least a portion of the message is outputted to an output component of the device in accordance with the one or more service variables. Furthermore, when the first unique identifier does not match the present location, the message is not outputted to the output component of the device.

Yet another aspect of the present disclosure is directed to providing a device. The device includes a global positioning feed component for receiving a global positioning feed corresponding to a present location of the device. Furthermore, the device includes an output component. The device further includes a receiver for tuning into and receiving a locally transmitted terrestrial broadcast network. The locally transmitted terrestrial broadcast network includes a main signal component and a side data component. Furthermore, the side data component includes a message. Accordingly, the device includes a decoded digital data controller in electrical communication with the global positioning feed, the output component, and the receiver. The decoded digital data controller includes instructions for parsing the message to obtain a first unique identifier. Moreover, the decoded digital data controller includes instructions for comparing the first unique identifier to the global positioning feed. When the first unique identifier matches the global positioning feed, at least a portion of the message is outputted to the output component of the device. When the first unique identifier does not match the global positioning feed, the message is not outputted to the output component of the device.

Yet another aspect of the present disclosure is directed to providing a system for securing a digital asset. The server computer system includes one or more processors, and a first memory coupled to the one or more processors. The first memory stores an agent executed by the one or more processors. The agent includes one or more instructions for transmitting, via a first transmitter in a first network, on a first recurring basis: a first signal to each remote receiver in a plurality of remote receivers. The transmitting includes instructions for encoding the first signal with a first contemporaneous timestamp, a first unique composite identifier based, at least in part, on a first location of the first transmitter, and a message authentication component generated from a first cryptographic function. The agent further includes one or more instructions for obtaining, via a second network, from a second transmitter associated with a first service provider, on a second recurring basis a message signal. The message signal includes a digital asset and an encrypted unique identifier. Additionally, the agent includes one or more instructions for authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to access the digital asset. Moreover, the agent includes one or more instructions for generating, when the encrypted unique identifier is authenticated by the authenticating, via a second cryptographic function, a second signal. The second signal includes an encoding of all or a subset of the digital asset, the encrypted unique identifier, and a second contemporaneous timestamp. Furthermore, the agent includes one or more instructions for transmitting, via the first network, the second signal to each remote receiver in all or a subset of the plurality of remote receivers.

In some embodiments, the digital asset includes one or more digital images, one or more two-dimensional (2D) maps, one or more 3D maps, one or more computer-aided designs, a digital video, one or more dense point clouds, one or more textured meshes, one or more cryptographic non-fungible token assets, or a combination thereof.

In some embodiments, the digital asset includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction.

In some embodiments, the digital asset includes one or more instructions for updating a data element stored at a remote device.

In some embodiments, the authenticating the encrypted unique identifier further includes authenticating a trustworthiness of the digital asset.

In some embodiments, the authenticating the trustworthiness of the digital asset includes verifying that a corresponding trust record associated with the digital asset has not been tampered.

In some embodiments, the corresponding trust record is further associated with a distributed blockchain ledger system.

In some embodiments, each respective unique identifier in the lookup table includes a plurality of measured signal qualities that collectively represent a frequency spectrum.

In some embodiments, each respective unique identifier in the lookup table includes a plurality of measured signal qualities that collectively represent a portion of a frequency spectrum.

In some embodiments, the first service provider is associated with an inception of the digital asset, a design of the digital asset, a construction of the digital asset, a testing of the digital asset, a release of digital asset, a retirement of the digital asset, or a combination thereof.

In some embodiments, the obtaining the message signal further includes storing a first instance of the digital asset at the server computer system.

In some embodiments, the transmitting the second signal further includes storing a second instance of the digital asset at the server computer system.

Yet another aspect of the present disclosure is directed to providing a system for securing a digital asset. The system includes a plurality of remote devices and a server computer system. Each respective remote device in the plurality of remote devices includes a corresponding receiver, a corresponding one or more processor, and a corresponding first memory coupled to the corresponding one or more processors. The corresponding first memory stores a corresponding agent executed by the corresponding one or more processors. The corresponding agent includes one or more instructions for receiving, from a first transmitter in a first network, on a first recurring basis, a respective first signal from the server computer system. The instructions for receiving include instructions for retrieving from the respective first signal at each respective instance of the first recurring basis, a respective first contemporaneous timestamp, a respective first unique composite identifier based, at least in part, on a first location of the first transmitter at a respective first time a respective instance of the first signal was transmitted by the first transmitter, and a respective message authentication component generated from a first cryptographic function. The corresponding agent includes one or more instructions for synchronizing a clock of the respective remote device with each respective first contemporaneous timestamp in accordance with an authentication of each respective message authentication component. Furthermore, the corresponding agent includes one or more instructions for obtaining, from the first transmitter, a second signal. The instructions for obtaining include instructions for retrieving from the second signal an encoding of a digital asset, an encrypted unique identifier, and a second contemporaneous timestamp. Additionally, the corresponding agent includes one or more instructions for decoding the second signal, which grants access to the encrypted unique identifier at the respective remote device. The corresponding agent includes one or more instructions for authenticating both the second contemporaneous timestamp based on a first comparison of the second contemporaneous timestamp against an instantaneous elapsed time from a respective first contemporaneous timestamp determined from the clock and the encrypted unique identifier. Moreover, the corresponding agent includes one or more instructions for accessing, in accordance with authentication of both the second contemporaneous timestamp and the encrypted unique identifier, the digital asset at the remote device.

In some embodiments, the digital asset includes one or more digital images, one or more two-dimensional (2D) maps, one or more 3D maps, one or more computer-aided designs, a digital video, one or more dense point clouds, one or more textured meshes, one or more cryptographic non-fungible token assets, or a combination thereof.

In some embodiments, the digital asset includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction.

In some embodiments, the digital asset includes one or more instructions for updating a data element stored at the remote device.

In some embodiments, the authenticating the encrypted unique identifier further includes authenticating a trustworthiness of the digital asset.

In some embodiments, the authenticating the trustworthiness of the digital asset includes verifying that a corresponding trust record associated with the digital asset has not been tampered.

In some embodiments, the corresponding trust record is further associated with a distributed blockchain ledger system.

In some embodiments, each respective unique identifier in the lookup table includes a plurality of measured signal qualities that collectively represent a frequency spectrum.

In some embodiments, each respective unique identifier in the lookup table includes a plurality of measured signal qualities that collectively represent a portion of a frequency spectrum.

In some embodiments, the accessing the digital asset at includes executing the digital asset at the remote device, deploying the digital asset at the remote device, or providing a first user of the digital asset at the remote device.

In some embodiments, the first service provider is associated with an inception of the digital asset, a design of the digital asset, a construction of the digital asset, a testing of the digital asset, a release of digital asset, a retirement of the digital asset, or a combination thereof.

Yet another aspect of the present disclosure is directed to a system for securing a grid. The system includes a server computer system. The server computer system includes one or more processors, and a first memory coupled to the one or more processors. The first memory storing an agent executed by the one or more processors. The agent includes one or more instructions for transmitting, via a first transmitter in a first network, on a first recurring basis: a first signal to each remote receiver in a plurality of remote receivers. The transmitting includes instructions for encoding the first signal with a first contemporaneous timestamp, a first unique composite identifier based, at least in part, on a modulation of the first signal by the first transmitter, and a message authentication component generated from a first cryptographic function. The agent further includes one or more instructions for obtaining, via a second network, from a second transmitter associated with a first service provider, on a second recurring basis a message signal. The message signal includes one or more service variables associated with a first service corresponding to a respective service provider and an encrypted unique identifier. Moreover, the agent includes one or more instructions for authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to make use of the grid. Furthermore, the agent includes one or more instructions for generating, when the encrypted unique identifier is authenticated by the authenticating, via a second cryptographic function, a second signal includes an encoding of all or a subset of the one or more service variables, the encrypted unique identifier, and a second contemporaneous timestamp. The agent further includes one or more instructions for transmitting, via the first network, the second signal to each remote receiver in all or a subset of the plurality of remote receivers.

In some embodiments, the first signal includes a main signal component and a side data component. Moreover, the modulation of the first signal includes modulating a measured signal quality of the side data component.

In some embodiments, the measured signal quality includes a power spectral density.

In some embodiments, the measured signal quality includes a difference in comparison to a baseline signal quality.

In some embodiments, the measured signal quality includes an active status of the side data component.

In some embodiments, the main signal component is a main analog signal component and the side data component is a digital side data component.

The systems, methods, and apparatuses of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 provides a flow chart of methods for grid security, in accordance with an embodiment of the present disclosure;

FIG. 6 provides another flow chart of methods for grid security, in accordance with an embodiment of the present disclosure;

FIG. 13 illustrates exemplary logical functions that are used implemented in various embodiments of the present disclosure.

Figure 1:
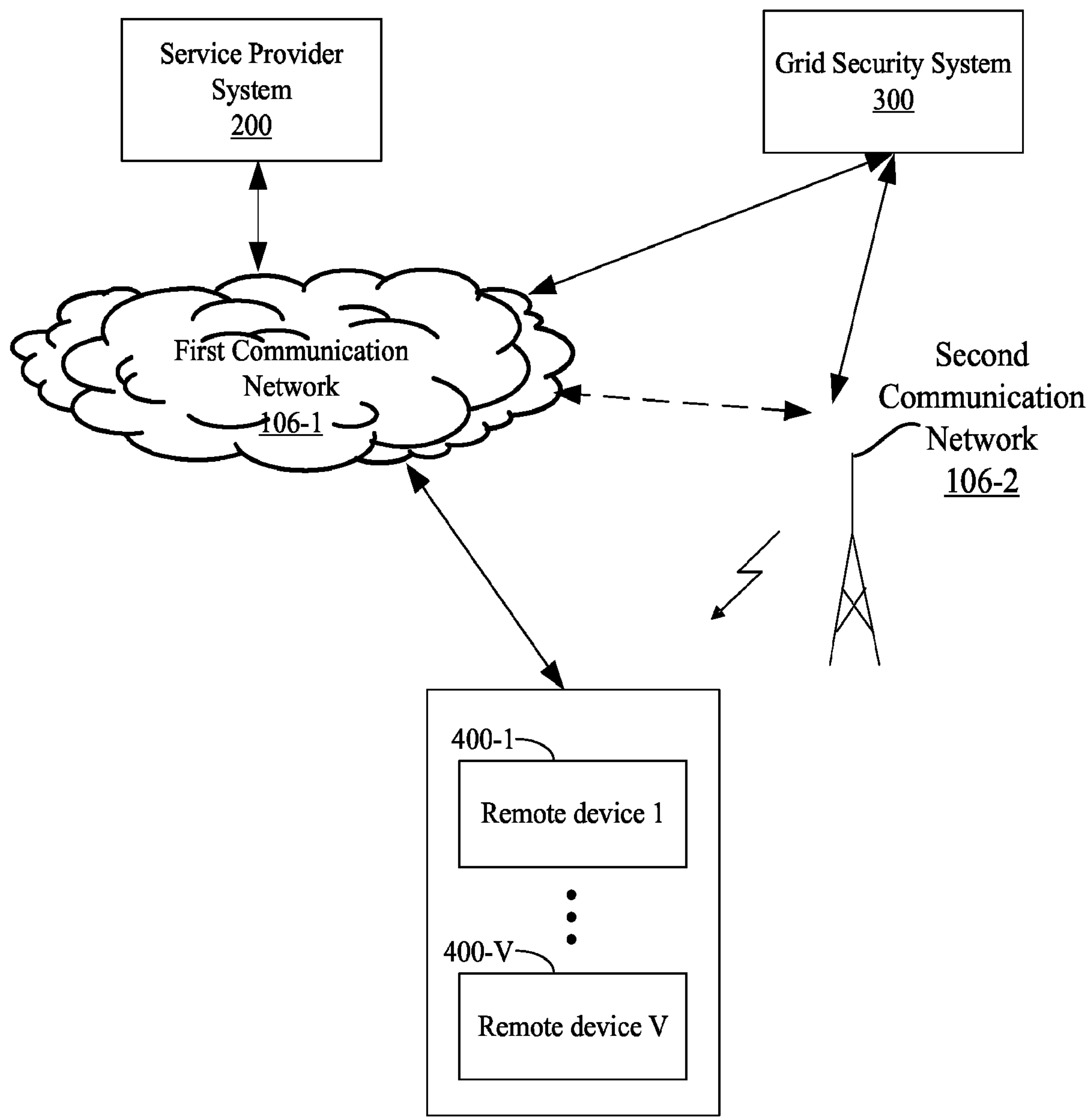
FIG. 1 illustrates an exemplary system topology including a service provider system, a grid security system, a plurality of communication networks, and a population of remote devices, in which dashed boxes represent optional elements in accordance with an embodiment of the present disclosure.

In the figures, reference numbers refer to the same or equivalent parts of the present invention throughout the several figures of the drawing.

DETAILED DESCRIPTION

The present disclosure provides systems, methods, and apparatuses that facilitate secure hybrid-based communications in order to protect a grid and optimize utilization of the grid. For instance, an aspect of the present disclosure is directed to providing a server computer system that includes one or more processors, and a first memory coupled to the one or more processors. The memory stores an agent that is executed by the one or more processors. The agent includes one or more instructions for facilitating the secure hybrid-based communications. Specifically, the agent includes one or more instructions for transmitting, via a first transmitter in a first network, on a first recurring basis, instructions for encoding a first signal to each remote receiver in a plurality of remote receivers. The first signal includes a first contemporaneous timestamp, a first unique composite identifier based, at least in part, on a first location of the first transmitter at a first time of the transmitting, and a message authentication component generated from a first cryptographic function. The agent further includes one or more instructions for obtaining, via a second network, from a second transmitter associated with a first service provider, on a second recurring basis a message signal. The message signal includes one or more service variables associated with a first service corresponding to a respective service provider and an encrypted unique identifier. Moreover, the agent includes one or more instructions for authenticating the encrypted unique identifier based on a comparison of the encrypted unique identifier against a plurality of stored unique identifiers in a lookup table. Each unique identifier stored in the lookup table corresponds to a different service provider in a one or more service providers that have a privilege to make use of the grid. Additionally, the agent includes one or more instructions for generating, in accordance with an authentication of the encrypted unique identifier, via a second cryptographic function, a second signal including an encoding of all or a subset of the one or more service variables, the encrypted unique identifier, and a second contemporaneous timestamp. Furthermore, the agent includes one or more instructions for transmitting, via the first network, instructions for encoding the second signal to each remote receiver in all or a subset of the plurality of remote receivers.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a unique composite identifier could be termed a second unique composite identifier, and, similarly, a second unique composite identifier could be termed a first unique composite identifier, without departing from the scope of the present disclosure. The first unique composite identifier and the second unique composite identifier are both unique composite identifiers, but they are not the same unique composite identifier.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

As used herein, the term "dynamic" means an ability to update a program while the program is currently running or an ability to manipulate a signal while the signal is currently transmitting.

Furthermore, as used herein, the term "vulnerability" refers to a weakness or exposure in computational logic (e.g., code) included in software modules and hardware components of a computer system.

Moreover, as used herein, the term "air-gap" means a software modules and hardware components of a computer system that is isolated from a communication network and prevented from establishing an external connection.

Additionally, the terms "client," "subject," and "user" are used interchangeably herein unless expressly stated otherwise.

Moreover, as used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: n≥2; n≥5; n≥10; n≥25; n≥40; n≥50; n≥75; n≥100; n≥125; n≥150; n≥200; n≥225; n≥250; n≥350; n≥500; n≥600; n≥750; n≥1,000; n≥2,000; n≥4,000; n≥5,000; n≥7,500; n≥10,000; n≥20,000; n≥40,000; n≥75,000; n≥100,000; n≥200,000; n≥500,000, $n \geq 1\times10^6$, $n \geq 5\times10^6$, or $n \geq 1\times10^7$. As such, the algorithms, models, regressors, and/or classifiers of the present disclosure cannot be mentally performed. In some embodiments, n is between 10,000 and $1\times10^7$, between 100,000 and $5\times10^6$, or between 500,000 and $1\times10^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

Furthermore, when a reference number is given an "$i^{th}$" denotation, the reference number refers to a generic component, set, or embodiment. For instance, a remote device termed "remote device i" refers to the $i^{th}$ remote device in a plurality of remote devices (e.g., a remote device 400-*i* in a plurality of remote devices 400).

In the present disclosure, unless expressly stated otherwise, descriptions of devices and systems will include implementations of one or more computers. For instance, and for purposes of illustration in FIG. 1, a remote device 400 is represented as single device that includes all the functionality of the remote device 400. However, the present disclosure is not limited thereto. For instance, the functionality of the remote device 400 may be spread across any number of networked computers and/or reside on each of several networked computers and/or by hosted on one or more virtual machines and/or containers at a remote location accessible across a communication network (e.g., communication network 106). One of skill in the art will appreciate that a wide array of different computer topologies is possible for the remote device 400, and other devices and systems of the preset disclosure, and that all such topologies are within the scope of the present disclosure.

FIG. 1 depicts a block diagram of a distributed grid system (e.g., distributed grid system 100) according to some embodiments of the present disclosure. The system 100 facilitates providing one or more services that is provided by one or more service providers (e.g., service provider 200 of FIG. 1) for a population of users (e.g., remote devices 400) by way of an electrical grid, hereinafter "grid." In this way, in some embodiments, the one or more services accessed, at least in part, through the grid include a financial service (e.g., transactions between a plurality of peers and/or a central financial entity), a communications service (e.g., a short message service (SMS)), a traffic service (e.g., an autonomous vehicle traffic network service), a utility service (e.g., a water utility service, an electrical utility service, a gas utility service, an internet utility service, etc.), a hazardous waste removal service, or the like. One of skill in the art will appreciate that a wide domain of services is applicable to the systems, methods, and apparatuses of the present disclosure.

More particularly, the system 100 provides security for a plurality of remote devices 400 that utilize the grid. Moreover, in some embodiments, the system 100 allows for optimization of the grid by transmitting, by instructions for encoding, information to the plurality of remote devices 400. In some embodiments, this transmitting of instructions for encoding information enables automatic demand response ("DR") at each response remote device 400. This automatic DR at each respective remote device 400 is enabled by evaluating one or more service variables associated with a corresponding service provided by the service provider system 200 and then transmitting of instructions for encoding this information from the evaluation to the plurality of remote devices 400. However, the present disclosure is not limited thereto.

In this way, the system 100 includes a plurality of communication networks 106 (e.g., first communication network 106-1 of FIG. 1, second communication network 106-2 of FIG. 1, etc.) that facilitate disseminating information within the system 100. As such, one of skill in the art will appreciate that other topologies of the system 100 are possible. For instance, in some embodiments, any of the illustrated devices and systems can in fact constitute several computer systems that are linked together in a network or be one or more virtual machines and/or one or more containers in a cloud-computing environment. Moreover, rather than relying on a first physical communication network 106-1, the illustrated devices and systems may wirelessly transmit information between each other. As such, the exemplary topology shown in FIG. 1 merely serves to describe the features of an embodiment of the present disclosure in a manner that will be readily understood to one of skill in the art.

In some embodiments, the communication network 106 optionally includes the Internet, one or more local area networks (LANs), one or more wide area networks (WANs), one or more terrestrial broadcast networks, one or more other types of networks, or a combination of such networks.

Examples of communication networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In some embodiments, the communication network 106 includes a wireless utility message channel (UMC) service, which is in the form of datacasting. Such datacasting is conveyed from a service provider system associated with a service provider, such as one or more utility companies or energy distributors, which acts as an administrator of the service provider system 200, for instance, using a wide-area wireless communication networks 106. Exemplary wide-area wireless communication network 106 employed within embodiments of the present disclosure include, but are not limited to: analog cellular (e.g., TIA 464B dual-tone multi-frequency, analog modem), digital cellular such as cellular digital packet data (CDPD), general packet radio services (GPRS), enhanced data rates for GSM evolution (EDGE), Mobitex, two-way paging (e.g., ReFlex), the Ardis network, satellite (e.g., TDM/TDMA X.25 VSAT networks), WiMAX (IEEE 802.16 MAN, hereby incorporated by reference), WiFi (802.11), and networked AM, FM, high definition radio, TV and satellite radio broadcast systems including any subsidiary communications multiplex operation subcarriers offered by any of the aforementioned systems. Dashboards having an FM radio receiver are particularly cost effective, with a cost in the range of tens of dollars or less. In preferred embodiments, the dashboard has an FM radio receiver that receives datacasting information through the Europe and RDS CENELEC standard and/or the North American RBDS NAB/EIA specification. As such, the home dashboard provides an economical way to get energy market information into consumers' homes without rewiring or electrical modification. RDS and RBDS is described in for example, Kopitz and Marks, 1999, "RDS: The Radio Data System," Artech House Publishers, Boston Massachusetts, print, which is hereby incorporated by reference in its entirety for all purposes.

In some embodiments, a respective device or system of the present disclosure includes an In-Band On-Channel (IBOC) receiver (e.g., receiver 298 of FIG. 2, receiver 498 of FIG. 4, etc.) for receiving datacasting information from digital signals that are broadcast as sideband transmissions bracketing the top and bottom of a host analog radio signal in order to make optimal usage of the current spectrum allocations. As such, IBOC refers to a method of transmitting instructions for encoding a digital radio broadcast signal centered on the same frequency as the AM or FM station's present frequency. For FM stations, the transmission of the digital signal occupies the sidebands above and below the center FM frequency (e.g., 97.9 MHz). AM band transmissions also place the digital signal in sidebands above and below the existing AM carrier frequency. By this means, the AM or FM station digital signal is transmitted in addition to the existing analog signal. One or both of the digital signal sidebands may carry UMC data to an IBOC receiver or transceiver, e.g., a receiver or transceiver embedded within or otherwise associated with an appliance. Additional details regarding IBOC systems may be found, for example, in U.S. Pat. No. 7,809,342 entitled "Systems and Methods for Providing Product Information of a Carrier Wave" which is hereby incorporated by reference in its entirety for all purposes. One skilled in the art will appreciate that, while a hybrid IBOC configuration is discussed above (e.g., analog and digital components), in some embodiments, the UMC signals and intercommunication of components of the present disclosure is transmitted in an all-digital IBOC configuration.

Now that a distributed grid system 100 has generally been described, an exemplary service provider system 200 for providing a service by having a privilege to make use of the grid will be described with reference to FIG. 2.

In various embodiments, the service provider system 200 includes one or more processing units (CPUs) 274, a network or other communications interface 284, and memory 292.

The service provider system 200 includes a receiver and/or a transmitter 298, hereinafter a "transceiver 298." The transceiver 298 includes a receiver for receiving signals and a transmitter for transmitting signals with instructions for encoding information that is disseminated across the grid (e.g., signals generated by signal generator 230 of FIG. 2, signals generated by signal generator 330 of FIG. 3, signals generated by signal generator 430 of FIG. 4, etc.). The CPU 274 (or a microprocessor embedded in an application associated with the remote device 400) includes instructions for receiving, via the receiver, broadcasted radio signals that include electrical grid data, and instructions for communication, via the transmitter, information about an electrical load of the household electrical apparatus. In preferred embodiments, the receiver is an RDS/RBDS or IBOC receiver capable of receiving signals transmitted from an RDS/RBDS or IBOC transmitter.

In some embodiments, a transceiver 298 is embedded in a household appliance and facilitates Time Division Duplex (TDD) of an air medium to affect half duplex communication on a common sub-carrier frequency. In some embodiments, the transceiver 298 facilitates time division multiplexing of an air medium to affect half duplex intercommunication between three or more transceivers on a common sub-carrier frequency. In some embodiments, the transceiver 298 employs Carrier Sense Multiple Access with Collision Avoidance (CSMA/CA) to effect time division multiplexing of the air medium. In some embodiments, the transceiver 298 facilitates Frequency Division Multiplexing (FDM) of the air medium to affect half duplex intercommunication between three or more transceivers on different sub-carrier frequencies. In some embodiments, the transceiver 298 facilitates a Zigbee Protocol Stack.

In some embodiments, an uplink backhaul apparatus includes a transceiver 298 including a receiver for receiving household electrical load data from a plurality of nodes over a wireless connection, and a transmitter for transmitting instructions for encoding pooled household electrical load data from the plurality of nodes. In some embodiments, the wireless connection is a connection to a personal area network or a local area network, e.g., for communicating electrical load data between nodes and appliances with nodes. In some embodiments, the transmitter 298 transmits the household electrical load data over the Internet, a PSTN network, a paging network, a satellite communication network, a cellular phone network, an RDS radio signal, an IBOC radio signal.

Memory 292 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 292 may optionally include one or more storage devices remotely located from the CPU(s) 274. Memory 292, or alternatively the non-volatile memory device(s) within memory 292, includes a non-transitory computer readable storage medium. Access to memory 292 by other components of the service provider system 200, such as the CPU(s) 274, is, optionally, controlled by a controller. In some embodiments, memory 292 can include mass storage that is remotely located with respect to the CPU(s) 274. In other words, some data stored in memory 292 may in fact be hosted on devices that are external to the service provider system 200, but that can be electronically accessed by the service provider system 200 over an Internet, intranet, or other form of network 106 or electronic cable using communication interface 284.

In some embodiments, the memory 292 of the service provider system 200 for providing a service via the grid stores:

- an operating system 208 (e.g., ANDROID, iOS, DARWIN, RTXC, LINUX, UNIX, OS X, WINDOWS, or an embedded operating system such as VxWorks) that includes procedures for handling various basic system services;
- an electronic address 210 associated with the service provider system 200 that identifies the service provider system 200;
- an identifier generator module 220 that generates a unique identifier (e.g., unique identifier 352 of FIG. 3) for the service provider system 200 that in accordance with one or more instructions;
- a signal generator module 230 for generating one or more signals that is transmitted over a respective communication network 106;
- an account repository 240 that stores a plurality of account constructs 242 that each correspond to an account held by a user with the service provider system 200; and
- a service repository 250 that stores information associated with one or more services 252 provided by the service provider system 200 that includes one or more service variables 254 associated with a respective service 252 in the one or more services 252.

An electronic address 210 is associated with the service provider system 200. The electronic address 210 is utilized to at least uniquely identify the service provider system 200 from other devices and components of the distributed system 100. For instance, in some embodiments, the electronic address 210 associated with the service provider system 200 includes a contact phone number, a social media account, an e-mail address, or the like.

An identifier generator module 220 is configured to generate one or more unique identifiers that uniquely identify the service provider system 200 in accordance with one or more instructions that form the basis for generating the one or more unique identifiers. For instance, referring briefly to FIG. 9, in some embodiments, a respective device or system of the distributed grid system 100 (e.g., service provider system 200 of FIG. 2, grid security system 300 of FIG. 3, remote device 400 of FIG. 4, etc.) includes identifier generator module 220 that facilitates generating a unique composite identifier (e.g., unique identifier 352 of FIG. 3) for the respective device or system. This unique composite identifier is based at least in part on a location of a respective transmitter (e.g., transceiver 298 of FIG. 2, transceiver 398 of FIG. 3, transceiver 498 of FIG. 4, transceivers 498 of FIG. 8, etc.), such that a respective unique composite identifier 352 generated by the identifier generator module 220 includes a plurality of measured signal qualities (e.g., terrestrial broadcast network 106 signal qualities) that collectively represent a frequency spectrum. In this way, the respective unique composite identifier is a unique location dependent, geometric signature that is based on a spectral vector. As depicted by chart 900 of FIG. 9, each series, which is taken after approximately 3,500 samples obtained about 1 hour apart, the generating of a respective unique composite identifier 352 includes variance that is caused by changing environmental conditions, such as slight deviations in relative positioning, deviations in atmospheric conditions (e.g., humidity, pressure, etc.). Specifically, in FIG. 9, a plurality of series lines is overlaid onto chart 900 to depict a variance between each series line. Here, the variance between at least series line 55 and series line 157 in the plurality of series lines is depicted at approximately 890 megahertz (MHz). In such embodiments, this variance in the generating of the respective unique composite identifier 352 is advantageous if a tolerance of such variance is defined. Accordingly, the variance provides a security mechanism by preventing an unauthorized user of the grid, such as a user spoofing an identify of the service provider system 200, from producing an identical copy of a unique composite identifier 352 previously generated by the identifier generator module 220 that is otherwise impossible to subsequently generate due to such variance.

A signal generator module 230 is configured to generate one or more signals for transmission by the transceiver 298 over one or more communication networks 106. For instance, in some embodiments, in order to broadcast a signal over a respective communication network 106, the signal must be generated in adherence of one or more communications protocols. By way of example, in some embodiments, the signal generator module 230 generates a signal in accordance with a radio data system (RDS) standard and/or a digital audio broadcast (DAB) standard. In some embodiments, the signal generator module provides one or more demodulation parameters used by a respective receiver to demodulate a signal generated by the signal generator module. Moreover, in some embodiments, the signal generator module 230 is utilized to modulate (e.g., used to modulate digital information of a side data component onto a radio frequency carrier of a main signal component). Additional details and information regarding the modulation of the signal using the signal generator module 230 is found at U.S. Patent Publication No.: 2005/0003772 A1, entitled "IBOC Broadcast Receiver," published Jan. 6, 2005, which is hereby incorporated by reference in its entirety for all purposes. By utilizing the signal generator module 230, the service provider system 200 is capable of transmitting instructions for encoding information and disseminating information within the grid.

Additional details and information regarding the generating of unique composite identifiers and transmitting such information is found at U.S. Pat. No. 9,830,629, entitled, "Systems and Methods for Providing Messages to Devices Using a Carrier Signal," which is a continuation of U.S. Pat. No. 9,419,664, which is a continuation of U.S. Pat. No. 8,892,064, which is a continuation of U.S. Pat. No. 8,265,576, which is a continuation of U.S. Pat. Nos. 7,809,342; and 9,830,629, entitled "Systems and Methods for Conveying Utility Information," filed Sep. 12, 2016, which is a continuation of U.S. Pat. No. 9,443,417, which is a continuation of U.S. Pat. No. 8,665,111, which is a continuation of U.S. Pat. No. 8,183,995, which is a national phase application of PCT Application No.: PCT/US2006/008705, filed Mar. 8, 2006, which claims priority to U.S. Patent Application No. 60/659,455, filed on Mar. 8, 2005 and U.S. Patent Application No. 60/679,439, filed May 9, 2005, each of which is hereby incorporated by reference herein in its entirety for all purposes.

Figure 2:
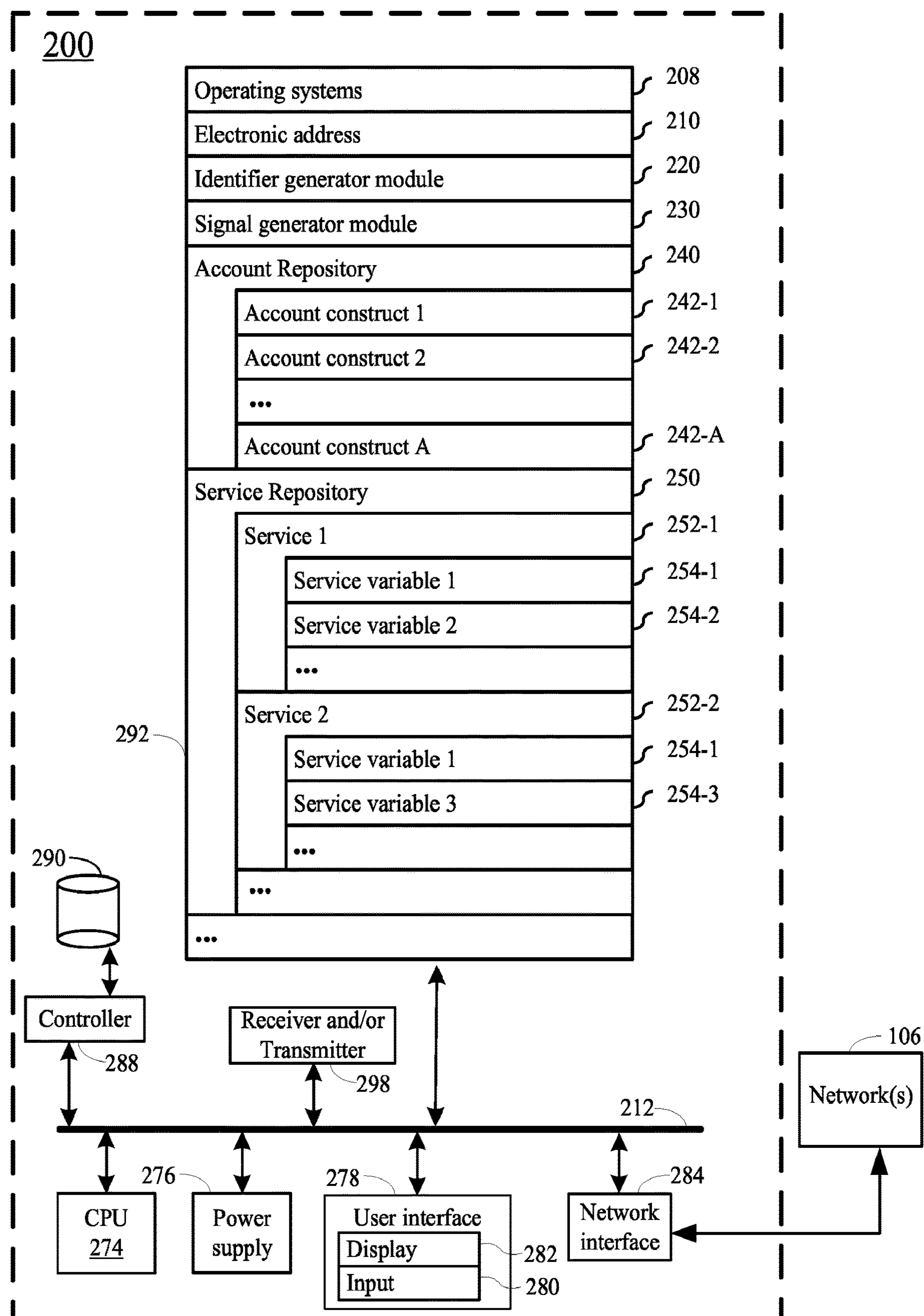
FIG. 2 illustrates various modules and/or components of a service provider system, in accordance with an embodiment of the present disclosure.

An account repository 240 retains a plurality of account constructs 242 (e.g., first account construct 242-1, second account construct 242-2, . . . , account construct A of FIG. 2). Each respective account construct 242 corresponds to an account held by a subject (e.g., user of a respective remote device 400) with the service provider that is associated with the service provider system 200. In some embodiments, each respective account construct 242 includes a contact address of the user (e.g., electronic address 410 of remote device 400 of FIG. 4). In some embodiments, each respective account construct 242 includes a physical address of the user, such as a particular street address where a service 252 is consumed by the user (e.g., home address) or a geographical region associated with the user (e.g., a municipal region associated with consumption of the service, a service provider region associated with consumption of the service, etc.). By retaining a physical address associated with the user, the service provider system 200 can tailor providing a service 252 to the user based on the physical address, such as configuring a respective service variable 254 based on the physical address.

In some embodiments, a respective account construct 242 includes one or more unique identifiers 352 associated with the subject that holds a corresponding account with the service provider system 200. For instance, in some embodiments, the account construct 242 includes a unique composite identifier 352 that is generated at a remote device associated with the subject, such as a spectral vector and a defined tolerance of variance in the spectral vector. Accordingly, the service provider system 200 is enabled to authenticate a transmission initiated by the remote device by comparison of the unique composite identifier 352 that is generated at the remote device against the one or more unique identifiers stored by way of the account construct 242.

A service repository 250 retains information pertaining to one or more services 252 provided by the service provider system 200. In some embodiments, the one or more services 252 include an industrial production service, a water treatment service, a transportation service, or an energy management service. For instance, in some embodiments, the service provider system 200 offers a plurality of services 252 including a first service 252-1, such as an electricity utility service, and a second service 252-2, such as natural gas utility service. In some embodiments, a respective service 252 includes an energy production service 252, a production enablement service 252, a consumer service 252, the transportation service 252, for example, a hydraulic energy-related system service 252, a heat-based energy-related system service, and other possible energy-related or power-related system services 252. However, the present disclosure is not limited thereto. For instance, in alternative embodiments, the service provider system offers a plurality of services 252 including a third financial transaction service 252-3 that allows a user of a remote device to bank with the service provider, a fourth brokerage service 252-4 that allows the user of the remote device to exchange securities through the service provider system 200, and the like.

The service repository 250 includes a plurality of service variables 254 associated with a respective service 252. Specifically, each service variable 254 describes quantifiable characteristic related to providing and/or consuming a corresponding service 252. In some embodiments, a respective service variable 254 has a mutually exclusive relationship with the corresponding service 252, such that the respective service variable 254 is utilized exclusively with providing the corresponding service 252. However, the present disclosure is not limited thereto. For instance, in some embodiments, a respective service variable 254 is associated with at least two corresponding services 252, such as a third service variable 254-3 associated with both the first service 252-1 and the second service 252-2. By way of example, consider the third service variable 254-3 as a function that devices price of a respective service 252 based on a physical address of a user and a projected usage of the service over a future period of time at the physical address of the user. In some embodiments, the respective service variable 254 is a grid status, an energy tariff, a consumer relationship management (CRM) information, or a combination thereof. In some embodiments, a respective service variable 254 is a real-time value or a projected (e.g., speculative) value.

In some embodiments, the respective service variable 254 is associated with a financial service 252, and thus describes a quantifiable aspect of the financial service 252. For instance, in some embodiments, the respective service variable 254 includes a transaction identifier (e.g., a transaction sequence number), an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction enacted within the grid.

Each of the above identified modules and applications correspond to a set of executable instructions for performing one or more functions described above and the methods described in the present disclosure (e.g., the computer-implemented methods and other information processing methods described herein; method 500 of FIG. 5; method 600 of FIG. 6, etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 292 stores additional modules and data structures not described above.

It should be appreciated that the service provider system 200 of FIG. 2 is only one example of a service provider system 200, and that the service provider system 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

Figure 3:
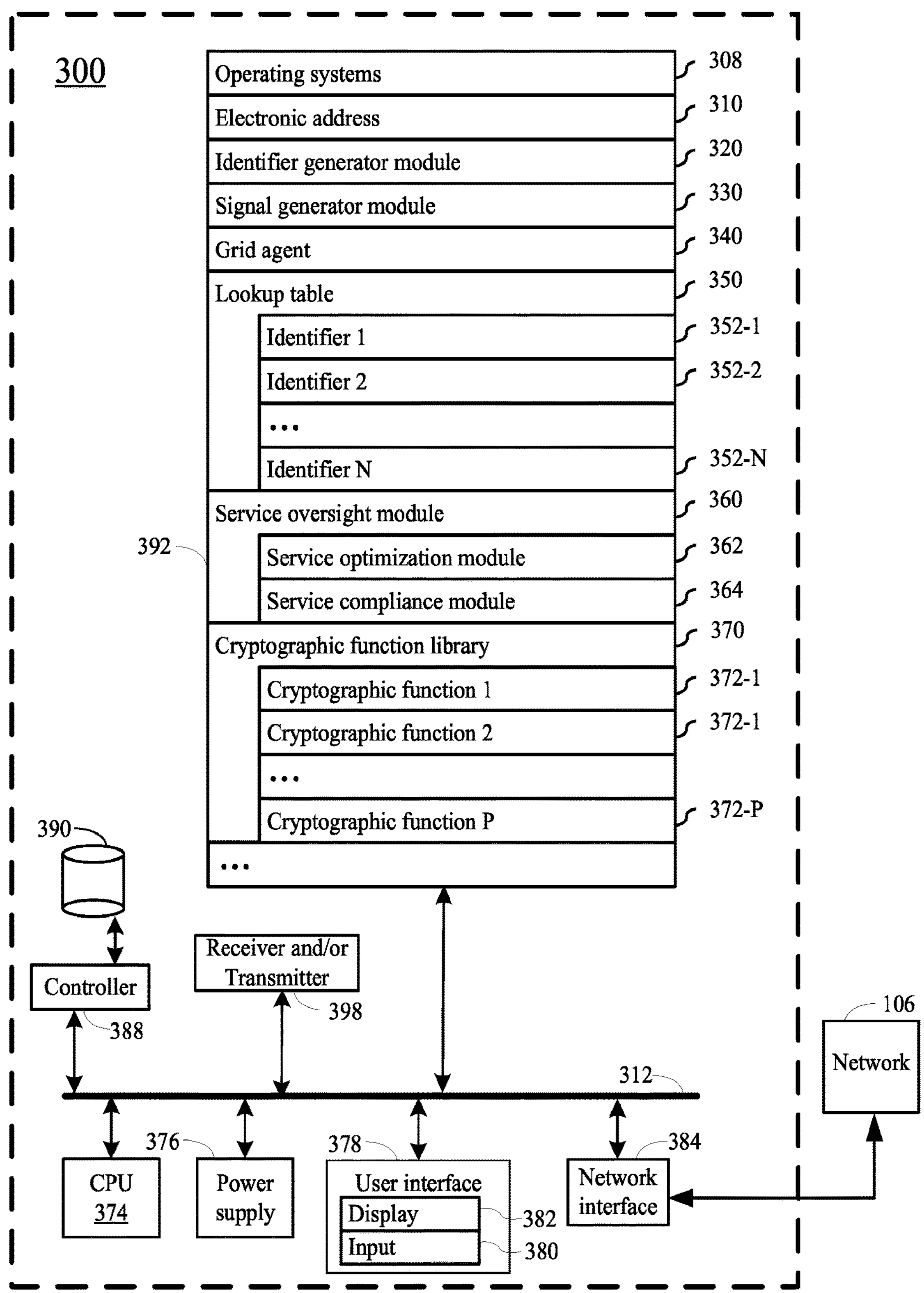
FIG. 3 illustrates various modules and/or components of a grid security system, in accordance with an embodiment of the present disclosure.

Referring to FIG. 3, in various embodiments, a grid security system (e.g., grid security system 300 of FIG. 1) includes one or more processing units (CPUs) 374, a network or other communications interface 384, and a memory 392.

The memory 392 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 392 may optionally include one or more storage devices remotely located from the CPU(s) 374. Memory 392, or alternatively the non-volatile memory device(s) within memory 392, includes a non-transitory computer readable storage medium. Access to memory 392 by other components of the grid security system 300, such as the CPU(s) 374, is, optionally, controlled by a controller. In some embodiments, memory 392 can include mass storage that is remotely located with respect to the CPU(s) 374. In other words, some data stored in memory 392 may in fact be hosted on devices that are external to the grid security system 300, but that can be electronically accessed by the grid security system 300 over an Internet, intranet, or other form of communication network 106 or electronic cable using communication interface 384.

In some embodiments, the memory 392 of the grid security system 300 for providing security of a grid stores:

- an operating system 308 (e.g., ANDROID, iOS, DARWIN, RTXC, LINUX, UNIX, OS X, WINDOWS, or an embedded operating system such as VxWorks) that includes procedures for handling various basic system services;
- an electronic address 310 associated with grid security system 300 that identifies the grid security system 300;
- an identifier generator module 320 that generates a unique identifier for the grid security system 300 in accordance with one or more instructions;
- a signal generator module 330 for generating one or more signals for transmission over a respective communication network 106;
- a grid agent 340 that provides security and oversight for transmissions across the grid and actions performed at the grid security system 300;
- a lookup table 350 that includes a plurality of identifiers 352 stored at the grid security system, which form a basis for a comparison against one or more obtained unique identifiers;
- a service oversight module 360 that includes a service optimization module 362 for evaluating one or more service variables (e.g., service variables 254 of FIG. 2) in order to increase optimization of the grid and/or instruction one or more remote receivers (e.g., transceiver 498 of FIG. 4, transceivers 498 of FIG. 8), and a service compliance module 364 for ensuring compliance and consistency across the grid; and
- a cryptographic function library 370 that stores one or more cryptographic functions 372 that form a basis for a cryptographic protocol used within the grid.

An electronic address 310 is associated with the service provider system 200. The electronic address 310 is utilized to at least uniquely identify the grid security system 300 from other devices and components of the distributed system 100. In some embodiments, the electronic address 310 of the grid security system 300 provides similar functionality as the electronic address 210 of the service provider system 200.

An identifier generator module 320 is configured to generate one or more unique identifiers that uniquely identify the grid security system 300 in accordance with one or more instructions that form the basis for generating the one or more unique identifiers. In some embodiments, the identifier generator module 320 of the grid security system 300 provides similar functionality as the identifier generator module 220 of the service provider system 200.

A signal generator module 330 is configured to generate one or more signals for transmission over one or more communication networks 106. For instance, in some embodiments, in order to broadcast a signal over a respective communication network 106, the signal must be generated in adherence of one or more communications. By way of example, in some embodiments, the signal generator module 330 generates a signal in accordance with a radio data system (RDS) standard and/or a digital audio broadcast (DAB) standard. In some embodiments, the signal generator module 330 of the grid security system 300 provides similar functionality as the signal generator module 230 of the service provider system 200.

A grid agent 340 allows the grid security system 300 to secure a plurality of communications within the grid and secure usage of services provided through the grid. Specifically, the grid agent 340 stores one or more instructions (e.g. one or more instructions to conduct method 500 of FIG. 5, one or more instructions to conduct method 600 of FIG. 6, etc.) that perform the systems and methods of the present disclosure. In this way, in some embodiments, the grid agent 340 initiates conversation with the service provider system 200 and/or a plurality of remote devices 400 in order to pulls information and/or obtains information from the service provider systems 200 and/or the plurality of remote devices 400 about one or more services 252 provided through the grid or a status of an appliance that utilizes the grid. As such, the grid agent 340 monitors and controls security of the grid security system 300 and communications through a plurality of communication networks 106.

In some embodiments, an administrator of the grid security system 300 controls the grid agent 340 in order to implement a service utilization policy within the grid. In alternative embodiments, the grid agent 340 allows the administrator of the grid security system 300 to implement a plurality of service utilization policies, each of which is intended to control a particular domain associated with providing a service 252 through the grid. In this way, the grid agent 340 can facilitate a one to many relationships when implementing multiple service utilization policies across the grid, while also providing security for the grid. In this way, in some embodiments, the grid agent 340 acts in coordination with a service oversight module 360 in order to ensure compliance and service utilization efficiency when implementing the service policies and providing security across the grid.

The grid security system 300 includes a mechanism that allows the grid security system 300 to verify an identity of a source of a communication that is pulled by and/or obtained by the grid security system 300. For instance, in some embodiments, the grid security system 300 include a lookup table (e.g., lookup table 350 of FIG. 3) that stores one or more identifiers (e.g., first identifier 352-1, second identifier 352-2, . . . , identifier N 352-N). In some embodiments, a respective identifier 352 of the lookup table 350 is initially generated by the identifier generator module 320 and then stored at the lookup table 350. However, the present disclosure is not limited thereto.

In some embodiments of the present disclosure, the lookup table 350 includes a common table of a plurality of identifiers 352, which act as keys. For example, in some embodiments, each identifier 352 in lookup table 350 has a corresponding display text that is displayed (e.g., via display 482 of remote device 400 of FIG. 4) when a signal including the respective identifier 352 is received by a transceiver 498. In some embodiments, the lookup table 350 in accordance has a structure illustrated in Table 1.

TABLE 1

| Exemplary Lookup Table 350 | |
|---|---|
| Identifier 352 | Display text |
| 101010193010101 | Please turn off laundry machines between 5 PM and 8 PM tomorrow. |
| . | . |
| . | . |
| . | . |
| 101010193010102 | Please inspect your Tesla for a status issue. |

In some embodiments, all that is required in a signal is a respective identifier 352. In other words, no display text or code need be present in a broadcast transmission. In such embodiments, when a transceiver 498 receives a signal that includes the identifier (e.g., message signal of FIG. 7) found in the lookup table 350, a controller (e.g., controller 490 of FIG. 4) obtains a corresponding display text in the lookup table 350 that is associated with the respective identifier 352 and displays it on the display 482. Thus, in some embodiments, Table 1 provides a way to significantly reduce the size of targeted broadcast transmissions.

In some embodiments, a display text is only displayed at a display 482 when one or more combinations of identifiers 352 is present in a signal. For example, in some embodiments, the lookup table 350 has the form illustrated in Table 2.

TABLE 2

| Exemplary Lookup Table 350 | |
|---|---|
| Identifier | Code |
| 101010193010101 AND 101010193010102 | Please reconnect the EVSE to your EV. |
| . | . |
| . | . |
| . | . |
| 101010193010101 OR 101010193010102 | Warming, EVSE shutoff due to high temperature! |

Figure 12:
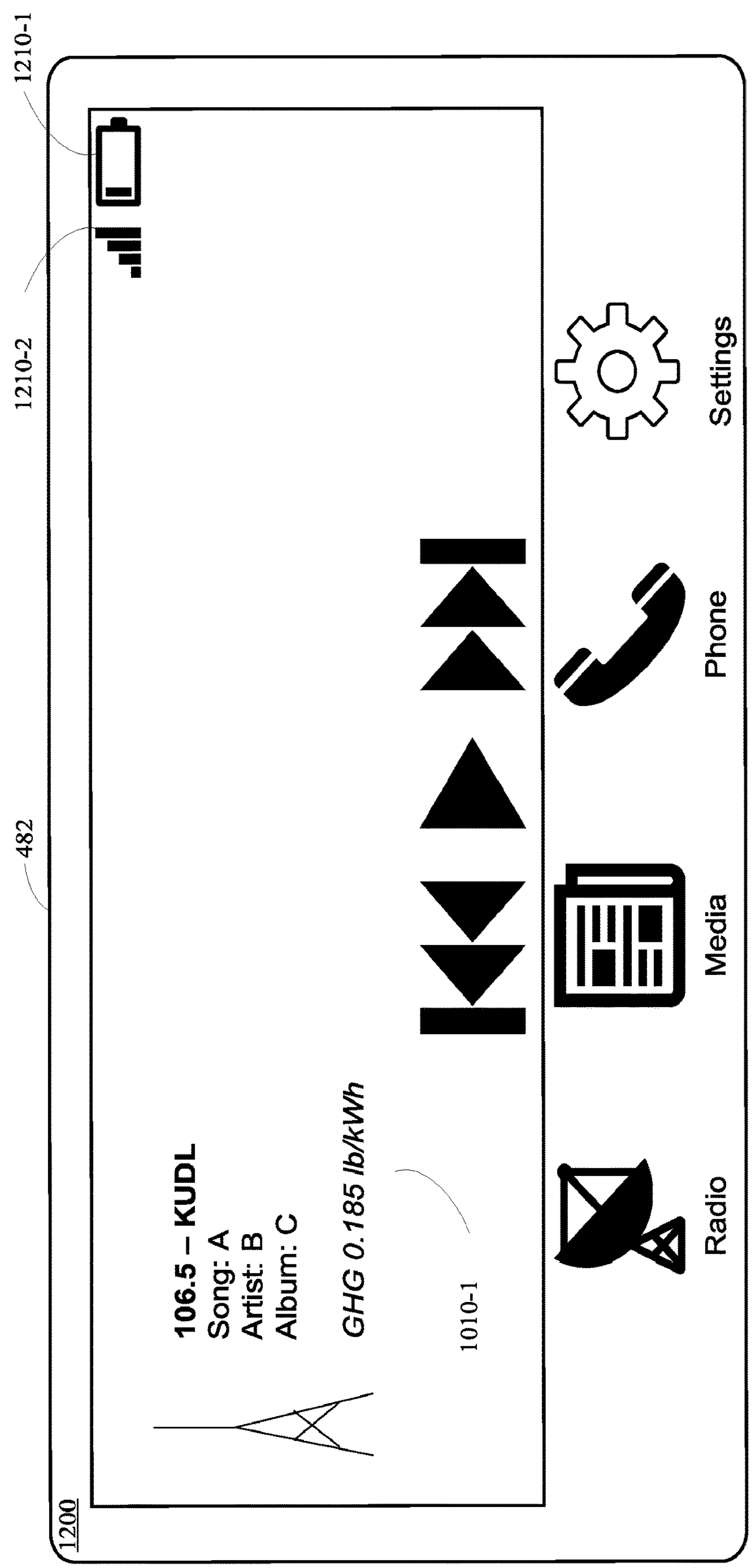
FIG. 12 illustrates a user interface presented through a display of an electric vehicle system appliance, in which the user interface provides a visualization of at least one or more service variables associated with a first service corresponding to a respective service provider of a utility energy grid, in accordance with an embodiment of the present disclosure.

In any of the above identified embodiments, complex identifier 352 requirements (or complex code requirements when logic is placed in the lookup table 350) is constructed using logical expressions found in an identifier 352 requirements portion of the lookup table 350. Referring briefly to FIG. 12, a chart 1200 of some exemplary logical expressions that can be used to determine whether a given display text will be displayed on output of the display 482 are provided.

In some embodiments, the lookup table 350 updates the one or more stored identifiers in accordance with obtaining an instruction for the update. In alternative embodiments, the lookup table 350 statically stores the one or more identifiers, which effectively airgap the lookup table in order to prevent unauthorized updates to the one or more stored identifiers. Each identifier 352 that is stored by the lookup table 350 is validated as a trusted source, which allows for future communications that is associated with a respective identifier 352 obtained through a communication network 106 to be validated when the respective identifier 352 matches a stored identifier 352 of the lookup table 350.

In some embodiments, the grid security system 300 includes a service oversight module 360. In some embodiments, the service oversight module 360 includes a service optimization module 362 and/or a service compliance module 364.

The service optimization module 362 includes one or more computational models that is configured to evaluating one or more service variables (e.g., service variables 254 of FIG. 2) obtained by the grid security system (e.g., block 506 of FIG. 5). For instance, in some embodiments, the service optimization module 362 includes a first computational model that conducts a linear space optimization on the one or more service variables 254 before transmitting instructions for encoding a result of this optimization to a plurality of receivers (e.g., receiver 498 of remote device 400 of FIG. 4, receivers 498 of remote devices 400 of FIG. 8, etc.). By performing a linear space optimization, the result can be seamlessly input into various data structures as a computational value, which reduces a computational burden on the grid security system 300. Moreover, this allows for increasing the computational burden that is then distributed on the plurality remote devices 400, which increases an efficiency of the grid.

Furthermore, in some embodiments, the service optimization module 362 receives transmissions from a respective remote device 400 in the plurality of remote devices 400 that includes feedback associated with usage of a service 252, such as an amount of carbon dioxide produced by using the service 252, a value of currency spent or saved by using the service 252, and the like, such as one or more data constructs obtained from a sensor (e.g., sensor 496 of FIG. 4) coupled to the respective remote device 400.

The service compliance module 364 is configured to ensure that information and transmissions disseminated within the grid are in compliance with one or more protocols. In some embodiments, an administrator of the grid security system defines a respective protocol, such as a first protocol that is configured to detect one or more anomalies in the one or more service variables 254 obtained from the service provider system 200.

A cryptographic function library retains one or more cryptographic functions (e.g., first cryptographic function 372-1, second cryptographic function 372-2, . . . , cryptographic function P 372-P) that defines a protocol for accessing and/or authenticating information disseminated across the grid. In some embodiments, each respective cryptographic function 372 is a cryptographic primitive, which is a secure function that defines all or a portion of the protocol for encrypting and/or decrypting a data contract (e.g., signal transmission). For instance, in some embodiments, a respective cryptographic function includes a one-way hash function, a symmetric key, a public key, a private key, and the like. Additional details and information regarding cryptographic primitives as a component of a cryptographic function 372 is found at Blum et al., 1993, "Cryptographic Primitives Based on Heard Learning Problems," Annual International Cryptology Conference, pg. 278; Applebaum et al., 2009, "Fast Cryptographic Primitives and Circular-Secure Encryption Based on Heard Learning Problems," Annual International Cryptology Conference, pg. 595; Shim et al., 2015, "A Survey of Public-Key Cryptographic Primitives in Wireless Sensor Networks," IEEE Communications Surveys & Tutorials, pg. 577; Preneel et al., 1998, "Cryptographic Primitives for Information Authentication—State of the Art," State of the Art in Applied Cryptographic, pg. 49; Schneier, Applied Cryptography: Protocols, Algorithms, and Source Code in C, Second Edition, 1996, John Wiley & Sons, Inc.; Ferguson and Schneier, Practical Cryptography, 2003, Wiley Publishing Inc., Indianapolis, Ind.; Hershey, Cryptography Demystified, 2003, The McGraw-Hill Companies, Inc; Held & Held, Learn Encryption Techniques with BASIC and C++, 1999, Wordware Publishing, Inc., Plan Texas; Singh, The Code Book: The Science and Secrecy from Ancient Egypt to Quantum Cryptography, 1999, Random House, Inc., New York; Mao, Modern Cryptography: Theory and Practice, HP Invent, Palo Alto, Calif.; Menezes et al., Handbook of Applied Cryptography, 1996, CRC Press; Kaufman et al., Network Security Private Communication in a Public World, 1995, Prentice-Hall, Inc., Upper Saddle River, N.J.; and Binstock and Rex, Practical Algorithms for Programmers, 1995, Chapter 3, Addison-Wesley, Reading, Mass., each of which is hereby incorporated by reference in its entirety for all purposes.

However, one of skill in the art will appreciate that the present disclosure is not limited thereto. For instance, in some embodiments, a respective cryptographic function 372 is an advanced cryptographic protocol, such as a first protocol that includes multiple cryptographic primitives. As a non-limiting example, in some embodiments, the respective cryptographic function 372 is a zero knowledge (ZK) protocol, which is a satisfiable cryptographic function 372 without a requirement to reveal a property of the cryptographic function 372. By way of example, in some embodiments, the ZK protocol of the respective cryptographic function 372 is scalable, transparent ZK argument of knowledge (ZK-STARK) protocol. Additional details and information regarding the ZK cryptographic functions 372 is found at Goldreich et al., 1986, "How to prove all NP statements in zero-knowledge and a methodology of cryptographic protocol design," Conference on the Theory and Application of Cryptographic Techniques, print; Goldreich et al., 1994, "Definitions and Properties of Zero-Knowledge Proof Systems," Ben-Sasson et al., 2018, "Scalable, Transparent, and Post-Quantum Secure Computational Integrity," IACR Cryptol. ePrint Arch, pg. 46, each of which is hereby incorporated by reference in its entirety for all purposes.

As another non-limiting example, in some embodiments, the respective cryptographic function 372 is a homomorphic encryption protocol, which allows for the encryption of information and subsequent processing of the encrypted information (e.g., decryption) at a remote device 400. Said otherwise, a homomorphic cryptographic function 372 allows for computational analysis (e.g., additional, multiplication, comparisons, etc.) to be performed at the remote device 400, in which the computation al analysis is conducted on encrypted data without a requirement to decrypt the data at the remote device. Additional details and information regarding a homomorphic cryptographic function 372 is found at Henry, K., 2008, "The Theory and Applications of Homomorphic Cryptography," Master's Thesis, University of Waterloo, print; Arasu et al., 2013, "Orthogonal Security with Cipherbase," CIDR, print, which is hereby incorporated by reference in its entirety for all purposes. In this way, the homomorphic cryptographic function 372 allows the systems, methods, and apparatuses of the present disclosure to utilized the superior processing power of the collective plurality of remote devices 400 in order to optimize utilization of a service 252 within the grid, as opposed of having to conduct each optimization computation for each respective remote device 400 in the plurality of remote devices 400 at the grid security system 300.

Importantly, each cryptographic function 372 provides a unique protocol for securing communications and remissions within the grid as well as actions at a respective device or system of the grid. In this way, the grid security system 300 utilizes multiple cryptographic functions 372, which allows for orthogonal security mechanisms to be used with the systems, methods, and apparatuses of the present disclosure.

An advantage of such cryptographic functions 372 is that the cryptographic functions 372 ensure privacy of transmissions provided the grid security system 300 and such cryptographic functions 372 prevents hacking of the grid security system 300. By way of example, in some embodiments, a respective cryptographic function 372 provides a message authentication component for a respective signal, which is a cryptographic cipher used by an agent (e.g., appliance agent 440 of FIG. 4) in order to authenticate the respective signal. As a non-limiting example, in some embodiments, the respective cryptical function 372 is a message authentication code (MAC) component. Additional details and information regarding message authentication component cryptographic functions 372 is found at Krovetz et al., 2006, "UMAC: Message Authentication Code Using Universal Hashing," RFC 4418, which is hereby incorporated by reference in its entirety for all purposes.

Additional details and information regarding use of suitable cryptographic functions 372 is found at Schneier, Applied Cryptography: Protocols, Algorithms, and Source Code in C, Second Edition, 1996, John Wiley & Sons, Inc.; Ferguson and Schneier, Practical Cryptography, 2003, Wiley Publishing Inc., Indianapolis, Indiana; Hershey, Cryptography Demystified, 2003, The McGraw-Hill Companies, Inc; Held & Held, Learn Encryption Techniques with BASIC and C++, 1999, Wordware Publishing, Inc., Plan Texas; Singh, The Code Book: The Science and Secrecy from Ancient Egypt to Quantum Cryptography, 1999, Random House, Inc., New York; Mao, Modern Cryptography: Theory and Practice, H P Invent, Palo Alto, California; Menezes et al., Handbook of Applied Cryptography, 1996, CRC Press; Kaufman et al., Network Security Private Communication in a Public World, 1995, Prentice-Hall, Inc., Upper Saddle River, New Jersey; and Binstock and Rex, Practical Algorithms for Programmers, 1995, Chapter 3, Addison-Wesley, Reading, Massachusetts, each of which is hereby incorporated by reference in its entirety for all purposes.

Each of the above identified modules and applications correspond to a set of executable instructions for performing one or more functions described above and the methods described in the present disclosure (e.g., the computer-implemented methods and other information processing methods described herein; method 500 of FIG. 5; method 600 of FIG. 6, etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 392 optionally stores a subset of the modules and data structures identified above. Furthermore, in some embodiments, the memory 392 stores additional modules and data structures not described above.

It should be appreciated that the grid security system 300 of FIG. 3 is only one example of a grid security system 300, and that the grid security system 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Figure 4:
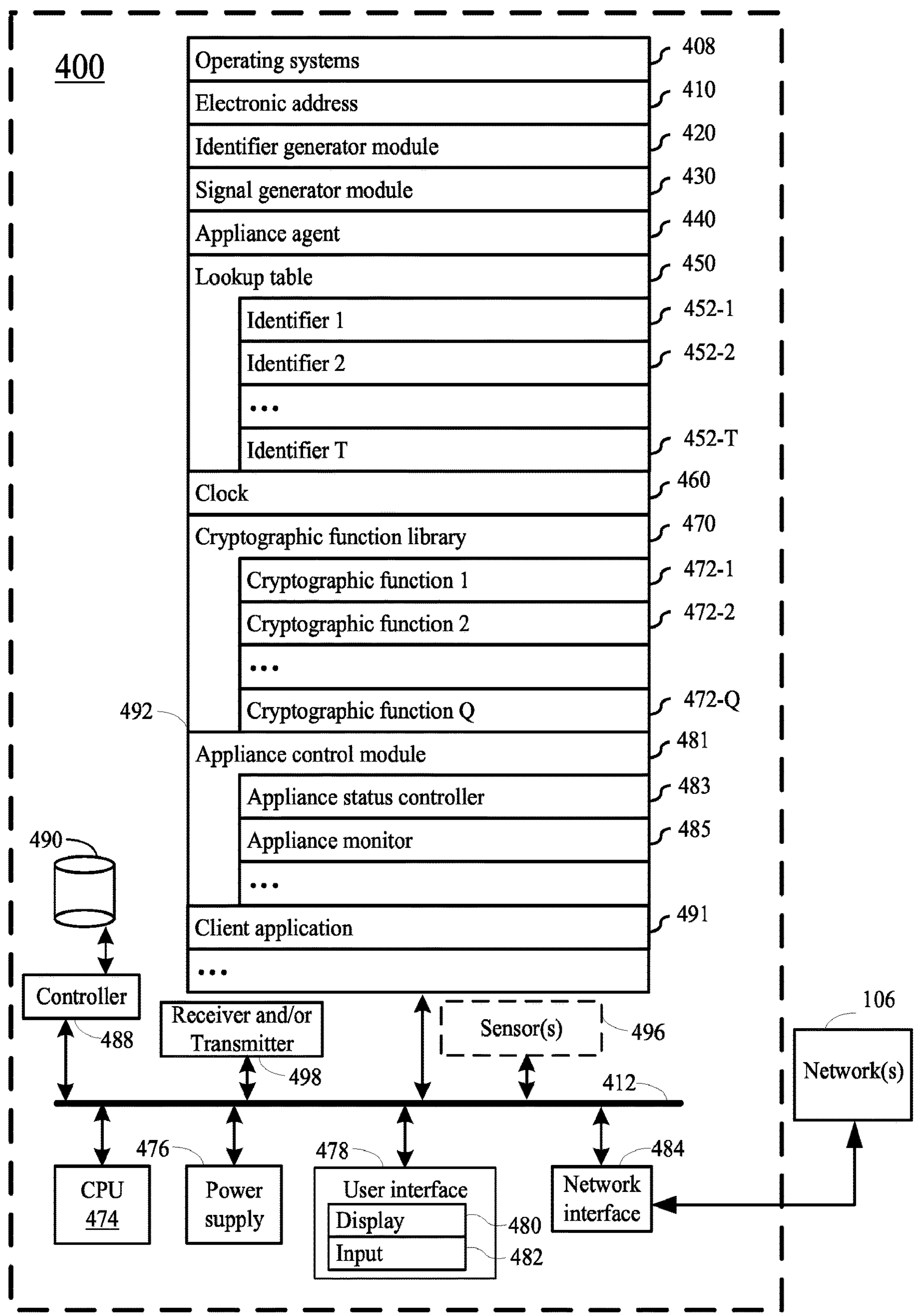
FIG. 4 illustrates various modules and/or components a remote device, in which dashed boxes represent optional elements in accordance with an embodiment of the present disclosure.

Referring to FIG. 4, an exemplary remote device 400 is provided. A remote device 400 includes one or more processing units (CPUs) 474, one or more network or other communication interfaces 484, memory 492 (e.g., random access memory and/or non-volatile memory) optionally accessed by one or more controllers (e.g., controller 488), and one or more communication busses 412 interconnecting the aforementioned components.

In some embodiments, a remote device 400 includes a mobile device, such as a mobile phone (e.g., remote device 400-1 of FIG. 8), a tablet, a laptop computer, a wearable device such as a smart watch, and the like. In some embodiments, the remote device 400 is a desktop computer or other similar devices (e.g., remote device 400-3 of FIG. 8). However, the present disclosure is not limited thereto. For instance, in some embodiments, the remote device 400 is an appliance. In some embodiments, the remote device 400 is embedded within the appliance or is in electronic communication with the appliance, such as wireless and/or wired communication with the appliance. One of skill in the art will appreciate that a wide domain of appliances is applicable to the systems, methods, and apparatuses of the present disclosure. For instance, in some embodiments, the appliance is a household appliance, such as: a refrigerator appliance; a water heater appliance; a lighting appliance; a heating, ventilation, and air conditioning (HVAC) appliance, a dishwasher appliance, a watering system appliance, a washing machine appliance (e.g., a laundry appliance), an oven appliance, a fan appliance, a home security appliance (e.g., two-dimensional pixelated detector, microphone, etc.) or the like. However, the present disclosure is not limited thereto. For instance, in some embodiments, the appliance is a transportation appliance, such as an autonomous vehicle (e.g., remote device 400-2 of FIG. 8). In this way, the remote device 400 has a one-to-one relationship with the appliance, which allows for the appliance agent 440 to secure the one appliance associated with the remote device. In alternative embodiments, the remote device 400 has a one-to-many relationship with multiple appliances (e.g., all or a subset of appliances associated with a physical address), which allows the appliance agent 440 to secure a network of appliances.

In some embodiments, the remote device 400 includes a user interface 478. The user interface 478 typically includes a display device 482 for presenting media, such as a confirmation of a request for service (e.g., a service provided by a service provider system 200). In some embodiments, the display 482 is an 8 character to 16 character alphanumeric display. In other embodiments, the display 482 supports between 8 characters and 100 characters. In still other embodiments, the display 482 is a graphical display. In some embodiments, the display 482 is utilized for presenting instructions for a subject operating the remote device 400 (e.g., a third party) and/or for receiving input from the subject. In such embodiments, a respective instruction includes a confirmation of a request to use a service 252. In some embodiments, the respective instruction includes a confirmation of modifying a state of an appliance. In some embodiments, the display 482 is optionally integrated within the remote device 400 (e.g., housed in the same chassis as the CPU 474 and memory 492), such as a smart (e.g., smart phone) device. However, the present disclosure is not limited thereto. For instance, in some embodiments, the display 482 is remote from the remote device. By requiring the user to interact with the display 482, the systems, methods, and apparatuses of the present disclosure ensures that the user has a physical presence proximate to the transceiver 498, which improves security of the grid.

In some embodiments, the remote device 400 includes one or more input device(s) 480, which allow the subject to interact with the remote device 400. In some embodiments, input devices 380 include a keyboard, a mouse, and/or other input mechanisms. Alternatively, or in addition, in some embodiments, the display 482 includes a touch-sensitive surface, e.g., where display 482 is a touch-sensitive display or remote device 400 includes a touch pad.

In some embodiments, the display 482 of the remote device 400 is battery operated, which allow for a user of the systems, methods, and apparatuses of the present disclosure to place the display anywhere in a walled structure, such as a dwelling. In some embodiments, the display 482 is powered by the power supply 476 of the remote device and/or the appliance. In some embodiments, the display 482 is powered by an electrical power outlet of the dwelling (e.g., 120-volt (V) outlet). For instance, in some embodiments, the display 482 is mounted on a wall in the same manner as a central air thermostat. However, the present disclosure is not limited thereto. In some embodiments, an advantage of the display 482 is that no hard wiring is required, which allows for information used by the display 482 to be relayed to the display 482 by radio waves, such as RBDS, RDS, or SCA radio waves. As such, in such embodiments, the display 482 is placed anywhere in a dwelling that has suitable radio reception. For instance, in some embodiments, the is placed on a table, a windowsill, a nightstand, on a shelf, or as mentioned above, mounted on a wall. However, the present disclosure is not limited thereto.

In some embodiments, the remote device 400 includes an input/output (I/O) subsystem for interfacing with one or more peripheral devices with the remote device 400. For instance, in some embodiments, audio is presented through an external device (e.g., speakers, headphones, etc.) that receives audio information from the remote device 400 and/or a remote device (e.g., grid security system 300), and, optionally, presents audio data based on this audio information. In some embodiments, the input/output (I/O) subsystem also includes, or interfaces with, an audio output device, such as speakers or an audio output for connecting with speakers, earphones, or headphones. In some embodiments, the input/output (I/O) subsystem also includes voice recognition capabilities (e.g., to supplement or replace an input device 480). However, the present disclosure is not limited thereto.

In some embodiments, the remote device 400 also includes one or more of: one or more sensors (e.g., accelerometer, magnetometer, proximity sensor, gyroscope) and/or a location module (e.g., a Global Positioning System (GPS) receiver or other navigation or geolocation device and related components). In some embodiments, the sensors (e.g., sensor 496 of FIG. 4) include one or more hardware devices that detect spatial and motion information about the remote device 400. Spatial and motion information can include information about a position of the remote device 400, an orientation of the remote device 400, a velocity of the remote device 400, a rotation of the remote device 400, an acceleration of the remote device 400, or a combination thereof. In some embodiments, the sensors 496 include one or more cameras positioned on the remote device 400.

Memory 492 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 492 may optionally include one or more storage devices remotely located from the CPU(s) 374. Memory 492, or alternatively the non-volatile memory device(s) within memory 492, includes a non-transitory computer readable storage medium. Access to memory 492 by other components of the remote device 400, such as the CPU(s)

474 and the I/O subsystem, is, optionally, controlled by a controller. In some embodiments, memory 492 can include mass storage that is remotely located with respect to the CPU 474. In other words, some data stored in memory 492 may in fact be hosted on devices that are external to the remote device 400, but that can be electronically accessed by the remote device 400 over an Internet, intranet, or other form of network 106 or electronic cable using communication interface 484.

In some embodiments, the memory 492 of the remote device 400 stores:

- an operating system 408 that includes procedures for handling various basic system services;
- an electronic address 410 associated with the remote device 400 that identifies the remote device 400 within a distributed grid system 100;
- an identifier generator module 420 that generates a unique identifier for the remote device 400 that in accordance with one or more instructions;
- a signal generator module 430 for generating one or more signals for transmission over a respective communication network 106;
- an appliance agent 440 that provides security and oversight for transmissions across the grid and actions performed at the remote device 400;
- a lookup table 450 that includes a plurality of identifiers 452, which form a basis for a comparison;
- a clock 460 for determining a time;
- a cryptographic function library 470 that includes one or more cryptographic functions 472 for encrypting and/or decrypting data that is transmitted to and/or from the remote device 400;
- an application control module 481 that facilitates control of a utility appliance in electronic communication with the remote device 400; and
- a client application 490 for generating content for display through a graphical user interface presented on a display 482 of the remote device 400, such as a confirmation for a request for service provided by a user associated with the remote device 400.

An electronic address 410 is associated with the remote device 400, which is utilized to at least uniquely identify the remote device 400 from other devices and components of the distributed system 100. In some embodiments, the electronic address 410 associated with the remote device 400 is used to identify a source of communication transmitted by the remote device 400. In some embodiments, the electronic address 410 of the remote device 400 has similar functionality as the electronic address 310 of the grid security system 300 and/or the electronic address 210 of the service provider system 200.

In some embodiments, the identifier generator module 420 of the remote device 400 has similar functionality as the identifier generator module 320 of the grid security system 300 and/or the identifier generator module 220 of the service provider system 200.

In some embodiments, the signal generator module 430 of the remote device 400 has similar functionality as the signal generator module 330 of the grid security system 300 and/or the signal generator module 230 of the service provider system 200.

In some embodiments, the appliance agent 440 of the remote device 400 has similar functionality as the grid agent 340 of the grid security system 300. For instance, in some embodiments, the appliance agent 440 of the remote device 400 includes shared knowledge that is shared with the grid agent 340 of the grid security system 300. In some embodiments, a difference between the grid agent 340 of the grid security system 300 and the appliance agent 440 of the remote device 400 is that the grid agent 340 has read and write permissions to communicate via one or more communication networks 106, whereas the appliance agent 440 has reading privileges. However, the present disclosure is not limited thereto.

In some embodiments, the lookup table 450 of the remote device 400 has similar functionality as the lookup table 350 of the grid security system 300.

The remote device 400 includes a clock (e.g., clock 460 of FIG. 4) that determines a time at the remote device 400. In this way, the clock 460 is used to determine a contemporaneous time at the remote device 400. In some embodiments, the clock 460 is embedded within the remote device 400, such as a real-time clock. In some embodiments, the clock 460 is a system clock that is executed by the memory 492 of the remote device 400.

In some embodiments, the clock 460 includes clock time reference data. In some embodiments, the clock time reference data includes metrology grade universal time coordinated (UTC) clock time references and/or Greenwich mean time (GMT) clock time references. However, the present disclosure is not limited thereto.

In some embodiments, the cryptographic function library 470 of the remote device 400 has similar functionality as the cryptographic function library 370 of the grid security system 300, in that the cryptographic function library 470 includes one or more cryptographic functions 472 for the encryption and/or decryption of data.

An appliance control module 481 allows the remote device 400 to interface with one or more appliances and control of the appliance. In some embodiments, the appliance control module 481 includes an appliance status controller 483 that includes a mechanism for modifying a state of the appliance, such as a power consumption state of the appliance. For instance, in some embodiments, the appliance status controller 483 disconnects an appliance, from a power supply (e.g., power supply 476 of FIG. 4, such that the appliance is completely disabled. In some embodiments, the appliance status controller 483 disables the appliance by placing the appliance in a state of diminished usefulness, which allows for some limited use of the appliance (e.g., a power output reduction of 75%). For instance, in some embodiments, a disabled television appliance is limited to display when the television is in an enabled state. In some embodiments, a light appliance is limited to a lowest brightness setting and/or less than maximum brightness setting. In some embodiments, a fan appliance is limited to a lowest speed setting. In some embodiments, an amount of power generated, stored, or made available for use from the grid by the appliance is limited (e.g., to 25% of enabled state) when the appliance is placed in a disabled state by the appliance status controller. However, the present disclosure is not limited thereto.

In some embodiments, the appliance control module 481 includes an appliance monitor 485 that facilitates monitoring a usage of an appliance, such as an instantaneous power consumption of the appliance. In some embodiments, the appliance control module 485 is in electronic communication with the appliance, which enables the appliance control module 485 to modify a state of the appliance in accordance with one or more instructions provided by the appliance agent 440, such as turning the appliance from an ON state to an OFF state, or from a high power consumption state to a low power consumption state, in accordance with an energy consumption of the appliance satisfying a threshold energy consumption defined by a respective service variable 254.

In some embodiments, the appliance control model 481 provides for a programmable appliance and is capable of storing user configuration data (e.g., using non-volatile memory). Programmable features in such appliances include the ability to determine how power tariff and grid status information is to be used. In the case of a thermostat regulated appliance, for example, temperature set points are programmable to meet consumer-oriented goals (e.g., personal comfort, etc.) as opposed to service provider-based goals.

In some embodiments, each client application 491 is a group of instructions that, when executed by a processor, generates content for presentation to the user. A client application 490 may generate content on the display 482 in response to inputs received from the user through movement of the remote device 400, such as the inputs 410 of the remote device 400.

In some embodiments, the client application 491 facilitates generating a request for a service 252 between a registrant (e.g., first user) and a service provided (e.g., second user, third party, etc.). In some embodiments, the request for the service is a request for approval of a transaction between a user of a remote device 400 and the service provider system 200.

Each of the above identified modules and applications correspond to a set of executable instructions for performing one or more functions described above and the methods described in the present disclosure (e.g., the computer-implemented methods and other information processing methods described herein, method 500 of FIG. 5, method 600 of FIG. 6, etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 492 optionally stores a subset of the modules and data structures identified above. Furthermore, in some embodiments, the memory 492 stores additional modules and data structures not described above.

It should be appreciated that the remote device 400 of FIG. 4 is only one example of a remote device 400, and that the remote device 400 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Now that a general topology of the distributed grid system 100 has been described in accordance with various embodiments of the present disclosures, details regarding some processes in accordance with FIG. 5 will be described. Specifically, FIG. 5 illustrates a flow chart of methods (e.g., method 500) for hybrid secure based communications, in accordance with embodiments of the present disclosure.

Various modules in the memory 392 of the grid security system 300 perform certain processes of the methods 500 described in FIG. 5, unless expressly stated otherwise. Furthermore, it will be appreciated that the processes in FIG. 5 can be encoded in a single module or any combination of modules.

Block 502. Referring to block 502 of FIG. 5, a method 500 for securing a grid is provided. The method 500 is performed at a server computer system (e.g., distributed grid system 100 of FIG. 1, grid security system 300 of FIG. 3). The system 300 includes one or more processors (e.g., CPU 374 of FIG. 3), and a first memory (e.g., memory 392 of FIG. 3) that is coupled to the one or more processors 374. The first memory 392 stores an agent (e.g., grid agent 340 of FIG. 3) that is executed by the one or more processors 374. The agent 340 includes one or more instructions (e.g., block 702 of FIG. 7, block 712 of FIG. 7, block 714 of FIG. 7, block 716 of FIG. 7, block 718 of FIG. 7, etc.) for performing the method 500.

As such, portions of the method 500 require a computer (e.g., (e.g., distributed grid system 100 of FIG. 1, grid security system 300 of FIG. 3) to be used because the considerations used by the systems, methods, and apparatuses of the present disclosure, on the scale performed by the systems, methods, and apparatuses of the present disclosure, cannot be mentally performed. In other words, the systems, methods, and apparatuses of the present disclosure have outputs (e.g., chart 1100 of FIG. 11) that need to be determined using the computer rather than mentally in such embodiments.

Block 504. The agent 340 includes one or more instructions for transmitting instructions for encoding a first signal (e.g., first signal generated by signal generator module 330 of FIG. 3, block 702 of FIG. 7)) to each remote receiver in a plurality of remote receivers (e.g., transceiver 498 of remote device 400 of FIG. 4). In some embodiments, the plurality of remote receivers includes: 10 or more receivers; 100 or more receivers; 500 or more receivers; 5,000 or more receivers; 10,000 or more receivers; 50,000 or more receivers; 100,000 or more receivers; 250,000 or more receivers; 500,000 or more receivers; 1 million or more receivers; 10 million or more receivers; 50 million or more receivers; 150 million or more receivers; 300 million or more receivers; or 1 billion or more receivers (e.g., about 3 billion receivers).

In such embodiments, this transmitting of the instructions for encoding the first signal is performed by a first transmitter (e.g., transceiver 398 of FIG. 3). Moreover, the first signal is transmitted in a first network (e.g., first communication network 106-1 of FIG. 1; first communication network 106-1 and/or second communication network 106-2 of FIG. 8; etc.).

The first signal includes a first contemporaneous timestamp, which allows the agent 340 to transmitting a current time. By transmitting the first contemporaneous timestamp, the plurality of receivers 498 that receive the first signal synchronize a local time at each respective receiver 498 based on the first contemporaneous timestamp (e.g., block 606 of FIG. 6). In typical embodiments, the local time at each respective receiver 498 is the same time zone as the service provider system 200 and/or the grid security system 300. Advantageously, this transmitting of the instructions for encoding the first contemporaneous timestamp with the first signal reduce errors (e.g., time-based errors) within the distributed grid system 100 by ensuring that the plurality of receivers 498 are synchronized with a common time source, which is a source of the first signal (e.g., grid security system 300 of FIG. 3).

In some embodiments, the first signal is utilized to schedule a transmission of UMC messages at one or more predefined future moments in time and/or at one or more predefined rates periodic in time. In some such embodiments, this time scheduling is synchronized to a local real-time clock (e.g., local to the agent 340). In some embodiments, the time scheduling is conditioned by a metrology grade time reference (e.g., network time protocol standards based time reference server or local global positioning system receiver).

In some embodiments, the first signal includes a first unique composite identifier (e.g., a unique composite identifier generated by the identifier generator module 320 of FIG. 3). The first unique composite identifier is based, at least in part, on a first location of the first transmitter (e.g., transceiver 398 of FIG. 3) at a first time of the transmitting the instructions for encoding a respective signal.

In some embodiments, the first signal includes a message authentication component. By including the message authentication component, a recipient of the first signal is enabled to provide independent verification of the first signal without requiring communication or confirmation from the service provider system 200 and/or the grid security system 300. In this way, the message authentication component of the first signal is generated from a first cryptographic function (e.g., first cryptographic function 372-1 of cryptographic function library 370 of FIG. 3).

In some embodiments, the first network 106-1 is a terrestrial broadcast network, such as a wide area network (WAN). For instance, in some embodiments, the first network 106-1 is an FM broadcast network (first communication network 106-1 and/or second communication network 106-2 of FIG. 8) that disseminates information within a geographic region. However, the present disclosure is not limited thereto. For instance, in some embodiments, the first network 106-1 is a local area network (LAN). In some embodiments, the first signal is selected from the group consisting of an analog cellular signal, a digital cellular signal, a general packet radio service signal, an enhanced data rate for GSM evolution (EDGE) service signal, a Mobitex signal, a two-way paging signal, a signal in an Ardis network, a satellite signal, a WiMAX signal, a WiFi signal, a signal embedded in an AM carrier wave, a signal embedded in an FM carrier wave, a signal embedded in a high definition radio carrier wave, a TV signal, and a satellite radio signal.

In some embodiments, the first signal includes a main signal component (e.g., a main carrier) and a side data component (e.g., a subcarrier). In some such embodiments, the agent is utilized to modulate digital information of the side data component onto the main signal component, such as a radio frequency carrier. In some embodiments, the side data component is an orthogonal frequency division multiplexing (OFDM) side data component. Additional details and information regarding the OFDM side data component is found in Chang, 1996, "High-speed multichannel data transmission with bandlimited orthogonal signals," Bell sys. Tech. J., 45, pgs. 1775-1796; Weinstein et al., 1971, "Data transmission by frequency-division multiplexing using the discrete Fourier transform," IEEE Trans. on Comm. Tech., COM-19, pgs. 628-634; Saltzberg, 1967 "Performance of an efficient parallel data transmission system," IEEE Trans. on Comm. Tech., COM-15, pgs. 805-811; Johnson, "The Structure and Generation of Robust Waveforms for AM In Band On Channel Digital Broadcasting," www.armstrongtx.com/BroadProd/DtlDigitalFM.htm; Peyla, "The Structure and Generation of Robust Waveforms for AM In-Band On-Channel Digital Broadcasting," http://www.armstrongtx.com/BroadProd/DtlDigitalFM.htm, each of which is hereby incorporated by reference in its entirety for all purposes. OFDM is a parallel modulation scheme in which the data streams modulate a large number of orthogonal subcarriers that are transmitted simultaneously In such embodiments, the side data component includes the first contemporaneous timestamp, the encrypted unique identifier, and the message authentication component. By way of example, in an FM broadcast network 106, there is the main signal component, for example 100.1 MHz which, by itself, contains no information. The main station information to be transmitted by including instructions for encoding information, for example, a musical song, is then frequency modulated onto the main signal component. In some embodiments, the main signal component is either monaural (mono) or stereo. In such stereo embodiments, the stereo signal is modulated onto the main signal component using a side data component modulation scheme. For instance, an RDS signal is modulated onto the main signal component using one such side data component. Standard FM receivers (e.g., transceiver 498 of FIG. 4) detect the stereo channels. In some such embodiments, to receive the RDS signal, a special receiver that includes a demodulator is required. However, the present disclosure is not limited thereto. For instance, in addition to RDS, there exist subsidiary communications authorization (SCA) 50 channels. In some embodiments, rather than using RDS, one of the SCA channels is used to convey utility rate information and utility grid load information. Accordingly, in some such embodiments, the agent 340 allows for automatically finding a local carrier frequency of the first signal and locks onto the first signal when the first signal is the strongest authenticated signal. However, the present disclosure is not limited thereto.

In some embodiments, the agent 340 performs the transmitting of the instructions for encoding the first signal on a first recurring basis. In some embodiments, the transmitting of the first signal on the first recurring basis is performed by the agent 340 for an indefinite period of time, such as until the agent 340 receives one or more instructions to crease the transmitting of the instructions for encoding the first signal. However, the present disclosure is not limited thereto. By forming this transmitting of the instructions for encoding the first signal on the first recurring basis, the agent 340 consistently transmits the information disseminated by the first signal on a reliable basis to a population of receivers (e.g., transceivers 498 of FIG. 4, transceiver 498-1 of FIG. 8, etc.). In some embodiments, the first recurring basis is a period basis. For instance, in some embodiments, the first recurring basis is about 5 seconds, about 10 seconds, about 15 seconds, about 20 seconds, 30 seconds, about 40 seconds, about 50 seconds, about 60 seconds, about 70 second, about 80 seconds, about 90 seconds, about 300 seconds, about 600 seconds, about 900 seconds, about 1,200 seconds, or a combination thereof. However, the present disclosure is not limited thereto. In some embodiments, the recurring basis is performed on a non-periodic basis, such as an irregularly timed basis. Preferably, the first recurring basis occurs multiple times per day, which ensures that the plurality of receivers 498 is reliably synchronized with the time at the grid security system 300. In doing so, should a respective receiver 498 in the plurality of receivers 498 not obtain an initial transmitting of the instructions for encoding the first signal, the respective receiver 498 obtains a subsequent transmitting of the instructions for encoding the first signal due to the first recurring basis.

Block 506. The agent 340 further includes one or more instructions for obtaining a message signal (e.g., transmission of block 710 of FIG. 7). The message signal includes one or more service variables (e.g., first service variable 254-1, third service variable 254-3 of FIG. 2) that is associated with a first service (e.g., first service 252-1 of FIG. 2) that corresponds to a respective service provider (e.g., block 712 of FIG. 7). As a non-limiting example, in some embodiments, the first service is a critical infrastructure service, such as an industrial production service, a water treatment service, a transportation service, or an energy management service. In some embodiments, the first service is privately operated by the respective service provider, such as a personally owned limited liability company. In other embodiments, the first service is publicly operated by the respective service provider, such as a municipal utility company. However, the present disclosure is not limited thereto.

In some embodiments, the one or more service variables includes: at least 1 service variable; 2 or more service variables; 4 or more service variables; 5 or more service variables; 10 or more service variables; 15 or more service variables; 25 or more service variables; or 75 or more service variables.

In some embodiments, configuration of the one or more service variables 254 is qualified according to applicable geographical area (e.g., address associated with a remote device 400), applicable electrical grid area or network (e.g., distributed grid system 100 of FIG. 1), a unique receiver address (e.g., unique composite identifier 352, electronic address 410, etc.), or a particular information source.

Figure 8:
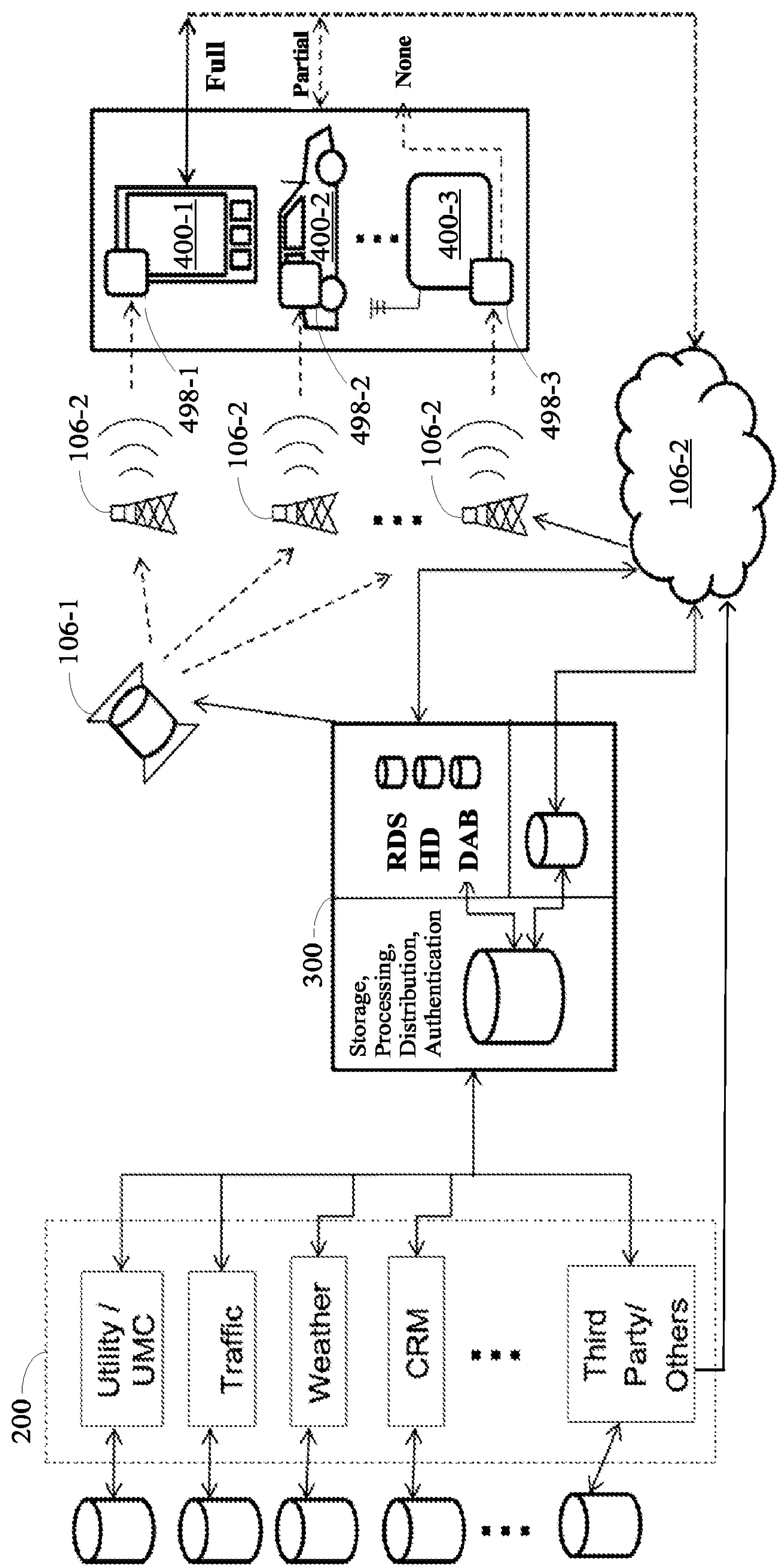
FIG. 8 illustrates another exemplary system topology including a service provider system, a grid security system, a plurality of communication networks, and a population of remote devices, in which dashed boxes represent optional elements in accordance with an embodiment of the present disclosure.
Figure 9:
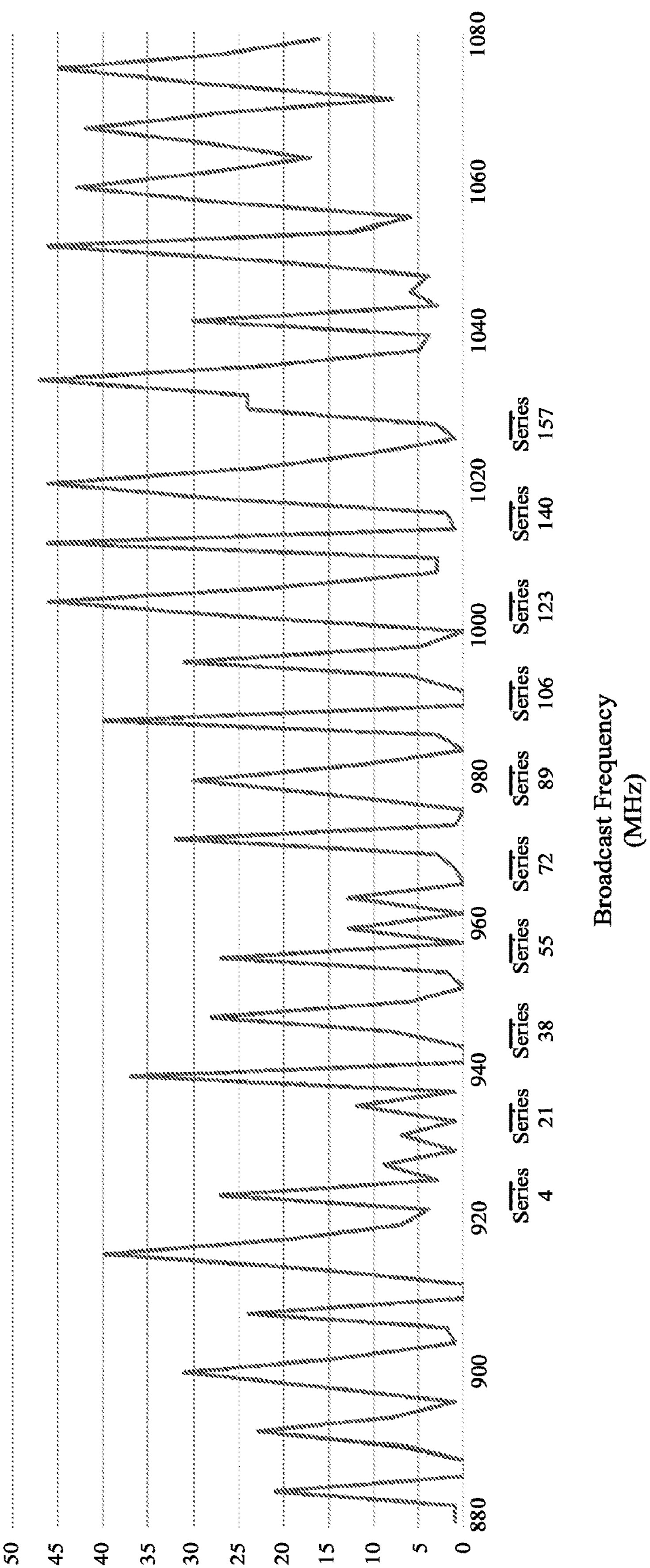
FIG. 9 illustrates a chart that demonstrates long term stability of using the systems, methods, and apparatuses of the present disclosure by sampling unique composite identifiers at a grid security system, in accordance with an embodiment of the present disclosure.

In such embodiments, the respective service provider is an administrator of a service provider system (e.g., service provider system 200 of FIG. 1, service provider system 200 of FIG. 2, service provider system 200 of FIG. 8, etc.). In some embodiments, the respective service provider is the first service provider. In this way, the transmitting of the instructions for encoding the one or more service variables 254 and the provider of the first service 252-1 are one and the same. However, the present disclosure is not limited thereto. For instance, in some embodiments, the respective service provider is a second service provider that is different than the first service provider. Accordingly, in some embodiments, the first service provider that transmits the one or more service variables 254 compiles or aggregates information from one or more second service providers in order to form the one or more service variables 254.

Additionally, this obtaining of the message signal that includes one or more service variables 254 further includes obtaining an encrypted unique identifier (e.g., second identifier 352-2 of FIG. 2). By including the encrypted unique identifier, the agent 340 is capable of verifying and authenticating a source of the one or more service variables 254. In doing so, security is improved at the grid to ensure that the one or more service variables 254 is not transmitted by an illegitimate source, which is a source of vulnerability in the grid. In some embodiments, the encrypted unique identifier is generated by an identifier generator module 220 at the service provider system 200. In some embodiments, the encrypted unique identifier is a unique composite identifier that is based, at least in part, on a location of the transmitter 298.

In some embodiments, this obtaining the message signal that includes the one or more service variables 254 occurs via a second communication network (e.g., second communication network 106-2 of FIG. 1, second communication network 160-2 of FIG. 8, etc.). In some embodiments, the second communication network is a terrestrial broadcast network 106, such as an FM broadcast network 106. By utilizing the FM broadcast network 106, the method avoids increased data congestion, power consumption, security issues, and adverse health effects related to exposure to high-frequency radio frequency (RF) exposure. In some embodiments, the second communication network 106-2 is a WAN.

In such embodiments, the second communication network 106-2 is different than the first communication network 106-1 that the agent 340 transmits the first signal by. For instance, in some embodiments, the first communication network 106-1 is a wide area network and the second communication network 106-2 is a terrestrial broadcast network. However, the present disclosure is not limited thereto.

In this way, the message signal is received from a second transmitter (e.g., transceiver 298 of FIG. 2) that is associated with a first service provider (e.g., administrator of a service provider system 200 of FIG. 2). In this way, the one or more service variables 254 is provided directly from the provider of the first service 252, which ensures accuracy of the one or more service variables 254.

In such embodiments, the message signal is obtained by the agent 340 on a second recurring basis. In some embodiments, the second recurring basis is different than the first recurring basis. In some embodiments, a periodicity or average periodicity of the second recurring basis is different than the first recurring basis. In alternative embodiments, the second recurring basis is the same as the first recurring basis. In such embodiments, the second recurring basis includes a phase offset from the first recurring basis. However, the present disclosure is not limited thereto.

In some embodiments, the one or more service variables 254 includes a price of the first service 252-1. In some embodiments, the one or more service variables include a dynamic price rate structure, in which a future price of a first service is known a priori, such as a time of use of the first service 252-1. In such embodiments, the price of the first service 252-1 is a real-time price, a projected price, a previous price, or a combination thereof. In some embodiments, such as if the one or more service variables includes the real-time price, the future price of the first service 252-1 is unknown or known with a high degree of uncertainty. In some embodiments, the price of the first service 252-1 includes a list of one or more start times for a price and/or one or more end times for the price. In some embodiments, the price of the first service 252-1 includes one or more price tiers, in which each price tier is a categorical representation of prices for the first service 252-1 during a period of time. In some embodiments, the one or more service variables 254 includes a function for determining the price of the first service 252-1 in accordance with a characteristic of a recipient of the one or more service variables 254. In some embodiments, the real-time price information is valid immediately upon receipt. In some embodiments, the real-time price information includes pricing information that is valid for a specific duration of time (e.g., at least one minute, at least five minutes, at least one half hour, at least one hour, less than 24 hours, less than two days, between one day and a week, two weeks or less, a month or less, etc.) commencing at a future time point (e.g., in an hour, in a day, in a week, etc.), or cyclic in time (e.g., every Thursday, etc.). In some embodiments, the one or more service variables includes a time of use of the first service. In some embodiments, the one or more service variables includes a critical peak pricing of the first service, in which a first price is associated with providing a first service for or during a first period of time and a second price, different than the first price, is associated with providing the first service for or during a second period of time. In some embodiments, the one or more service variables includes a day-head pricing of the first service.

In some embodiments, the one or more service variables 254 includes a tariff rate, such as a power tariff rate or an energy tariff rate. In some embodiments, the tariff rate includes a qualified power tariff expressing price per unit energy consumed, including tariff data points qualifiers such as commencement and expiry time stamps with possible periodicity, applicable geographical area, applicable electrical grid area or network, and information source (e.g., an energy marketer, load distribution center, independent market operator, and the like). In such embodiments, the tariff rate of the first service 252-1 is a real-time tariff rate, a projected tariff rate, a previous tariff rate, or a combination thereof. In some embodiments, the one or more service variables 254 includes a function for determining the tariff rate of the 254 in accordance with a characteristic of a recipient of the one or more service variables 254.

In some embodiments, the one or more service variables 254 includes a greenhouse gas emissions rate. In some embodiments, the greenhouse gas emissions rate is a marginal greenhouse gas emissions rate. In such embodiments, the marginal greenhouse gas emissions rate of the first service 252-1 is a real-time marginal greenhouse gas emissions rate, a projected marginal greenhouse gas emissions rate, a previous marginal greenhouse gas emissions rate, or a combination thereof. In some embodiments, the one or more service variables 254 includes a function for determining the marginal greenhouse gas emissions rate of the 254 in accordance with a characteristic of a recipient of the one or more service variables 254.

For instance, in some embodiments, the appliance is an electric vehicle system that includes a display (e.g., display 482 of FIG. 4), a receiver (e.g., receiver 498 of FIG. 4), and a rechargeable power supply (e.g., power supply 476 of FIG. 4). The receiver 498 allows the electric vehicle system to at least receive transmitted signals that include one or more service variables, such as a first service variable associated with a greenhouse gas emission rate. Accordingly, the display 482 is utilized to present a user interface (e.g., user interface 1200 of FIG. 12), in which the user interface provides a visualization of a first icon 1210-1 indicating a state of the power supply 476, a second icon 1210-2 indicating a state of a connection to a communication network (e.g., communication network 106 of FIG. 4), and a text object 1010 that provides a description of one or more service variables included in a respective signal received by the appliance. As a non-limiting example, the first text object 1010-1 of FIG. 12 describes a first service variable of a greenhouse gas emissions rate associated with an energy utility service provide that provides a first service for charging the appliance, in which the greenhouse gas (GHG) emissions rate is 0.185 pounds per kilowatt hour (lb/kWh). From this, for instance, in some embodiments, charging of the appliance is slowly ramped down over a "shoulder period" after a peak event (e.g., critical peak price event, off-peak event, peak GHG emission rate, service reliability event, critical weather event, etc.) to allow loads to come on at a level of cost/comfort preference. However, the present disclosure is not limited thereto.

Furthermore, in some embodiments, the one or more service variables includes a service reliability status, such as a service generation reliability status, a service transmission reliability status, a service distribution reliability status, or a combination thereof. In some embodiments, the service reliability status is provided in units of time (e.g., an interruption in service duration provided in minutes), frequency, load (e.g., kWh), or a combination thereof. Additional details and information regarding the reliability status of a respective service is found in Sullivan et al., 2009, "Estimated Value of Service Reliability for Electric Utility Customers in the United States," Lawrence Berkeley National Lab, Berkeley, CA, No.: LBNL-2132E, which is hereby incorporated by reference in its entirety for all purposes.

In some embodiments, the one or more service variables includes a critical weather status. In some embodiments, the critical weather status is associated with a price event, such as an election in price Tier. However, the present disclosure is not limited thereto. For instance, in some embodiments, the critical weather status is associated with a critical weather event located proximate to the respective service provider, the grid security system, the appliance, or a combination thereof. By way of example, in some embodiments, the critical weather event is a near-term acute risk of harm, such as a frequent and/or extreme drought and/or wildfire. As another non-limiting example, in some embodiments, the critical weather event is a longer-term chronic risk, such as a rising temperature and/or sea level associated with an environment of the respective service provider, the grid security system, the appliance, or the combination thereof. Additional details and information regarding the critical weather status and/or determination of an existence of the critical weather event is found in Zamuda et al., 2018, "Utility Management Practices for Addressing Extreme Weather: A Resilience Maturity Model," Sandia National Lab, SAND-2019-3841R, which is hereby incorporated by reference in its entirety for all purposes.

In some embodiments, the one or more service variables includes one or more instructions for updating a data element stored at a remote device. For instance, in some such embodiments, the one or more instructions for updating the data element provide an ability for the method 500 to distribute updates securely via the communication network 106. For instance, in some embodiments, the one or more instructions for updating the data element include a listing of available updates and/or a determination as to whether a respective update on the listing of available updates is needed in order to operate a remote device and/or an appliance associated with the remote device. In some embodiments, to determine if the update to the data element is utilizable by the remote device or the appliance, the list of available updates includes a corresponding expected hash value for each respective available update in the list of available updates. In some embodiments, the corresponding expected hash value is utilized to determine if a respective available update is appropriate for the existing software. However, the present disclosure is not limited thereto.

In some embodiments, the one or more service variables 254 includes a CRM data. In some embodiments, the CRM data of the one or more service variables 254 includes a usage of the first service 252-1, such as the usage of the first service 252-1 per unit time (e.g., kilowatt hours (kWh) per month, per day, etc.) an average usage of the first service 252-1 (e.g., average kWh consumed during a preterminal period of time), a normalized usage of the first service 252-1 (e.g., usage of a respective user of the first service 252-1 in comparison to a normalization of usage across a population of users of the first service 252-1), and the like.

Block 508. Moreover, the agent 340 includes one or more instructions for authenticating the encrypted unique identifier 352 (e.g., block 714 of FIG. 7). In some embodiments, the authenticating the encrypted unique identifier 352 is conducted when an instance of the message signal is obtained. In some embodiments, successive instances of the authenticating the encrypted unique identifier 352 are performed at a timed interval, such as every second, every minute, half hour, or the like.

In some embodiments, the authentication of the encrypted unique identifier 352 is based on a comparison of the encrypted unique identifier 352 against a plurality of stored unique identifiers (e.g., first identifier 352-1, second identifier 352-2, . . . , identifier N 352-N of FIG. 3) in a lookup table (e.g., lookup table 350 of FIG. 3). In some embodiments, the plurality of stored unique identifiers includes: 10 or more unique identifiers; 100 or more unique identifiers; 500 or more unique identifiers; 5,000 or more unique identifiers; 10,000 or more unique identifiers; 50,000 or more unique identifiers; 100,000 or more unique identifiers; 250,000 or more unique identifiers; 500,000 or more unique identifiers; 1 million unique identifiers or more; 10 million or more unique identifiers; or 50 million or more unique identifiers.

In some embodiments, each unique identifier 352 that is stored in the lookup table 350 corresponds to a different service provider in a one or more service providers that have a privilege to make use of the grid. In some embodiments, the one or more service provides includes: at least 1 service provider; 2 or more service provider; 4 or more service provider; 5 or more service provider; 10 or more service provider; 15 or more service providers; 25 or more service provider; 75 or more service providers; 250 or more service providers; 1,000 or more service providers; 20,000 or more service providers; 100,000 or more service providers; or 500,000 or more service providers (e.g., about 1 million service providers).

In such embodiments, by way of the different service provider being an administrator of the service provider system 200, each unique identifier 352 corresponds to a different service provider system 200 within the distributed grid system 100. As such, in some embodiments, the respective service provider is a water utility service provider, an electrical utility service provider, a gas utility service provider, a garbage pickup service provider, or a hazardous waste pickup service provider.

In some embodiments, the encrypted unique identifier 352 is based, at least in part, on a second location of the second transmitter 298 when the one or more service variables 254 were generated (e.g., generated by signal generator module 230 of FIG. 2). For instance, in some embodiments, each respective unique composite identifier in the lookup table includes a plurality of measured signal qualities that collectively represent a frequency spectrum. In some embodiments, the plurality of measured signal qualities includes: 2 or more unique measured signal qualities; 3 or more unique measured signal qualities; 5 or more unique measured signal qualities; 8 or more unique measured signal qualities; 10 or more unique measured signal qualities; 16 or more unique measured signal qualities; 24 or more unique measured signal qualities; 32 or more unique measured signal qualities; 52 or more unique measured signal qualities; 100 or more measured signal qualities; 500 or more unique measured signal qualities; or 5,000 or more measured signal qualities. Furthermore, each measured signal quality in the plurality of measured signal qualities corresponds to a portion of the frequency spectrum. By way of example, in some embodiments, in North America, for FM RDS signal transmissions, the plurality of measured signals qualities corresponds to all signal characteristics a portion of the frequency spectrum from 87.9 MHz to 107.9 MHz. However, the present disclosure is not limited thereto.

For instance, in some embodiments, each respective unique identifier in the lookup table includes a plurality of measured signal qualities that collectively represent a portion of a frequency spectrum. In some embodiments, the portion of the frequency spectrum is predetermined, such as a select number of measured signals qualities in the frequency spectrum, such as two or more measured signals qualities, three or more measured signals qualities, four or more measured signals qualities, five or more measured signals qualities, six or more measured signals qualities, seven or more measured signals qualities, etc. However, the present disclosure is not limited thereto. For instance, in some such embodiments, the portion of the frequency spectrum is determined, at least in part, by the agent. By determining the portion of the frequency spectrum to sample in for representation as a respective unique identifier, the method 500 prevents a third-party from transmitting a spoof signal that utilizes a predetermined portion of the frequency spectrum. In this way, by selecting the portion that is less than all of the frequency spectrum, a remote receiver is required to authentic an identity of the receiver in a trustless environment, such as by requesting the receiver to separately provide the plurality of measured signals qualities representing the portion of the frequency spectrum (e.g., block 604 of FIG. 6, block 608 of FIG. 6, block 610 of FIG. 6, block 704 of FIG. 7, block 720 of FIG. 7, block 726 of FIG. 7, etc.). As a non-limiting example, in some embodiments, the plurality of measured signal qualities includes four measured signals qualities of an FM frequency spectrum in North America, which has a range of from 87.9 MHz to 107.9 MHz that provides 102 available frequencies. Accordingly, the agent selects 4 of the 102 available frequencies, such as 91.9 MHz, 87.9 MHz, 102.1 MHz, and 104.5 MHz. In some embodiments, the selection of the measured signals qualities is order dependent, such that the four measured signals yield a selected ordered series of measured signal qualities. Accordingly, in some such embodiments, by selecting the order of the measured signal qualities, the agent provides control over the security of the unique identifier. Furthermore, by selecting the order of the measured signal qualities, the agent is allowed to change the unique identifier at each instance of a transmission that requires authentication (e.g., block 508 of FIG. 5, block 612 of FIG. 6).

In some embodiments, the agent utilizes a dynamic hysteresis model to determine or select the portion of the frequency spectrum. For instance, in some embodiments, the dynamic hysteresis model is a Duhem model. Additional details and information regarding the dynamic hysteresis model is found at Dutta et al., 2004, "Dynamic Hysteresis Modeling and Applications," Master's Thesis, Rice University, print, which is hereby incorporated by reference in its entirety for all purposes.

In some embodiments, each respective unique identifier in the lookup table is an analog data element. In some embodiments, each respective unique identifier in the lookup table is a binary data element. For instance, in some embodiments, a value (e.g., analog value) of a respective measured signal quality is converted into a binary character in accordance with a determination that the value satisfies a threshold comparison score. For instance, using the above described non-limiting example of the plurality of measured signal qualities that collectively represent the portion of the FM frequency spectrum of 91.9 MHz, 87.9 MHz, 102.1 MHz, and 104.5 MHz, consider a first remote receiver 498-1 associated with a first appliance of a first subject, a second remote receiver 498-2 associated with a second appliance of a second subject, and a third remote receiver 498-3 associated with a third appliance of the second subject (e.g., the second and third appliances are in a same building but different rooms and/or story's). Given the different geographic location of each respective receiver 498, no two plurality of measured signal characteristics are identical. Accordingly, using a radio signal strength index or indicator (RSSI), each measured signal quality in the plurality of measured signal qualities for each respective receiver is determined. In order to facilitate transmission of a respective signal with less data, the respective measured signal quality is converted into a first binary character in accordance with a determination that the value satisfies a threshold comparison score of 35, and the respective measured signal quality is converted into a second binary character in accordance with a determination that the value does not satisfies the threshold comparison score. In some embodiments, the threshold comparison score is selected randomly (e.g., from a range of from 10 to about 100, from about 20 to about 50, from about 20 to about 30, or a combination thereof) for each respective receiver 498. Accordingly, Table 3 represents a plurality of measured signal qualities for each respective receiver in analog, whereas Table 4 represents the binary conversion of Table 3.

TABLE 3

Analog/digital representation of a plurality of measured signal qualities of a unique identifier that collectively represent a portion of a frequency spectrum

| | FREQUENCY | | | |
|---|---|---|---|---|
| RECEIVER | 91.9 MHz | 87.9 MHz | 102.1 MHz | 104.5 MHz |
| First Receiver 498-1 | 12 | 34 | 39 | 63 |
| Second Receiver 498-2 | 10 | 32 | 96 | 60 |
| Third Receiver 498-3 | 5 | 16 | 45 | 30 |

TABLE 4

Binary representation of a plurality of measured signal qualities of a unique identifier that collectively represent a portion of a frequency spectrum, in which a first threshold comparison score for a first receiver 498-1 is 35, a second threshold comparison score for a second receiver 498-2 is 65, and a third threshold comparison score is 35.

| | FREQUENCY | | | |
|---|---|---|---|---|
| RECEIVER | 91.9 MHz | 87.9 MHz | 102.1 MHz | 104.5 MHz |
| First Receiver 498-1 | 0 | 0 | 1 | 1 |
| Second Receiver 498-2 | 0 | 0 | 1 | 0 |
| Third Receiver 498-3 | 0 | 0 | 1 | 0 |

In some embodiments, the portion of the frequency spectrum is modulated by server computer system. In some embodiments, this modulating the portion of the frequency spectrum is facilitated by controlling a degree of variability of a respective signal transmission, such as by using a side data component modulation scheme. As a non-limiting example, radio data service (RDS), which is used by a significant percentage of the FM stations in North America, uses a subcarrier at 57 kHz and is normally modulated at +/−2.5 kHz. In some embodiments, the first signal includes a main signal component and a side data component. Moreover, in some such embodiments, the modulation of the first signal includes modulating a measured signal quality of the side data component.

In some embodiments, the portion of the frequency spectrum is modulated by server computer system in order to control a measured signal quality, such as a quality of a side carrier. As a non-limiting example, in some embodiments, the measured signal quality is a power spectral density. In some embodiments, the measured signal quality includes a difference in comparison to a baseline signal quality. For instance, in some embodiments, the difference in comparison to the baseline signal quality is a first difference in a baseline signal level, a second difference in a baseline noise level, a third different in a baseline modulation level, or a combination thereof. Accordingly, by modulating the portion of the frequency spectrum in order to control the difference in comparison to the baseline signal quality, the method 500 allows for detecting if a signal transmitted by the grid security system 200 is exposed to a third-party attack, such as a spoofed or imitation signal transmission. Moreover, in some such embodiments, by modulating the portion of the frequency spectrum in order to control the difference in comparison to the baseline signal quality, the method 500 allows for accurately predicting a change to a unique identifier due to that modulation.

In some embodiments, the measured signal quality includes an active status of the side data component. In some embodiments, the main signal component is a main analog signal component. Moreover, in some embodiments, the side data component is a digital side data component. For instance, as a non-limiting example, IBOC offers different a hybrid protocol, an extended hybrid protocol, and all digital protocol. For each protocol, a spectrum is divided into a diverse number of side data components (sidebands), which represent different orthogonal frequency division multiplexing (OFDM) subcarrier groups. However, the present disclosure is not limited thereto.

In some embodiments, the unique composite identifier is compared against one or more identifiers in a reference table (e.g., lookup table 450 of FIG. 5), in which each identifier in the one or more identifiers of the lookup table is associated with a global position. As a non-limiting example, a first identifier in the one or more identifiers of the lookup table is associated with San Francisco, California and a second identifier in the one or more identifiers is associated with Chicago, Illinois. However, the present disclosure is not limited thereto. For instance, in some such embodiments, the global position associated with a respective identifier corresponds to a geo-polygon that represents a region within a distinct frequency spectrum (e.g., FM signature frequency spectrum). This region within the distinct frequency spectrum is generated (e.g., by grid agent 340 of FIG. 3) by determining two or more overlapping signal transmission regions. In some embodiments, the geometric polygon encompasses 50 contiguous square miles or less, 5 contiguous square miles or less, 1 contiguous square mile or less, 0.5 contiguous square miles or less, 5 contiguous acres or less, 1 acre or less, within twenty-five meters, or within five meters of the actual location of the receiver.

In some such embodiments, each respective identifier includes a plurality of frequency windows and, for each such frequency window, a signal quality. In some embodiments, frequency windows are used to circumvent an effect of one or more phenomena such as spectral leakage that occurs at frequencies close to those of certain transmitters.

In some embodiments, the comparing of the identifiers utilizes a brute force model, in which a comparison score is generated for each such comparison. In some embodiments, this comparison score is simply an indication as to whether the two identifiers are deemed a match. In one embodiment, a declining threshold model is used for this comparison, such as an empirical declining threshold model or a predictive declining threshold model.

Accordingly, when this comparing of the identifiers determines a unique match between the unique composite identifier and a respective identifier in the lookup table 450, the receiver 498 is deemed to be localized to the global position associated with the respective identifier. Furthermore, this deeming of the receiver to the global position associated with the respective identifier secures a transmission via a respective communications network by having the localization of the receiver 492 determined at a given point in time that is associated with a contemporaneous timestamp, which adds layer of security for receiving and trusting a source of the transmission at the receiver without knowledge.

In some embodiments, the frequency spectrum is all or a portion of the FM frequency spectrum, all or a portion of the AM frequency spectrum, all or a portion of the spectrum between 300 kilohertz (KHz) and 3 MHz, all or a portion of the spectrum between 3 MHz and 30 MHz, a portion of the spectrum between 30 MHz and 300 MHz, or all or a portion of the spectrum between 300 MHz and 3,000 MHz. In some embodiments, a measured signal quality in the plurality of measured signal qualities is a decibel rating of a frequency in the frequency spectrum. In some embodiments, the measured signal quality in the plurality of measured signal qualities is a voltage representing a frequency in the frequency spectrum.

In some embodiments, the portion of the frequency spectrum corresponding to a first measured signal quality in the plurality of measured signal qualities is a first frequency window. In some embodiments, this first frequency window includes a frequency spectrum that has a spectral width that is between 1 KHz and 200 KHz or between 200 KHz and 400 KHz. In some embodiments, the portion of the frequency spectrum corresponding to a second measured signal quality in the plurality of measured signal qualities is a second frequency window and a spectral width of the first frequency window and the second frequency window is the same or different.

In some embodiments, the first measured signal represents the strongest observable signal in the portion of the frequency spectrum corresponding to the first measured signal quality. In some embodiments, the second measured signal quality also corresponds to the first frequency window. In some embodiments the first measured signal quality and the second signal quality are each independently selected from the group consisting of an RDS quality, an FM multipath reading, FM level, AM level, or a phase lock. Accordingly, in some such embodiments, the receiver 498 is utilized to scan all or a portion of a frequency spectrum (e.g., FM frequency spectrum) in order to measure a radio signature and determine a unique composite identifier. However, the present disclosure is not limited thereto.

For instance, in some embodiments, each respective unique composite identifier 352 is embedded within an application-specific integrated circuit (ASIC). Accordingly, this embedded unique compositive identifier 352 is queried during this authenticating step performed by the agent 340.

Block 510. Additionally, the agent 340 includes one or more instructions for generating a second signal (e.g., block 716 of FIG. 7). The second signal includes an encoding of all or a subset of the one or more service variables 323. In some embodiments, the second signal includes the encrypted unique composite identifier, which is provided by the service provider system 200. In some embodiments, the second signal includes a second contemporaneous timestamp.

This generating of the second signal is performed by the agent 340 in accordance with an authentication of the encrypted unique composite identifier 352. In such embodiments, the authentication of the encrypted unique composite identifier 352 is conducted via a second cryptographic function (e.g., second cryptographic function 372-2 of FIG. 3). In some embodiments, the first cryptographic function 372-1 and/or the second cryptographic function 372-2 is a block cipher function. Furthermore, in some embodiments, the first cryptographic function 372-1 is a key encryption function, such as a private key encryption function or a public key encryption function. In some embodiments, the first cryptographic function 372-1 and/or the second cryptographic function 372-2 is a hash function. In some embodiments, the first cryptographic function 372-1 is different than the second cryptographic function 372-2. In doing so, the security of the distributed grid system 100 in improved by utilizing two mutually exclusive cryptographic functions 372, effectively at least doubling an effort required to break the security provided by the systems, methods, and apparatuses of the present disclosure.

In some embodiments, the second signal includes the encoding of all or the subset of the one or more service variables 254. For instance, in some embodiments, the encoding of all or the subset of the one or more service variables 254 includes applying the one or more service variables 254 to a service optimization module (e.g., service optimization module 362 of FIG. 3). In doing so, the agent 340 forms the encoding of all or the subset of the one or more service variables 254 as an optimization of the one or more service variables 254 provided by the service provider of the first service 252-1, which increasing an efficiency of the grid. By way of example, in some embodiments, the encoding of all or the subset of the one or more service variables 254 further includes forming a vector space, such as a linear vector space, from at least two service variables 254 in the one or more service variables 254. As a linear vector space, the at least two service variables 254 can be added together to form a first new service variable 254-1 and multiple together to form a second new service variable 254-2, such that the at least two service variables obey a number of basic algebraic axioms (e.g., service variable X 254-X+service variable Y 254-Y=service variable Y 254-Y+service variable X 254-X for the at least two service variables 254 X and Y). Additional details and information regarding the forming of a linear vector space is found at Wong et al., 1984, "Vector Space Model of Information Retrieval: A Reevaluation," SIGIR, 84, pg. 167; Trubulec et al., 1990, "Linear Combinations in Vector Space," Journal of Formalized Mathematics, 2, each of which is hereby incorporated by reference in its entirety for all purposes.

In some embodiments, the second signal includes a second unique composite identifier 352-2. In such embodiments, the second unique composite identifier is the encrypted unique identifier of the obtaining the one or more service variables 254 (e.g., block 506 of FIG. 5). Accordingly, the agent 340 obtains the second unique composite identifier 352-2 as the encrypted unique identifier provided by the service provider system 200 (e.g., block 506 of FIG. 5), authenticates the second unique composite identifier 352-2 (e.g., block 508 of FIG. 5), and then forwards the second unique composite identifier 352-2 to a plurality of receivers 498 (e.g., block 512 of FIG. 5) by way of the second signal.

In some embodiments, the second signal includes the second contemporaneous timestamp. In some embodiments, the second contemporaneous timestamp is captured at a second time of the generating of the second signal. Accordingly, both the first contemporaneous timestamp (e.g., block 504 of FIG. 5) and the second contemporaneous timestamp are based on a contemporaneous time as determined by the agent 340. In doing so, the distributed grid system 100 is synchronized (e.g., block 606 of FIG. 6) in accordance with the agent 340 at the grid security system 300, which ensure reliability of the grid. Furthermore, the contemporaneous time stamps provided by the agent 340 provides a first security mechanism by transmitting the instructions for encoding the first contemporaneous timestamp and the second contemporaneous time stamp at different times yet having the first contemporaneous timestamp and the second contemporaneous time based on an identical space and time reference point, which is the agent 340.

In some embodiments, when the encrypted unique identifier does not satisfy a threshold comparison score, the second signal is not generated. Accordingly, the method 500 is secure because it prevents unauthorized transmissions via a respective communication network by a third-party user that is attempting to replicate a respective encrypted unique identifier but does not satisfy a threshold comparison score.

Block 512. Furthermore, the agent 340 includes one or more instructions for transmitting the instructions for encoding the second signal to each remote receiver in all or a subset of the plurality of remote receivers (e.g., transceiver 498 of FIG. 4, transceivers 498 of FIG. 8, etc.) (e.g., block 718 of FIG. 7). In some embodiments, this transmitting of the instructions for encoding the second signal is performed through the second communication network 106-2. In doing so, the agent 340 utilized the same communication network 106 as the obtaining the one or more service variables 254. However, the present disclosure is not limited thereto. For instance, in some embodiments, the second communication network 160-2 is the same as the first network 106-1 as the transmitting the instructions for encoding the first signal. In this way, in such embodiments, the agent 340 utilizes the first communication network 106-1 to communicate with the service provider system 200 and a second communication network 106-2 to communication with the plurality of remote receivers 498.

In some embodiments, the subset of the plurality of remote receivers 498 is selected from among the plurality of remote receivers 498 based upon an identity of the respective service provider associated with the second unique composite identifier 352-2. In some embodiments, the subset of the plurality of remote receivers 498 is selected from among the plurality of remote receivers 498 based on an identity of one or more service variables in the one or more service variables. In some embodiments, the subset of the plurality of remote receivers 498 is selected from among the plurality of remote receivers 498 based on a value of a service variable 254 in the one or more service variables 254.

Now that methods 500 for hybrid secure based communications have been described in accordance with various embodiments of the present disclosures, details regarding some processes in accordance with FIG. 6 will be described. Specifically, FIG. 5 illustrates another flow chart of methods (e.g., method 600) for hybrid secure based communications, in accordance with embodiments of the present disclosure.

Various modules in the memory 492 of the remote device 400 perform certain processes of the methods 600 described in FIG. 6, unless expressly stated otherwise. Furthermore, it will be appreciated that the processes in FIG. 6 can be encoded in a single module or any combination of modules.

Block 602. Referring to block 602 of FIG. 6, a computer implemented method 500 at a system for securing a plurality of appliances (e.g., remote devices 400 of FIG. 1, remote devices 400 of FIG. 8, etc.) within a grid.

The system includes a plurality of remote devices (e.g., remote devices 400 of FIG. 1, remote devices 400 of FIG. 8) and a server computer system (e.g., grid security system 300 of FIG. 1, grid security system 300 of FIG. 3, grid security system 300 of FIG. 8, etc.). In some embodiments, each respective remote device 400 in the plurality of remote devices 400 is in electronic communication with a corresponding appliance in the plurality of appliances. Each respective remote device 400 in the plurality of remote devices 400 includes a corresponding receiver (e.g., transceiver 498 of FIG. 4, transceiver 498 of FIG. 8, etc.), a corresponding one or more processors (e.g., CPU 474 of FIG. 4), and a corresponding first memory (e.g., memory 492 of FIG. 2) that is coupled to the corresponding one or more processors 474.

In some embodiments, the plurality of remote devices includes: 10 or more remote devices; 100 or more remote devices; 500 or more remote devices; 5,000 or more remote devices; 10,000 or more remote devices; 50,000 or more remote devices; 100,000 or more remote devices; 250,000 or more remote devices; 500,000 or more remote devices; 1 million or more remote devices; 10 million or more remote devices; 50 million or more remote devices; 150 million or more remote devices; 300 million or more remote devices; 1 billion or more remote devices; 10 billion or more remote devices; 100 billion or more remote devices; or 200 billion or more remote devices (e.g., about 275 billion remote devices).

In some embodiments, the plurality of appliances includes: 10 or more appliances; 100 or more appliances; 500 or more appliances; 5,000 or more appliances; 10,000 or more appliances; 50,000 or more appliances; 100,000 or more appliances; 250,000 or more appliances; 500,000 or more appliances; 1 million or more appliances; 10 million or more appliances; 50 million or more appliances; 150 million or more appliances; 300 million or more appliances; 1 billion or more appliances; 10 billion or more appliances; 100 billion or more appliances; or 200 billion or more appliances (e.g., about 275 billion appliances).

The corresponding first memory 492 stores a corresponding agent (e.g., appliance agent 440 of FIG. 4) that is executed by the corresponding one or more processors 474. In some embodiments, the corresponding agent 440 of a respective remote device 400 has similar reading functionality as an agent (e.g., grid agent 340 of FIG. 3) of a grid security system 300.

The agent 440 includes one or more instructions (e.g., block 704 of FIG. 7, block 706 of FIG. 7, block 708 of FIG. 7, block 720 of FIG. 7, block 722 of FIG. 7, block 724 of FIG. 7, block 724 of FIG. 7, block 726 of FIG. 7, etc.) for performing the method 600.

In such embodiments, the corresponding agent 440 of the respective remote device 400 lacks similar writing functionality as the agent 340 of the grid security system 300. Accordingly, the remote device 400 is limited to receiving transmissions by the receiver 498 without being able to transmit signals by a transmitter, which increases security through the system 100.

In some embodiments, the corresponding receiver 498, the corresponding one or more processors 474, and the corresponding first memory 492 are embedded within the corresponding appliance. As a non-limiting example, in some embodiments, the corresponding receiver 498 is an IBOC receiver having analog and digital components that is configured to receive one or both digital signal sidebands that carry UMC signals to the corresponding receiver 498 embedded within the corresponding appliance. However, the present disclosure is not limited thereto.

In some embodiments, the corresponding appliance is selected from the group consisting of a heating and air conditioning (HVAC) unit, a refrigerator and/or freezer, a washing machine, a dryer, a dish washer, a water heater, an electric vehicle (EV) system, an electric vehicle supply equipment (EVSE) system, a water pump, an energy management hub, a micro-grid controller, and a watering system. As a non-limiting example, in some embodiments, the EVSE system includes a J1772 type EVSE system. As another non-limiting example, in some embodiments, the EVSE system includes a charge de move (CHAdeMO) type EVSE system. Additional details and information regarding the types of EVSE systems is found at Gong et al., 2018, "Taking Charge of Electric Vehicles-Both in the Vehicle and on the Grid," Texas Instruments, pg. 1, which is hereby incorporated by reference in its entirety for all purposes. One of skill in the art will appreciate that a wide variety of appliances are applicable as the corresponding appliance. For instance, in some embodiments, a power supply 476 of the corresponding appliance is a direct current (DC) power supply or an alternating current (AC) power supply.

In some embodiments, each respective remote device 400 in the plurality of remote devices 400 further includes a corresponding display (e.g., display 482 of FIG. 4). In some embodiments, the corresponding display 482 is in wired electronic communication with the remote device 400 but lacks communication with a network interface 484 of the remote device 400. Accordingly, the corresponding display 482 is air-gapped from a plurality of communication networks 106 of the distributed grid system 100.

Block 604. The corresponding agent 440 includes one or more instructions for receiving, from a first transmitter (e.g., transceiver 398 of FIG. 3) in a first network (e.g., first communication network 106-1 of FIG. 1), on a first recurring basis, a first signal from the server computer system 300 (e.g., block 704 of FIG. 7). The first signal includes a first contemporaneous timestamp.

In some embodiments, the first signal includes a first unique composite identifier (e.g., first identifier 352-1 of FIG. 3) that is based, at least in part, on a first location of the first transmitter at a first time of the transmitting. For instance, in some such embodiments, the first unique composite identifier is based on a first location associated with a plurality of measured signal qualities that collectively represent all or a portion of a frequency spectrum, such as an FM radio transmission signal.

In some embodiments, the first signal includes a message authentication component (MAC) generated from a first cryptographic function (e.g., first cryptographic function 372-1 of FIG. 3). In some such embodiments, first cryptographic function is a hash function, which provides lightweight data integrity in the transmission of a respective signal.

In some embodiments, this first signal received by the corresponding agent 440 is a respective signal that includes one or more instructions for encoding information that is transmitted by the grid security signal (e.g., block 504 of FIG. 5). In some embodiments, the encoded information is in excess of 16 bits, in excess of 32 bits, in excess of 64 bits, or in excess of 128 bits.

Block 606. The corresponding agent 440 includes one or more instructions for synchronizing a clock (e.g., clock 460 of FIG. 4) of the respective remote device 400 (e.g., block 706 of FIG. 7, block 708 of FIG. 7). This synchronizing of the clock 460 is in accordance with the first contemporaneous timestamp. Accordingly, the remote device 400 adopts a time of the clock 460 based on the first contemporaneous timestamp generated at the first transmitter 498, while allows for the remote device 400 and the grid security system 300 to have synchronous time.

Moreover, this synchronizing of the clock 460 is conducted in accordance with an authentication of the message authentication component of the first signal. In this way, the remote device 400 only synchronizes the clock 460 when a source of the first signal is authenticated, which ensures that the clock 460 is not deceitfully set to an improper time.

In some embodiments, the clock 460 is a real-time clock embedded within the corresponding appliance. In some embodiments, the clock 460 is a system clock executed by the corresponding first memory 492. For instance, in some embodiments, the clock 460 is a loadable counter able to resolve time down to a required accuracy, such as an approximately one second granularity. The local oscillator provides the counter clock, the required accuracy of which is a function of the worst case (e.g., longest) UMC message time reference update interval and the required accuracy of the application. Preferably, the UMC message time reference update period is at least once every at most 1000 seconds. In some embodiments, the clock 460 is read from and written to (e.g., loaded) using a microprocessor interface. In some embodiments, the accuracy of the clock 460 is maintained by periodically loading a counter with updated time reference data received in a UMC message signal. In some embodiments, the clock 460 is a peripheral device integrated on the same die or within the same integrated chip package as the CPU 474. However, the present disclosure is not limited thereto.

Block 608. Furthermore, the corresponding agent 440 includes one or more instructions for receiving, from the first transmitter 398 in the first network 106-1, a second signal (e.g., block 720 of FIG. 7). This second signal includes an encoding of one or more service variables (e.g., service variables 254 of FIG. 2). In some embodiments, the second signal includes an encrypted unique identifier. Furthermore, in some embodiments, the second signal includes a second contemporaneous timestamp.

Block 610. Moreover, the corresponding agent 440 includes one or more instructions for decoding the second signal (e.g., block 722 of FIG. 7). In some embodiments, this decoding of the second signal is conducted in accordance with one or more cryptographic functions 372. Accordingly, this grants access to the encrypted unique identifier 352 at the respective remote device 400.

Block 612. Additionally, the corresponding agent 440 includes one or more instructions for authenticating the second contemporaneous timestamp based on a first comparison of the second contemporaneous timestamp against an instantaneous elapsed time from the first contemporaneous timestamp determined from the clock 460 (e.g., block 722 of FIG. 7). In some embodiments, the corresponding agent 440 includes one or more instructions for authenticating the encrypted unique identifier 352. In some embodiments, the corresponding agent 440 includes one or more instructions for concurrently authenticating both the second contemporaneous timestamp and the encrypted unique identifier 352.

Figure 10:
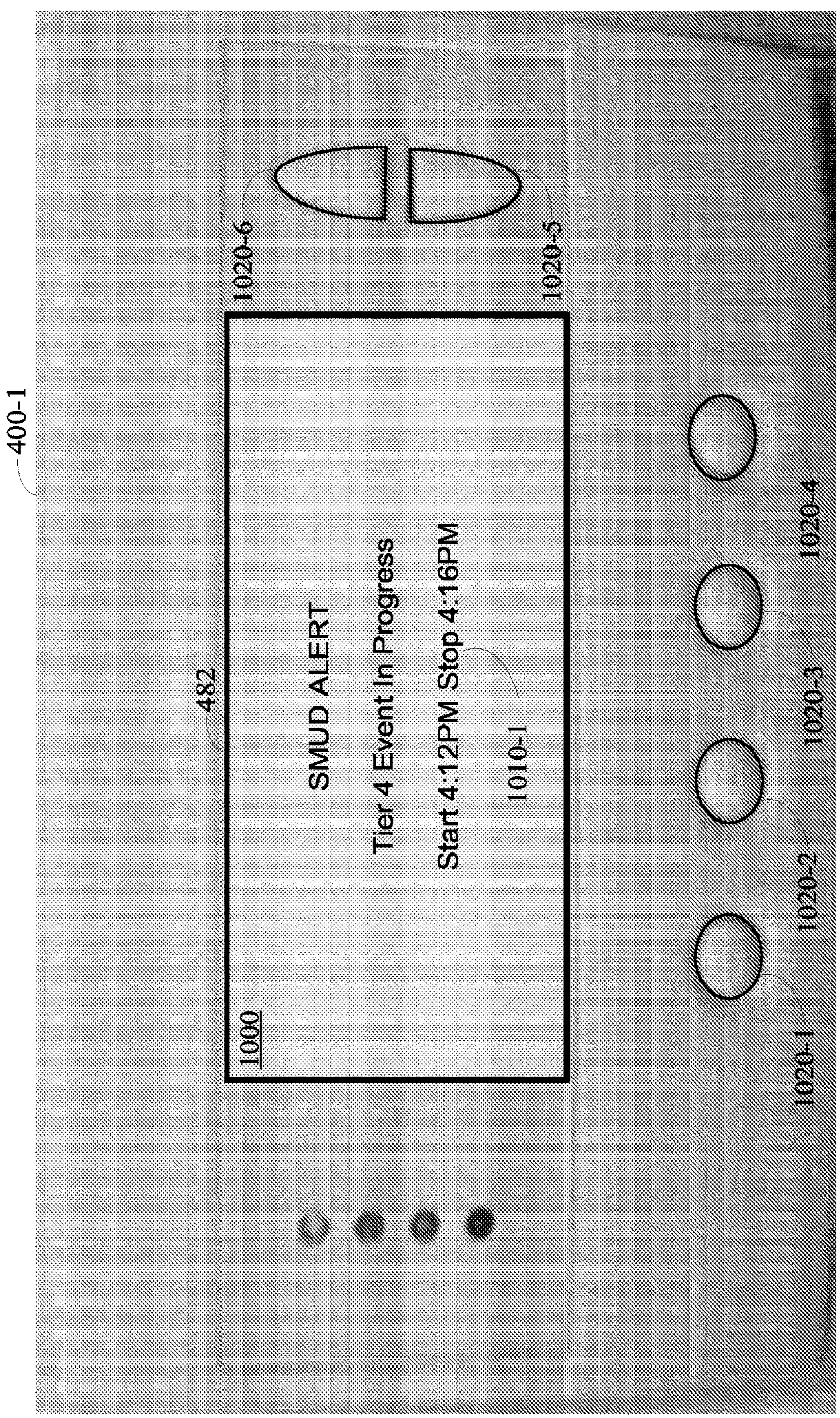
FIG. 10 depicts a thermostat appliance including a user interface presented through a display of the thermostat appliance, in which the user interface provides a visualization of at least one or more service variables associated with a first service corresponding to a respective service provider of a utility energy grid, in accordance with an embodiment of the present disclosure.

In some embodiments, the authenticating the encrypted unique identifier 352 further includes presenting a visualization of the encrypted unique identifier 352 on the display 482 of the remote device 400. For instance, referring briefly to FIG. 10, in some embodiments, the display 482 presents a name of the respective service provider associated with the encrypted unique identifier 352 (e.g., "SMUD" of FIG. 10 presents the name of the SMUD service provider associated with the encrypted unique identifier communicated to a thermostat appliance).

In some embodiments, when the encrypted unique identifier does not satisfy the authenticating, the status of the corresponding appliance is not modified. Moreover, in some embodiments, when either the encrypted unique identifier and/or the second contemporaneous timestamp does not satisfy the authenticating, the status of the corresponding appliance is not modified. As a non-limiting example, in some embodiments, the encrypted unique identifier is associated with a location of a corresponding device (e.g., determined by a plurality of measured signal qualities that collectively represent all or a portion of a frequency spectrum), such that a change in the location of the corresponding device further changes the encrypted unique identifier, which would cause the transmission to fail the authentication process. In some embodiments, when the authentication does not proceed to modifying the status for the corresponding appliance, the encrypted unique identifier associated with the corresponding device is removed from one or more lookup tables (e.g., lookup table 350 of FIG. 3, lookup table 450 of FIG. 4). However, the present disclosure is not limited thereto.

Block 614. The corresponding agent 440 further includes one or more instructions for modifying a status of the corresponding appliance in accordance with the one or more service variables 254 (e.g., block 724 of FIG. 7). In some embodiments, this modifying of the status of the corresponding appliance is performed at a future time. In such embodiments, this future time occurs after both the first contemporaneous timestamp and the second contemporaneous timestamp. In this way, the first contemporaneous timestamp and the second contemporaneous timestamp act as a security mechanism within the grid, such as when a fraudulent transmission throughout the grid attempts to modify the status of an appliance at a time that occurs before the first contemporaneous timestamp, before the second contemporaneous timestamp, or at the second contemporaneous timestamp. By way of examples, in some embodiments, the one or more instructions instruct the appliance to modify from an OFF state to an ON state at a future time of 11:59 PM local time at the appliance when the first contemporaneous timestamp is at 11:51 PM local time at the appliance and the second contemporaneous timestamp is at 11:56 PM local time at the appliance.

In some embodiments, the corresponding agent 440 further includes one or more instructions for generating a third signal (e.g., by transceiver 498 of FIG. 4) that includes data construct including feedback. This feedback is associated with a usage of the service 252 and/or the modifying the status of the corresponding appliance, which allows for feedback controls into the generating of one or more service variables 254 at the service provider system 200 and/or optimization of the service oversight module 360 of the grid security system 300.

Yet another aspect of the present disclosure is directed to providing an apparatus (e.g., remote device 400 of FIG. 1, remote device 400 of FIG. 4, appliance 400-1 of FIG. 10, appliance 400-1 of FIG. 12, etc.). The apparatus includes a display (e.g., display 482 of FIG. 10, display 482 of FIG. 12, etc.), which is utilized to present media, such as one or more service variables 252 associated with a respective signal in a form of a text object.

Furthermore, the apparatus includes an FM radio receiver (e.g., receiver 498 of FIG. 4). The FM radio receiver 498 is configured to obtain the one or more service variables associated with a first utility service corresponding to a respective utility service provider that is provided by a frequency modulation (FM) sub carrier channel (e.g., block 604 of FIG. 6, block 608 of FIG. 6, block 704 of FIG. 7, block 720 of FIG. 7, etc.). Moreover, the apparatus includes a processor (e.g., CPU 474 of FIG. 4), which is in electrical communication with the FM radio receiver 498 and the display 482.

Figure 7:
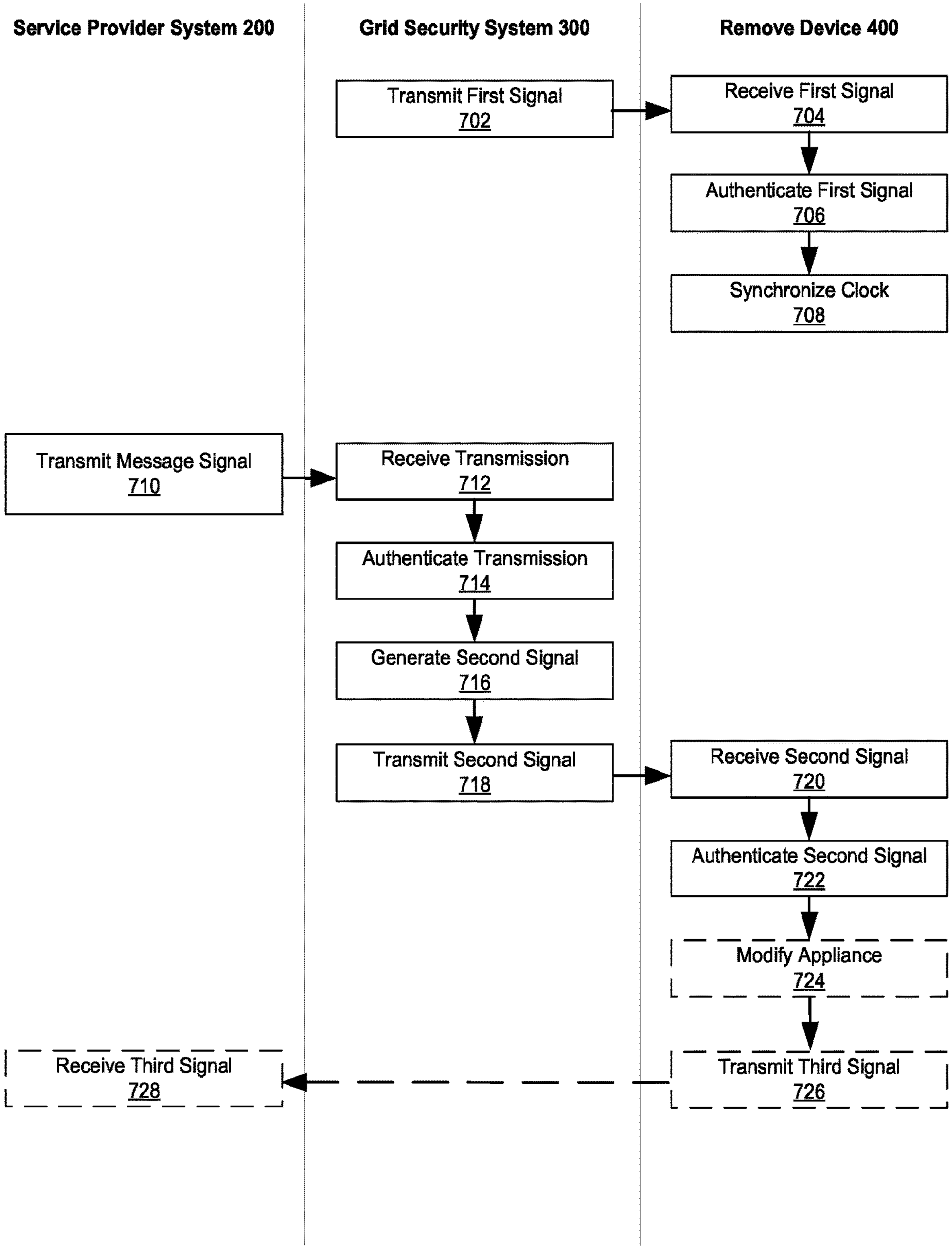
FIG. 7 illustrates yet another flow chart of methods for grid security, in which dashed boxes represent optional elements in the flow chart, in accordance with an embodiment of the present disclosure.

In some embodiments, the processor 474 is configured to extract real-time pricing information from the one or more service variables 252 (e.g., block 604 of FIG. 6, block 606 of FIG. 6, block 608 of FIG. 6, block 610 of FIG. 6, block 612 of FIG. 6, block 614 of FIG. 6, block 704 of FIG. 7, block 720 of FIG. 7, etc.).

Additionally, in some embodiments, the processor 474 is configured to present the real-time pricing information on at least one of the displays 482 for a user. However, the present disclosure is not limited thereto. For instance, in some embodiments, a real-time tariff rate. The processor 474 is configured to present a real-time marginal greenhouse gas emissions rate, a time of use of the first service, a critical peak pricing of the first service, a service reliability status, a critical weather status, or a combination thereof.

In some embodiments, the apparatus includes an input interface (e.g., input interface 1020 of FIG. 10) that is configured for receiving one or more instructions from the user on whether to alter usage of the apparatus, such as usage of the appliance after the real-time pricing information has been presented to the user.

Yet another aspect of the present disclosure is directed to providing a method of providing customer relationship management at a device (e.g., remote device 400 of FIG. 4). The method includes tuning the device to a signal within a frequency band including a locally transmitted terrestrial broadcast network (e.g., second communication network 106-2 of FIG. 1). Moreover, the method includes receiving the signal of the locally transmitted terrestrial broadcast network. The locally transmitted terrestrial broadcast network includes a main signal component and a side data component. For instance, in some embodiments, the main signal component is an analog audio component, and the side data component is a digital data component. However, the present disclosure is not limited thereto. The side data component includes an encoded message. The method further includes decoding the message. In some embodiments, the decoding the message obtains a first unique identifier. In some embodiments, the decoding the message obtains one or more service variables (e.g., service variable 254 of FIG. 2). Furthermore, in some embodiments, the decoding the message obtains a contemporaneous timestamp. Moreover, the method includes comparing the first unique identifier to the present location of the device. In some embodiments, the present location of the device is determined based on a plurality of measured signal qualities that collectively represent a frequency spectrum, which is then compared against a lookup table (e.g., lookup table 450 of FIG. 4) to retrieve the present location of the device. Accordingly, when the first unique identifier matches the present location, at least a portion of the message is outputted to an output component of the device, such a display (e.g., display 498 of FIG. 4). Furthermore, when the first unique identifier does not match the present location, the message is not outputted to the output component of the device.

Yet another aspect of the present disclosure is directed to providing a device (e.g., remote device 400 of FIG. 4), such as an appliance of the present disclosure. The device includes a global positioning feed component for receiving a global positioning feed corresponding to a present location of the device. Furthermore, the device includes an output component. In some embodiments, the output component is a display (e.g., display 482 of FIG. 4) and/or a plurality of lights (e.g., four LED lights of appliance 400-1 of FIG. 10). In some embodiments, the plurality of lights includes two or more lights, three or more lights, five or more lights, or ten or more lights. However, the present disclosure is not limited thereto. The device further includes a receiver (e.g., receiver 498 of FIG. 4) for receiving a respective signal via a locally transmitted terrestrial broadcast network. The locally transmitted terrestrial broadcast network includes a main signal component and a side data component. Furthermore, the side data component includes a message. In some embodiments, the message includes one or more service variables associated with a first service corresponding to a respective service provider. Accordingly, the device includes a decoded digital data controller (e.g., appliance agent 440 of FIG. 4) in electrical communication with the global positioning feed, the output component, and the receiver 498. The decoded digital data controller includes one or more instructions for parsing the message to obtain a first unique identifier (e.g., block 610 of FIG. 6). Moreover, the decoded digital data controller includes one or more instructions for comparing the first unique identifier to the global positioning feed (e.g., block 612 of FIG. 6). When the first unique identifier matches the global positioning feed, at least a portion of the message is outputted to the output component of the device. When the first unique identifier does not match the global positioning feed, the message is not outputted to the output component of the device.

Yet another aspect of the present disclosure is directed to providing system and methods for securing a digital asset. As used herein, a "digital asset" means a data set generated by a computer system in associated with a corresponding service (e.g., first service 252-1). A server computer system (e.g., grid security system 300 of FIG. 3) includes one or more processors (e.g., CPU 374 of FIG. 3), and a first memory (e.g., memory 392 of FIG. 3) that is coupled to the one or more processors 374. The first memory 392 stores an agent (e.g., grid agent 340 of FIG. 3) that is executed by the one or more processors 374.

The agent 340 includes one or more instructions for transmitting, via a first transmitter in a first network (e.g., first communication network 106-1 of FIG. 1), on a first recurring basis a first signal to each remote receiver in a plurality of remote receivers (e.g., receiver 498 of remote device 400 of FIG. 4, block 504 of FIG. 5, etc.). In some embodiments, the transmitting includes instructions for encoding the first signal with a first contemporaneous timestamp. In some embodiments, the transmitting includes instructions for encoding the first signal with a first unique composite identifier. In some such embodiments, the first unique composite identifier is based, at least in part, on a first location of the first transmitter. In some embodiments, the transmitting includes instructions for encoding the first signal with a message authentication component that is generated from a first cryptographic function. However, the present disclosure is not limited thereto.

The agent further includes one or more instructions for obtaining, via a second network, from a second transmitter associated with a first service provider, on a second recurring basis a message signal. The message signal includes a digital asset and an encrypted unique identifier. The digital asset is a data set that is generated by a computer system (e.g., service provider system 200 of FIG. 2, grid security system 300 of FIG. 3, remote device 400 of FIG. 4, etc.) in associated with a service. In some embodiments, the digital asset includes one or more digital images, one or more two-dimensional (2D) maps, one or more 3D maps, one or more computer-aided designs (e.g., a conventional boundary representation of a 2D or 3D geometry), a digital video, one or more dense point clouds, one or more textured meshes, one or more cryptographic non-fungible token assets, or a combination thereof. For instance, in some embodiments, the digital asset is a digital representation of a 3D body, such as a 3D magnetic resonance imaging scan associated with a medical service. However, the present disclosure is not limited thereto.

In some embodiments, the digital asset includes an AMEX transaction identifier (e.g., a transaction ID that AMEX assigns to each transaction), an amount (e.g., an amount of a transaction), an authorization code (e.g., a code returned by a credit card processor when a transaction is approved), an AVS street match e.g., (e.g., a result of an AVS check for a street number and a name), an AVS zip code match (a result of the AVS check for zip code), a settlement batch number (e.g., a first value means the transaction has not been settled and any other value indicated the transaction has settled), a billing address (e.g., a street address submitted with a transaction), a card security code match, a client IP address (e.g., an IP address of the Web server to which the transaction was submitted), a credit card expiration date, a customer code, a description of a procured item, a discount amount (e.g., any discount applied to the transaction), a quantity, a shipping address, a shipping method, a shipping phone number, a tax amount, a tax rate, a tender type (e.g., type of credit card used for the transaction), a time stamp (e.g., a date and time that the transaction occurred), or a universal pricing code (e.g., a string describing the products for a line item in a transaction) for a procurement transaction (e.g., that was executed by the computer system). However, the present disclosure is not limited thereto.

In some embodiments, the digital asset includes one or more instructions for updating a data element stored at a remote device. For instance, in some embodiments, the data element is associated with a computer appliance digital asset. In some embodiments, the computer appliance digital asset is a monolithic application, with or as one or more micro-services, or as one or more lambda functions in a serverless architectures. As a non-limiting example, in some embodiments, the data element stored at the remote device includes one or more source files (e.g., source code, byte code, machine code formats, etc.) specifying business logic, presentation logic, data logic, and other models that are compiled or interpreted and built into an executable computer application. However, the present disclosure is not limited thereto.

Accordingly, in some embodiments, the first service provider is associated with an inception of the digital asset, a design of the digital asset, a construction of the digital asset, a testing of the digital asset, a release of digital asset, a retirement of the digital asset, or a combination thereof. In this way, in some embodiments, the first service provider is associated with a software supply chain service. As such, in some embodiments, the systems and methods of the present disclosure provide for security of the digital asset based on reliable identification and authentication of quality-related steps in a lifecycle of the digital asset, such as with authentication of ownership and/or sourcing of the digital asset.

In some embodiments, the obtaining the message signal further includes storing a first instance of the digital asset at the server computer system. For instance, in some embodiments, the first instance of the digital asset is capable of providing a record of the digital asset at a point in time of the obtaining the message signal, such as a version identifier associated with the digital asset, or an owner identifier associated with the digital asset. In some embodiments, the first instance of the digital asset is utilized to assign the digital asset to a taxonomy of digital assets. Moreover, in some embodiments, the first instance includes a source code version of the digital asset, in which the source code version is compiled or interpreted at a remote device for a version of the digital asset that is executable on the remote device. Accordingly, in some embodiments, the first instance of the digital asset provides an immutable record of the digital asset. This record of the digital asset provided by the first instance allows for verification of an integrity or trustworthiness of the digital asset or a respective signal associated with the digital asset, such as by verifying a unique identifier of a source of the respective signal, verifying a change to the digital asset (e.g., in which the change is electronically signed using the unique identifier), or the like.

Additionally, the agent includes one or more instructions for authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to access the digital asset.

In some embodiments, the authenticating the encrypted unique identifier further includes authenticating a trustworthiness of the digital asset. For instance, in some embodiments, the authenticating the trustworthiness of the digital asset includes determining if the digital asset is associated with trusted source; evaluating one or more access privileges to the digital asset; evaluating a latest security version associated with the digital asset; auditing a lifecycle of the digital asset, or a combination thereof. In some embodiments, the authenticating the trustworthiness of the digital asset includes verifying that a corresponding trust record associated with the digital asset has not been tampered.

In some embodiments, the authenticating the trustworthiness of the digital asset includes verifying that a corresponding trust record associated with the digital asset has not been tampered. In some embodiments, the trust record includes a name of the digital asset and/or a version identifier associated with the digital asset. In some embodiments, the trust record is a private record (e.g., a record stored at the grid security system 300). In some embodiments, the trust record is a public record that is published (e.g., published to a distributed blockchain ledger system). Additional details and information regarding a trust record associated with the digital asset is found at United States Patent Publication no.: 2019/0303541 A1, entitled "Auditing Smart Contracts Configured to Mange and Document Software Audits," published Oct. 3, 2019, which is hereby incorporated by reference in its entirety.

In some embodiments, the corresponding trust record is further associated with a distributed blockchain ledger system. In some embodiments, the distributed blockchain ledger system includes a permissionless or public blockchain. The permissionless or public blockchain utilizes a consensus protocol that is accessibly by a subject at a remote device 400 using a communication network 106. A non-limiting example of a permissionless or public blockchain is the Bitcoin blockchain or Ethereum blockchain. In some embodiments, the distributed blockchain ledger system includes a permissioned or private blockchain, which is has restricted access that is managed by a private administrator of one or more subjects. A non-limiting example of a permissioned or private blockchain is the Ripple (XRP) blockchain. Furthermore, in some embodiments, the distributed blockchain ledger system is consortium blockchain, in which management is performed by a continuum of administrators (e.g., a Quorum). However, the present disclosure is not limited thereto.

In some embodiments, each respective unique identifier in the lookup table includes a plurality of measured signal qualities that collectively represent a frequency spectrum. In some embodiments, each respective unique identifier in the lookup table includes a plurality of measured signal qualities that collectively represent a portion of a frequency spectrum (e.g., block 504 of FIG. 5, block 508 of FIG. 5, block 510 of FIG. 5, block 604 of FIG. 6, block 612 of FIG. 6, block 704 of FIG. 7, block 720 of FIG. 7, etc.).

Moreover, the agent includes one or more instructions for generating, when the encrypted unique identifier is authenticated by the authenticating, via a second cryptographic function, a second signal. The second signal includes an encoding of all or a subset of the digital asset, the encrypted unique identifier, and a second contemporaneous timestamp.

Furthermore, the agent includes one or more instructions for transmitting, via the first network, the second signal to each remote receiver in all or a subset of the plurality of remote receivers.

In some embodiments, the transmitting the second signal further includes storing a second instance of the digital asset at the server computer system. In some embodiments, the first instance of the digital asset is different than the second instance of the digital asset. In some embodiments, the first instance of the digital asset is the same, or substantially the same as the second instance of the digital asset. Accordingly, similar to the first instance of the digital asset, the second instance of the digital asset provides a record of the digital asset that allows for verification of an integrity or trustworthiness of the digital asset, or a respective signal associated with the digital asset.

Yet another aspect of the present disclosure is directed to providing a system for securing a digital asset. The system includes a plurality of remote devices and a server computer system. Each respective remote device in the plurality of remote devices includes a corresponding receiver, a corresponding one or more processor, and a corresponding first memory coupled to the corresponding one or more processors. The corresponding first memory stores a corresponding agent executed by the corresponding one or more processors.

The corresponding agent includes one or more instructions for receiving, from a first transmitter in a first network (e.g., first communication network 106-1 of FIG. 1), on a first recurring basis, a respective first signal from the server computer system. The instructions for receiving include instructions for retrieving from the respective first signal at each respective instance of the first recurring basis, a respective first contemporaneous timestamp, a respective first unique composite identifier based, at least in part, on a first location of the first transmitter at a respective first time a respective instance of the first signal was transmitted by the first transmitter, and a respective message authentication component generated from a first cryptographic function.

The corresponding agent includes one or more instructions for synchronizing a clock of the respective remote device with each respective first contemporaneous timestamp in accordance with an authentication of each respective message authentication component.

Furthermore, the corresponding agent includes one or more instructions for obtaining, from the first transmitter, a second signal. The instructions for obtaining include instructions for retrieving from the second signal an encoding of a digital asset, an encrypted unique identifier, and a second contemporaneous timestamp.

In some embodiments, the digital asset includes one or more digital images, one or more two-dimensional (2D) maps, one or more 3D maps, one or more computer-aided designs, a digital video, one or more dense point clouds, one or more textured meshes, one or more cryptographic non-fungible token assets, or a combination thereof. In some embodiments, the digital asset includes an AMEX transaction identifier, an amount, an authorization code, an AVS street match, an AVS zip code match, a settlement batch number, a billing address, a card security code match, a client IP address, a credit card expiration date, a customer code, a description of a procured item, a discount amount, a quantity, a shipping address, a shipping method, a shipping phone number, a tax amount, a tax rate, a tender type, a time stamp, or a universal pricing code for a procurement transaction. In some embodiments, the digital asset includes one or more instructions for updating a data element stored at the remote device.

Additionally, the corresponding agent includes one or more instructions for decoding the second signal, which grants access to the encrypted unique identifier at the respective remote device. In some embodiments, the access to the encrypted unique identifier is a read privilege, a write privilege, an execute privilege, a move privilege, a rename privilege, an append privilege, a change access privilege, a change attribute privilege, an overwrite privilege, or a combination thereof. For instance, in some embodiments, the decoding the second signal grants access to read and/or write information of a file associated with the digital asset. By way of example, in some embodiments, the granted access allows for an end-user to write a portion of the digital asset (e.g., a free-space portion).

The corresponding agent includes one or more instructions for authenticating both the second contemporaneous timestamp based on a first comparison of the second contemporaneous timestamp against an instantaneous elapsed time from a respective first contemporaneous timestamp determined from the clock and the encrypted unique identifier.

In some embodiments, the authenticating the encrypted unique identifier further includes authenticating a trustworthiness of the digital asset. In some embodiments, the authenticating the trustworthiness of the digital asset includes verifying that a corresponding trust record associated with the digital asset has not been tampered. In some embodiments, the corresponding trust record is further associated with a distributed blockchain ledger system.

Moreover, the corresponding agent includes one or more instructions for accessing, in accordance with authentication of both the second contemporaneous timestamp and the encrypted unique identifier, the digital asset at the remote device.

In some embodiments, each respective unique identifier in the lookup table includes a plurality of measured signal qualities that collectively represent a frequency spectrum. In some embodiments, each respective unique identifier in the lookup table includes a plurality of measured signal qualities that collectively represent a portion of a frequency spectrum.

In some embodiments, the accessing the digital asset at includes executing the digital asset at the remote device, deploying the digital asset at the remote device, or providing a first user of the digital asset at the remote device.

In some embodiments, the first service provider is associated with an inception of the digital asset, a design of the digital asset, a construction of the digital asset, a testing of the digital asset, a release of digital asset, a retirement of the digital asset, or a combination thereof.

Yet another aspect of the present disclosure is directed to a system for securing a grid. The system includes a server computer system (e.g., grid security system 300 of FIG. 3). The server computer system includes one or more processors (e.g., CPU 374 of FIG. 3), and a first memory (e.g., memory 392 of FIG. 3) coupled to the one or more processors. The first memory storing an agent (e.g., agent 340 of FIG. 3) that is executed by the one or more processors.

The agent includes one or more instructions for transmitting, via a first transmitter in a first network (e.g., first communication network 106-1 of FIG. 1), on a first recurring basis: a first signal to each remote receiver in a plurality of remote receivers. The transmitting includes instructions for encoding the first signal with a first contemporaneous timestamp, a first unique composite identifier based, at least in part, on a modulation of the first signal by the first transmitter, and a message authentication component generated from a first cryptographic function.

In some embodiments, the first signal includes a main signal component and a side data component. In some embodiments, the main signal component is a main analog signal component. In some embodiments, the side data component is a digital side data component. For instance, in some such embodiments, digital information of the side data component and audio of the main signal component directly propagated over an RF communication network, such that the agent modulates the first signal, such as the side data component, onto the RF carrier. As a non-limiting example, in some embodiments, the agent utilizes an OFDM parallel modulation scheme. Moreover, the modulation of the first signal includes modulating a measured signal quality of the side data component. In some embodiments, the measured signal quality includes a power spectral density. In some embodiments, the measured signal quality includes a difference in comparison to a baseline signal quality, such as a baseline signal level, a baseline noise level, a baseline modulation level, or the like. In some embodiments, the measured signal quality includes an active status of the side data component, such as if a transmission of the side data component is active and, therefore, received at the receiver. However, the present disclosure is not limited thereto. Accordingly, the systems and methods of the present disclosure allow for the modulation by the agent to be modeled to accurately predict a change to a composite identifier due to that modulation, in order to ensure that a receiver that receives the transmission of the signal is capable of authenticating the signal.

The agent further includes one or more instructions for obtaining, via a second network, from a second transmitter associated with a first service provider, on a second recurring basis a message signal. The message signal includes one or more service variables associated with a first service corresponding to a respective service provider and an encrypted unique identifier.

Moreover, the agent includes one or more instructions for authenticating, when an instance of the message signal is obtained, the encrypted unique identifier based on a comparison of the encrypted unique identifier against a plurality of stored unique identifiers in a lookup table. Each unique identifier stored in the lookup table corresponds to a different service provider in one or more service providers that have a privilege to make use of the grid.

Furthermore, the agent includes one or more instructions for generating, when the encrypted unique identifier is authenticated by the authenticating, via a second cryptographic function, a second signal. In some embodiments, the second signal includes an encoding of all or a subset of the one or more service variables, the encrypted unique identifier, and a second contemporaneous timestamp.

The agent further includes one or more instructions for transmitting, via the first network, the second signal to each remote receiver in all or a subset of the plurality of remote receivers.

Example 1) Setting Up a Unique Identifier

At a remote device (e.g., remote device 400 of FIG. 1, remote device 400 of FIG. 4, remote device 400 of FIG. 7, remote device 400 of FIG. 8) or a service provider system (e.g., service provider system 200 of FIG. 1, service provider system 200 of FIG. 2, service provider system 200 of FIG. 7, service provider system 200 of FIG. 8, etc.), a unique composite identifier (e.g., first identifier 352-1 of FIG. 3) is generated (e.g., by identifier generator module 220 of FIG. 2, identifier generator module 420 of FIG. 4, etc.). A transmitter of the remote device 400 or the service provider system 200 (e.g., transceiver 298 of FIG. 2, transceiver 498 of FIG. 4, etc.) transmits instructions for encoding the unique composite identifier 352, which forms an encoded unique identifier 352. At a grid security system (e.g., grid security system 300 of FIG. 1, grid security system 300 of FIG. 3, grid security system 300 of FIG. 7, grid security system 300 of FIG. 8, etc.) the transmission from the remote device 400 or the service provider system 200 is received at a receiver of the grid security system 300 (e.g., transceiver 398 of FIG. 3). The grid security system 300 then stores the encrypted unique identifier 352 in a lookup table (e.g., lookup table 350 of FIG. 3) for future reference.

Example 2) Using a Financial Service

In some embodiments, a user logs in to a client application (e.g., client application 490 of FIG. 4) that is associated with a service provider (e.g., administrator of service provider system 200 of FIG. 2) at a remote device (e.g., remote device 400 of FIG. 7). In such embodiments, the service provider is a financial entity, such as a bank. Additionally, in some embodiments, the user logs into the client application 490 by providing a username and/or password.

In some embodiments, the service provider system 200 authenticates the user by comparing the username and password provided by the user against an account construct (e.g., account construct 242 of FIG. 2).

In some embodiments, the service provider system 200 generates (e.g., by identifier generator module 220 of FIG. 2) a unique, one-time key in the form of an encrypted unique identifier (e.g., unique identifier 352 of FIG. 3). In some embodiments, the encrypted unique identifier is valid for predetermined period of time. In some embodiments, this predetermined period of time is less than a first recurring basis (e.g., block 504 of FIG. 5, block 604 of FIG. 6, block 704 of FIG. 7, etc.), and/or a second recurring basis (e.g., block 506 of FIG. 5, block 720 of FIG. 7, etc.). Accordingly, the service provider system 200 transmits instructions to encode a first signal to a grid security system (e.g., grid security system 300 of FIG. 3).

In some embodiments, the grid security system 300 authentications the encrypted unique identifier 352. In some embodiments, the grid security system 300 transmits instructions for encoding a second signal E-Radio that includes the encrypted unique identifier 352 provided by the service provider system 200. In some embodiments, this transmitting instructions for encoding the second signal is targeted at a respective receiver in a plurality of receivers. For instance, in some embodiments, the respective receiver is used to scan an FM frequency spectrum in order to determine a location of the respective receiving using the systems, methods, and apparatuses described in Wang et al., U.S. Pat. No. 7,298,328 B2, entitled "Systems and Methods for Geographic Positioning Using Radio Spectrum Signatures," issued Nov. 20, 2007, which is hereby incorporated by reference in its entirety for all purposes.

In some embodiments, at the remote device 400 or a remote display (e.g., display 482 of FIG. 4) in communication with the remote device 400, the user generates a unique composite identifier (e.g., by the display 482 that is air gapped from the grid security system 300) by an identifier generation module 420. In some embodiments, the remote device 400 then uses some or all of the encrypted unique identifier (or part of it) to authenticate (e.g., sign) the unique composite identifier generated at the remote device.

In some embodiments, the remote device 400 transmits instructions for encoding a third signal that includes authenticated unique composite identifier to the service provider system 200, which fully authenticates the user to use a service 252 provided by the service provider system, such as conduct a transaction. In some embodiments, the unique composite identifier is authenticated by encrypted keys (e.g., identifiers 352 of lookup table 350 of Table 1, identifiers 352 of lookup table 350 of Table 2, lookup table 350 of FIG. 3, etc.), which allows the systems, methods, and apparatuses of the present disclosure to provide a duplicate and/or confirmation signal to ensure that a signal received over a second communication network 106-2 is valid (e.g., in coordination with one or more signals received over the first communication network 106-1). Accordingly, in some embodiments, the systems, methods, and apparatuses of the present disclosure support security of two or more communication networks 106.

Example 3) Securing Residential or Commercial Transceiver(s)

In this example, a residential or commercial communication networks (e.g., communication network 106) received a first signal including a first service variable of real time energy tariff and a second service variable of load control data from one or more utility service providers (e.g., ISO service provider 200, LDC service provider 200, retailer service provider 200, etc.). The residential or commercial communication networks facilitated communication among a plurality of appliances that provide energy measurement (e.g., meter), display, energy consumption, or a combination thereof collocated within a building as well as backhaul gate ways and other similar neighboring local area networks. Further in this example, a display (e.g., display 482 of FIG. 4) communicated with a first appliance that is a meter and a second appliance that is a thermostat to reveal ongoing energy consumption data within the building. Furthermore, the first appliance and the second appliance received real time energy tariff data directly from the service provider 200 (e.g., broadcast from a wide area transmitter). The first appliance utilized this information to minimize data storage requirements, e.g., ongoing energy consumption costs were determined in real time and stored in a single accumulation register within the first appliance. This feature was particularly useful in SPOT energy markets where energy prices continually change. The second appliance utilized this information to reduce energy consumption during high price periods or grid stress.

Example 4) Utility Information

Utility service providers often publish information relating to current utility load on the Internet. Such information was broadcasted using FM subcarrier channels such as RDS to one or more displays receivers (e.g., receiver 498 of FIG. 4), which was displayed at a display (e.g., display 482 of FIG. 4). Such information included one or more service variables including a description of overall utility load, or the current availability of alternative electrical energy supplies. The Alberta Electric System Operator (AESO) in Calgary, Canada, published the following data on the overall status of the electric grid operated by AESO. All values are listed in megawatts (mW). In Table 5, the total net energy generated by AESO is compared with internal demand and load responsibility. In Table 5, the abbreviation DCR means dispatched (and accepted) contingency reserve.

TABLE 5

| Utility information for the AESO electric grid | |
|---|---|
| Alberta Total Net Generation | 7993 |
| Interchange | 15 |
| Alberta Internal Demand | 7978 |
| Alberta Load Responsibility | 7262 |
| Contingency Reserve Required | 498 |
| Dispatched Contingency Reserve (DCR) | 502 |
| Dispatched Contingency Reserve - Gen | 345 |
| Dispatched Contingency Reserve - Other | 157 |

In addition to overall electric grid properties, AESO published status of energy generation from specific types of resources such as wind (e.g., Table 6) and hydroelectric power (e.g., Table 7). Such information was communicated using the systems, methods, and apparatuses of the present disclosure to the one or more receivers so that utility customers were enabled to make informed decisions on when to use power. Typically, such consumers postponed energy consuming tasks to points in time when more renewable energy resources were used to generate power (e.g., wind and hydroelectric power as opposed to coal and gas). In Tables 6 and 7, the term "MCR," means maximum continuous rating, the term "TNG," means total net generation, and the term "DCR," means dispatched contingency reserve. All values are listed in mW.

TABLE 6

| Utility information for AESO wind generators | | | |
|---|---|---|---|
| UNIT | MCR | TNG | DCR |
| APF Athabasca | 99 | 52 | 0 |
| Castle River #1 | 40 | 37 | 0 |
| Cowley Ridge | 38 | 33 | 0 |
| Drayton Valley | 11 | 0 | 0 |
| Grande Prairie EcoPower | 25 | 6 | 0 |
| McBride Lake Windfarm | 75 | 70 | 0 |

TABLE 6-continued

| Utility information for AESO wind generators | | | |
|---|---|---|---|
| UNIT | MCR | TNG | DCR |
| Summerview | 68.4 | 62 | 0 |
| Suncor Magrath | 30 | 29 | 0 |
| Westlock | 17.5 | 0 | 0 |
| Whitecourt Power | 25 | 23 | 0 |

TABLE 7

| Utility information for AESO hydroelectric generators | | | |
|---|---|---|---|
| UNIT | MCR | TNG | DCR |
| Bighorn Hydro | 120 | 34 | 10 |
| Bow River Hydro | 319 | 165 | 26 |
| Brazeau Hydro | 350 | 43 | 128 |
| CUPC Oldman River | 32 | 7 | 0 |
| Chin Chute | 11 | 0 | 0 |
| Irrican Hydro | 7 | 0 | 0 |
| Raymond Reservoir | 18 | 0 | 0 |
| Taylor Hydro | 12 | 0 | 0 |

Example 5) Securing a Refrigerator and/or Freezer Appliance

The systems, methods, and apparatuses of the present disclosure were utilized to control a first refrigerator and/or freezer appliance. In such embodiments, a sensor of the first appliance (e.g., sensor 496 of FIG. 4) measured a temperature inside of an interior of the first appliance, and an appliance control module (e.g., appliance control module 481 of FIG. 4) controlled an on/off state of the compressor of the first appliance. As a more sophisticated control scheme, the appliance control module 481 employed a model that predicts a culture time of common bacteria in food as a function of temperature and time. With advanced notice of power tariff rates over a particular period of time, and optional knowledge of a food consumption pattern of a subject, a power consumption profile was determined for that period of time that minimized energy consumption by the first appliance, while ensuring that food does not spoil for the life expectancy, as specified by the subject, of the frozen or refrigerated food. The power consumption profile was further modulated by a number of parameters. Such parameters included a combination of: one or more thermal properties of the interior of the first appliance; a degree to which the interior is full of food, determined as a function of mass; and a frequency and/or a duration with which an access mechanism (e.g., door) providing egress to the interior is open.

Example 6) Securing a Clothes Dryer Appliance

Commercially available clothes dryers typically include three power consumption loads that can be decoupled from one another for independent control. The loads are the drum tumbler motor, the air circulation fan, and the heating element. The drum tumbler serves two purposes: one, to expose, on an algorithmic basis, the entire surface of the cloths to air to ensure uniform drying, and two, to stop clothes from wrinkling. Both the heater element and the fan serve to increase the speed with which cloths are dried within the dryer. Typically, the tumbler motor and fan consume far less power than the heater element and are therefore of secondary consideration when considering ways to reduce power usage of a clothes dryer appliance.

To secure a clothes dryer appliance and conserve resources (e.g., block 604 of FIG. 6), a respective signal was received that includes one or more service variables including a real-time tariff power data (e.g., received by a UMC receiver over an RDS/RDBS or IBOC broadcast communication network 106). The respective signal was utilized synchronize a clock associated with the clothes dryer appliance and/or authentic an encrypted unique identified associated with the respective signal (e.g., block 606 of FIG. 6, block 608 of FIG. 6, block 610 of FIG. 6, block 612 of FIG. 6, block 704 of FIG. 7, block 720 of FIG. 7, etc.). Moreover, the respective signal was utilized to modulate a temperature set point within the clothes dryer appliance (e.g., block 614 of FIG. 6). At low tariff rates, the temperature set point is configured to a sufficiently high temperature that minimizes dry time while ensuring that a garment is not damaged from excessive heat. As the tariff rate increases, the temperature set point is configured to a reduced temperature so as to reduce heater element power consumption, thereby increasing a reliance on a fan to dry the garment at an expense of increased dry time. This was realized utilizing an application control module (e.g., application control module 481 of FIG. 4) with an appliance agent (e.g., appliance agent 440 of FIG. 4) to change the temperature set point is accordance to real-time tariff rates for energy at a present point in time. Energy tariff-to-temperature set point correspondence was expressed as a function or presented in a lookup table. The application control module 481 was further configured to monitor air exhaust humidity levels via a digitized humidity sensor (e.g., sensor 496 of FIG. 4) and terminate a dry cycle of the clothes dryer appliance when a detected humidity level, possibly normalized to a tumbler ambient temperature, persists below a predefined threshold level. Accordingly, the heater element of the clothes dryer appliance, via a heater element relay, was controlled by the temperature control loop that established and maintained the set point temperature within the clothes dryer appliance.

Example 7) Securing a Thermostat Appliance

Typically, a heating and/or cooling system includes a heat pump that has a thermostat appliance (e.g., thermal sensor 496 of FIG. 4) associated with the heating and/or cooling system. Referring briefly to FIG. 10, in order to facilitate scheduling capabilities, the thermostat appliance (e.g., first appliance 400-1 of FIG. 10) included a clock mechanism (e.g., clock 460 of FIG. 4) that allows and end-user to program one or more temperature set points within a period of time. One such example of the one or more temperature set points includes six temperature set points within a 24-hour period of time that corresponding to a first temperature set point for waking up, a second temperature set point for away from home, a third temperature set point for pre-cooling, a fourth temperature set point for offsetting a temperate, a fifth temperature set point for home preference, and a sixth temperature set point for sleep.

The thermostat appliance included a receiver and/or transmitter (e.g., transceiver 498 of FIG. 4), such as a non-removable FM radio receiver 498 that supports FM RDS and/or FM HDR. Accordingly, the thermostat appliance with the receiver 498 could receive and responding to a respective signal (e.g., block 506 of FIG. 5) that includes one or more service variables associated with a first service, such as a price (e.g., real-time price), a service reliability status for the respective service, a critical weather status for the respective service, or a combination thereof.

In some embodiments, the thermostat appliance included one or more predetermined temperature set points, in which each predetermined temperature set point was based on a corresponding price-event offset and defines a state of the thermostat appliance. For instance, a first predetermined temperature set point of +3° F. for cooling and −2° F. for heating. Accordingly, upon receiving the respective signal that included a price-event, an appliance control module (e.g., appliance control module 481 of FIG. 4) is utilized to adjust the temperature set point by either the first predetermined temperature set point or the second predetermined temperature set point for a duration specified by the respective signal.

In some embodiments, the receiver 498 of the thermostat appliance is utilized to respond to one or more service variables included in the respective signal that relate to a service reliability status for the respective service and/or a critical weather status for the respective service, or a combination thereof. In some such embodiments, the one or more service variables was configured to change a temperature set point of the thermostat appliance by a number of degrees (e.g., +10° F.) responsive to an emergency event, such as a potential black-out of an energy grid or a nearby fire hazard.

Example 8) Securing an FMRDS Signal Transmission and Decoding the Signal

In some embodiments, a first signal communicated through a first communication network 106-1 includes a first message in a first language that is similar, but not identical, to a second language of a second message of a second signal communicated through a second communication network 106-2. Accordingly, in such embodiments, a maximum integration of functionally between a system that communicates in the first language (e.g., service provider system 200 of FIG. 2, grid security system 300 of FIG. 3, etc.) and a second device that communicates in the second language (e.g., remote device 400 of FIG. 4) is limited to an intersection of functions provided by the first and second languages.

For instance, referring briefly to FIG. 10, in some embodiments, a first service is a utility energy service provided by a respective service provider that is the Sacramento Municipal Utility District (SMUD). A respective signal (e.g., block 608 of FIG. 6, block 704 of FIG. 7, block 720 of FIG. 7, etc.) was obtained through an FM RDS transmission that utilizes an Open Automated Demand Response (OpenADR) language. Moreover, a first appliance that is a thermostat utilizes a UMC language. In some such embodiments, the intersection of functions between OpoenADR and UMC is four functions, which include a price schedule function (e.g., one or more service variables including one or more start times, one or more end times, and actual real-time prices in between a respective start time in the one or more start times and a respective end time in the one or more end times), a price tier function (e.g., one or more service variables including one or more start times, one or more end times, and one or more categorical representations of prices in between a respective start time in the one or more start times and a respective end time in the one or more end times), a cancel event function (e.g., removal of a previous service variable that includes a price, such as price schedule or price tier, which, optionally, reverts back to a baseline status), and a modify event function (e.g., a change in a start time, an end time, or a price in a previously sent transmission). Table 8 provides a listing of integrated functionally between the OpenADR language and the UMC language.

TABLE 8

Mapping between a respective signal transmitted to an appliance and a corresponding command of an appliance control module.

| FUNCTION | OpenADR | UMC | INTERSECTION OF FUNCTIONS |
|---|---|---|---|
| Price Schedule | Accommodate up to one price per minute | Each message allows four time periods/prices. Messages can be combined to allow an unlimited number of periods/prices. | Yes |
| Price Tier | Various categorical representations of prices and/or events | Various categorical representations of prices and/or events (e.g., up to 4 Tiers) | Yes |
| Relative Price | N/A | Allows a base price with 3 multipliers. | No |
| Temperature Offset | N/A | Each message provides one offset (e.g., in degrees) from existing thermostat set point | No |
| Set Temperature | N/A | Each message provides one set point (e.g., in degrees) to be applied to all appliances in a group | No |
| Display Message | N/A | Free-text message limited to 36 characters | No |
| Cancel Event | Remove previous messages (e.g., price schedule or tier) | Remove previous messages (e.g., price schedule or tier) | Yes |
| Modify Event | Update price schedule | Cancel a previous message and send a new message | Yes |
| Bidding Information | Sends information about timing of the auction (e.g., opening and closing times) | N/A | No |
| Receipt Notification | Additional information can be sent back as well | N/A | No |

Additional details and information regarding OpenADR and UMC integration is found at Herter et al., 2009, "Technical Report: Development and Demonstration of the Open Automated Demand Response Standard for the Residential Sector," United States Department of Energy, Office of Science, LBNL-6531E, which is hereby incorporated by reference in its entirety for all purposes.

The respective signal was associated with the respective SMUD service that include one or more service variables associated with a "Tier 4" price-event and defined a state of the thermostat appliance during a period of time starting at 4:12 PM and ending at 4:16 PM local time at the thermostat appliance. In Table 9, a mapping is providing for scheduling a change in the state of the thermostat appliance in accordance with one or more service variable Tiered events, which allows an end-user to transmit a respective signal to schedule such events for specific programs without having to select a variety of signal types.

TABLE 9

Mapping between a respective signal transmitted to an appliance and a corresponding command of an appliance control module.

| SIGNAL MESSAGE | TIER | SIGNAL, VALUE | APPLIANCE STATE |
|---|---|---|---|
| Load Up | 1 | Simple, 0 | Load Up (LU) |
| Moderate | 2 | Simple, 1 | Shed (S) |
| Critical Peak | 3 | Simple, 2 | Critical Peak Event (CPE) |
| Grid Emergency | 4 | Simple, 3 | Grid Emergency (GE) |
| Time of Use | Up to Four | Simple, 0-3 | LU, S, CPE, or GE |
| Real-time Price | N/A | Price Multiplier, Variable | Relative Price |

In some embodiments, an end-user was allowed to override the change to the temperature set point.

In some embodiments, the one or more service variables define a point in time within a period of time after the duration specified by the respective signal has expired that the thermostat appliance returns to a prior temperature set point. In some embodiments, the point of time was selected randomly, such as a random point in time during a 30-minute period of the duration specified by the respective signal expired.

In some embodiments, the thermostat appliance utilized a nine-terminal mapping that supported a 24-volt power supply (e.g., power supply 476 of FIG. 4), one or more heat puts with one or more corresponding resistance strips, one or more reversal valves, or a combination thereof.

Accordingly, the thermostat appliance of the systems, methods, and apparatus of the present disclosure provide the end-user with information regarding a communication network (e.g., communication network 106 of FIG. 1) connection status, a type of event (e.g., a price event, a service reliability event, a critical weather event, etc.), apparatus maintenance-related information, or a combination thereof.

Example 9) Securing a Water Heater Appliance

A water heater appliance (e.g., a heat pump water heater appliance) included a receiver (e.g., receiver 498 of FIG. 4), which allowed the water heater appliance to receive a respective transmission, such as an FM signal. In some such embodiments, the water heat appliance included a modular communications interface (MCI) (e.g., network interface 484 of FIG. 4), such as ansi/CTA-2045. The MCI, through a socket interface with the water heat appliance, provides a universal communication module that allows an exchange of messages (e.g., signals) between a respective communication network (e.g., communication network 106 of FIG. 2) and the water heater appliance. In some embodiments, the universal communication module facilitates the exchange of messages in accordance with a protocol stored by the MCI, such as a pass-through protocol or a discretional review (DR) protocol.

Figure 11:
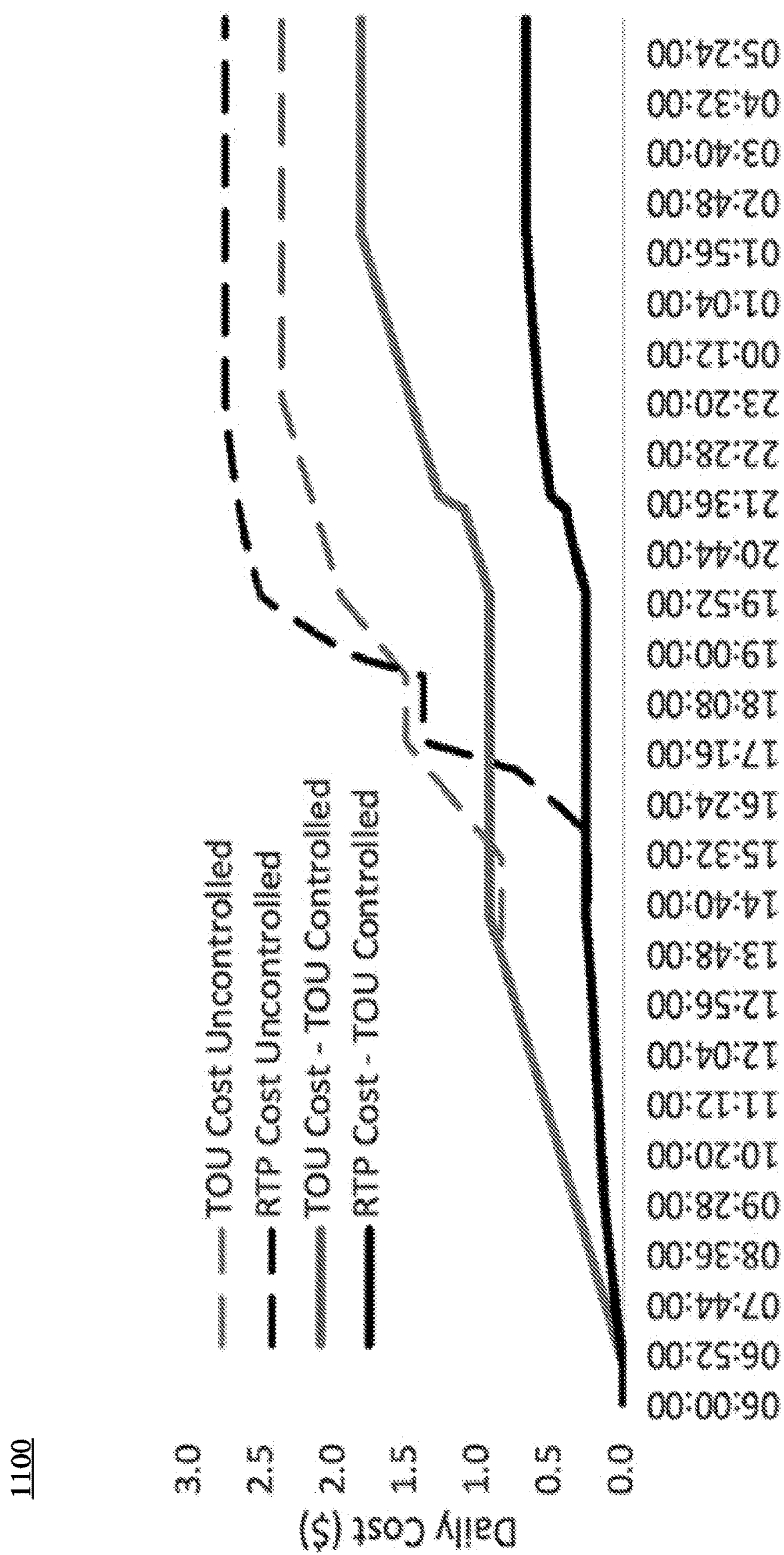
FIG. 11 illustrates a chart that demonstrates realized cost savings of using the systems, methods, and apparatuses of the present disclosure by comparing time-of-use (TOU) and real-time-price (RTP) costs of utilizing a heat pump water heat appliance responsive to an FM RDS transmission of a respective signal, in accordance with an embodiment of the present disclosure.

Referring briefly to FIG. 11, a chart 1100 is provided that illustrates a result of testing a security and cost of operating the water heater appliance of the present disclosure in comparison to a conventional water heater appliance (e.g., without a receiver 498 and/or network interface 484). Specifically, the results included costs for operating the "controlled" water heater appliance of the present disclosure (shown in solid line) and the "uncontrolled" conventional water heater appliance (shown in dashed line) when utilizing either time-of-use (TOU) price tier (shown in light gray) or real-time price (RTP) price tier (shown in dark gray) in accordance with the systems, methods, and apparatus of the present disclosure. As depicted by the chart 1100, utilizing the water heater appliance of the present disclosure provided significant daily costs savings when subject to either the TOU or RTP price tier over a 24-hour period of time.

Example 10) Securing Period or Otherwise Recurring Data Casts

The systems, methods, and apparatuses of the present disclosure allow for reliably and cost effectively securing and disseminating a respective signal that includes utility information (e.g., power tariff information, electrical grid information, gas rates, water rates), weather forecasting information, CRM data, or a combination thereof to microcontrollers embedded in a plurality of appliances (e.g., controller 488 of FIG. 4), etc.) on a periodic or otherwise recurring basis (e.g., every five minutes, every half hour, every hour, every day, etc.). Non-limiting examples of a respective appliance in the plurality of appliances included household appliances such as clothes washers, clothes dryers, refrigerators, hot water heaters, central air conditioners, central heaters, power bars, central vacuums, dishwashers, water pumps, sump pumps, sprinkler systems, water irrigation pumps, and the like. This respective signal was then used to regulate a usage of each appliance in the plurality of appliances.

Rather than communicating this respective signal directly to the microcontroller embedded in a respective appliance, the respective signal was transmitted to a home area network (e.g., communication network 106) that was utilized to regulate appliances. For instance, the home area network was utilized to transmit a switching signal to a subset of appliances in the plurality of appliances to either turn them on or off as a function of the data received by the home area network.

In some embodiments, rather than communicating this respective signal directly to the microcontroller embedded in the respective appliance, the respective signal was transmitted to the home area network which then communicates the utility information to the microcontroller embedded in the respective appliance. This utility information is then used to regulate the usage of the respective appliance.

Example 11) Securing Frequency Regulation Via UMC Messaging

On-line power generating resources provide a certain amount of power to an electrical grid in any given time period. However, actual demand various extensively during the same time period. Frequency regulation pertains to the methods by which utility companies resolve this highly variable demand against the available power supply. Historically, utilities have been able to avoid frequency regulation issues by maintaining on-line generating capacity at a level that was always higher than expected peak demand. This kind of strategy requires a cushion of a certain amount of power. But with increasing fuel prices, the cost of keeping this extra capacity on-line 24 hours a day has become prohibitive. Consequently, utilities have turned to frequency regulation strategies as a means of reducing their costs while maintaining reliable service. The following Table 10 summarizes the hierarchy of frequency regulation resources that has become a mainstay of today's utility industry.

TABLE 10

| | | Required Response Speed | Normal Cycle Duration | Period Between Cycles |
|---|---|---|---|---|
| Voltage Control | Online reactive reserves with automated controls that respond instantly to maintain system voltages within required ranges. | Seconds | Seconds | Seconds |
| Regulation | Online power sources with automated controls that can respond instantly to minute-to-minute changes in system load and correct for normal fluctuations. | Seconds to <1 minute | <1 minute to 10 minutes | Minutes |

TABLE 10-continued

| | | Required Response Speed | Normal Cycle Duration | Period Between Cycles |
|---|---|---|---|---|
| Spinning Reserves | Online power sources with automated controls that can respond instantly to major outages or demand spikes. | Seconds to <10 minutes | <1 minute to 10 minutes | Days |
| Supplemental Reserves | Standby power sources with manual controls that can respond to major outages or demand spikes within 10 minutes. | <10 minutes | 10 minutes to 1 hour | Days |
| Replacement Reserves | Standby power sources with manual controls that can respond to major outages or demand spikes within 30 minutes to free up regulation, spinning reserve and supplemental reserve resources. | <30 minutes | >1 hour | Days |

In some embodiments, frequency regulation was provided by using the systems, methods, and apparatuses of the present disclosure to aggregate large loads. For instance, in some embodiments, the systems, methods, and apparatuses of the present disclosure are used to aggregate household appliances in a neighborhood on a voluntary basis in order to match actual demand to that of available power generating resources.

For instance, in one embodiment, a FM RDS or a frequency between 160 MHz and 167 MHz was used to transmit (e.g., broadcast) a respective signal that included one or more service variables associated with grid load information to a plurality of appliances (e.g., aggregated appliances) in which the owners of such appliances have voluntary agreed to allow a respective service provider (e.g., utility company) to regulate, in part, usage of the appliances. For instance, in some embodiments, the regulated appliances were a plurality of electrical hot water heaters and the respective service provider regulated when the plurality of hot water heaters fired (e.g., controlled a state of a heater element of a respective hot water heater appliance), in aggregate, as a means for keeping actual demand in line with available capacity. Since there was some leeway in the timing of when such hot water heaters fire, it was possible to regulate this timing to help remove spikes in peak demand. In some embodiments, the owners of such appliances received a reduction in their respective bills for participating in such programs. Although hot water heaters have been given as an example, any of the appliances of the present disclosure are regulatable in this manner to help remove spikes in peak demand. Moreover, in some such embodiments, a user overrode the program in times when it would not be convenient to adhere to the regulation commands provided by the respective service provider.

Example 12) Securing a Grid System Communication Via UMCMessaging

An FM RDS or a frequency between 160 MHz and 167 MHz is used to transmit a respective signal that included one or more grid operating service variables including voltage and frequency along with inductive and capacitive load in each geographic area. In this way, massively distributed small generators and massively distributed loads were able to reference their device operation (e.g., dispatch, DR, DSM) to the transmitted service variables without relying solely on grid wire measurements at each location. This approach avoided and even compensated (e.g., dampened) frequency oscillations that rippled through the grid before power outages. Thus, in one embodiment, the disclosed systems, methods, and apparatuses transmit one or more service variables such as voltage, current, frequency, power factor and power quality for the purposes of generation dispatch, demand response, grid balancing, or a combination thereof. In another embodiment, the disclosed systems, methods, and apparatuses transmit one or more service variables such as operating tolerances for reacting appliances and generation systems in each area serviced by the electrical grid. This provided for the ability to quickly reduce/increase load in vast areas (geographically targeted in some cases) for low cost.

Example 13) Secured IBOC-Based Customer Relation Management (CRM) Utilizing a Global Positing Feed In some embodiments, a global positioning feed was used to enhance customer relationship management provided by the systems, methods, and apparatuses of the present disclosure. For instance, in some embodiments, a receiver (e.g., receiver 498 of FIG. 4) either includes or is in electronic communication with the global position feed. In some such embodiments, the global positioning information obtained from the global position feed served as a key, such as a unique identifier for authenticating an instance of a message (e.g., block 508 of FIG. 5, block 612 of FIG. 6, etc.). For example, in some embodiments, an appliance agent (e.g., appliance agent 440 of FIG. 4) compared the first unique identifier found in a newly received message with the global positioning feed. If the two unique identifiers match, indicating that receiver 498 is in the targeted geographic region, a text object 1010 associated with the message (either because the text is found within the message or because the message provides a code for table lookup) is displayed a display 482.

One of skill in the art of the present disclosure will appreciate that select transmission of CRM message signals at specific IBOC broadcasting stations provides a coarse way to geographically limit receipt of such messages. Yet, use of the global positioning feed provides a much finer geographic control over such dissemination of the messages. Accordingly, in some embodiments, a CRM message signal included a first unique identifier that specifies a geographic region and a second unique identifier that specifies a tolerance or range for how far the receiver 498 is from a portion (e.g., center) of this specified geographic region and still qualify for display of the text object 1010 associated with the message signal. According, in some such embodiments, this second unique identifier defined a boundary for the geographic region specified by the first unique identifier. From this, the appliance agent 440 read the two unique identifiers in the message, decoded the global position feed (e.g., block 506 of FIG. 5, block 604 of FIG. 6, block 608 of FIG. 6, block 704 of FIG. 7, block 720 of FIG. 7, etc.), and decided as to whether the appliance is within the geographic region (e.g., block 612 of FIG. 6).

In some embodiments, the geographic position feed is generated to identify a geographic position of a receiver 498 by comparing a measured radio signature in the form of a unique composite identifier to radio signatures in a signature lookup table (e.g., lookup table 450 of FIG. 4). The unique composite identifier included a plurality of measured signal qualities that collectively represent a frequency spectrum. Each measured signal quality in the plurality of measured signal qualities corresponds to a portion of the frequency spectrum. In some embodiments, the agent 440 facilitates comparing the unique composite identifier in the form of the measured radio signature with any of a plurality of predetermined radio signatures found in the lookup table 450. In some such embodiments, the respective geographic position of each of the radio signatures in the plurality of predetermined radio signatures was known. Therefore, when a match is found between the unique composite identifier and a radio signature found in lookup table 450, the location of the receiver, and, therefore, the appliance, is determined to be the geographic location of the matching radio signature in lookup table 450.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain the program modules shown in any combination of FIG. 1, 2, 3, or 4 or in FIG. 7, 8, 9, 10, 11, or 12. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A system for securing a grid comprising a server computer system, the server computer system comprising:

one or more processors; and a first memory coupled to the one or more processors, the first memory storing an agent executed by the one or more processors, the agent comprising one or more instructions for:

transmitting, via a first transmitter in a first network, on a first recurring basis: a first signal to each remote receiver in a plurality of remote receivers, wherein the transmitting includes instructions for encoding the first signal with (i) a first contemporaneous timestamp, (ii) a first unique composite identifier based, at least in part, on a first location of the first transmitter at a first time of the transmitting, and (iii) a message authentication component generated from a first cryptographic function;

obtaining, via a second network, from a second transmitter associated with a first service provider, on a second recurring basis a message signal comprising: (i) one or more service variables associated with a first service corresponding to a respective service provider and (ii) an encrypted unique identifier;

authenticating, when an instance of the message signal is obtained, the encrypted unique identifier based on a comparison of the encrypted unique identifier against a plurality of stored unique identifiers in a lookup table, wherein each unique identifier stored in the lookup table corresponds to a different service provider in one or more service providers that have a privilege to make use of the grid;

generating, when the encrypted unique identifier is authenticated by the authenticating, via a second cryptographic function, a second signal comprising an encoding of all or a subset of the one or more service variables, the encrypted unique identifier, and a second contemporaneous timestamp; and transmitting, via the first network, the second signal to each remote receiver in all or a subset of the plurality of remote receivers.

2. The system of claim 1, wherein the first network is a terrestrial broadcast network or a local area network, the first signal comprises a main signal component and a side data component, and wherein the instructions for encoding encode the side data component with the first contemporaneous timestamp, the first unique composite identifier, and the message authentication component.

3. The system of claim 2, wherein the main signal component is a main analog signal component and the side data component is a digital side data component.

4. The system of claim 1, wherein the encrypted unique identifier is based, at least in part, on a second location of the second transmitter when the one or more service variables were generated.

5. The system of claim 1, wherein the second signal comprises the encoding of all or the subset of the one or more service variables, the encrypted unique identifier, and the second contemporaneous timestamp.

6. The system of claim 1, wherein the one or more service variables comprises a real-time price of the first service, a real-time tariff rate, a real-time marginal greenhouse gas emissions rate, a real-time marginal greenhouse gas emissions rate, a time of use of the first service, a critical peak pricing of the first service, a service reliability status, a critical weather status, or a combination thereof.

7. The system of claim 1, wherein the one or more service variables comprises one or more instructions for updating a data element stored at a remote device.

8. The system of claim 1, wherein the encoding of all or the subset of the one or more service variables further comprises forming a linear vector space, which is included in the second signal, from at least two variables in the one or more service variables.

9. The system of claim 1, wherein each respective unique identifier in the lookup table comprises a plurality of measured signal qualities that collectively represent all or a portion of a frequency spectrum.

10. The system of claim 9, wherein the portion of the frequency spectrum is determined, at least in part, by the agent.

11. The system of claim 10, wherein the agent utilizes a dynamic hysteresis model to determine the portion of the frequency spectrum.

12. The system of claim 9, wherein the portion of the frequency spectrum is modulated by the server computer system.

13. The system of claim 1, wherein each respective unique identifier in the lookup table is embedded within an application-specific integrated circuit that is queried during the authenticating step.

14. The system of claim 1, wherein each respective unique identifier in the lookup table is a binary data element or an analog data element.

15. The system of claim 1, wherein the first cryptographic function or the second cryptographic function is a block cipher function, a key encryption function, or a hash function.

16. The system of claim 1, wherein the subset of the plurality of remote receivers is selected from among the plurality of remote receivers based upon an identity of the respective service provider associated with the encrypted unique identifier, an identity of one or more service variables in the one or more service variables, and/or a value of one or more service variables in the one or more service variables.

17. The system of claim 1, wherein the encoding of all or the subset of the one or more service variables comprises applying the one or more service variables to a service optimization module, thereby forming all or the subset of the one or more service variables as an optimization of the one or more service variables.

18. The system of claim 1, wherein the one or more service variables are configured to change one or more setting parameters of each remote receiver in all or the subset of the plurality of remote receivers in response to one or more emergency events.

19. The system of claim 18, wherein each remote receiver in all or the subset of the plurality of remote receivers comprises a receiver of a thermostat appliance, and the one or more setting parameters of the receiver of the thermostat appliance comprise a temperature set point.

20. The system of claim 18, wherein the one or more emergency events comprise a potential black-out of an energy grid, a nearby fire hazard, or both.

21. The system of claim 1, wherein the second network comprises a frequency modulation (FM) broadcast network.

22. The system of claim 1, wherein the agent further comprises one or more instructions for implementing a respective service utilization policy in a plurality of service utilization policies for one or more remote receivers in the plurality of remote receivers.

23. The system of claim 1, wherein the first contemporaneous timestamp and the second contemporaneous timestamp are based on an identical space and time reference point.

24. The system of claim 1, wherein the one or more service variables comprise one or more start times, one or more end times, one or more actual real-time prices in between a respective start time in the one or more start times and a respective end time in the one or more end times, removal of a previous service variable, a change in a start time, an end time, a price in a previously sent transmission, or any combination thereof.

25. The system of claim 1, wherein the one or more service variables comprise information on a plurality of resources that generate power, and the agent is configured to allow each remote receiver in all or the subset of the plurality of remote receivers to schedule or postpone one or more energy consuming tasks, each to a point in time when a desired resource was used to generate power.

26. The system of claim 25, wherein the desired resource is a renewable energy resource.

27. The system of claim 1, wherein each respective unique identifier in the lookup table is defined, at least in part, by a corresponding geographic region.

* * * * *